(12) United States Patent
Rubin et al.

(10) Patent No.: US 11,816,261 B2
(45) Date of Patent: Nov. 14, 2023

(54) WHOLE-BODY HUMAN-COMPUTER INTERFACE

(71) Applicant: HAPTX, INC., San Luis Obispo, CA (US)

(72) Inventors: Jacob A. Rubin, Morro Bay, CA (US); Robert S. Crockett, San Luis Obispo, CA (US)

(73) Assignee: HAPTX, INC., San Luis Obispo, CA (US)

( * ) Notice: Subject to any disclaimer, the term of this patent is extended or adjusted under 35 U.S.C. 154(b) by 0 days.

(21) Appl. No.: 18/154,824

(22) Filed: Jan. 14, 2023

(65) Prior Publication Data

US 2023/0205315 A1 Jun. 29, 2023

Related U.S. Application Data

(63) Continuation of application No. 17/345,973, filed on Jun. 11, 2021, now Pat. No. 11,579,692, which is a
(Continued)

(51) Int. Cl.
*G06F 3/01* (2006.01)
*B25J 11/00* (2006.01)
(Continued)

(52) U.S. Cl.
CPC .............. *G06F 3/013* (2013.01); *A63F 13/21* (2014.09); *A63F 13/212* (2014.09); *A63F 13/24* (2014.09);
(Continued)

(58) Field of Classification Search
CPC ......... G06F 3/013; A63F 13/21; G06T 19/006
(Continued)

(56) References Cited

U.S. PATENT DOCUMENTS

| | | | |
|---|---|---|---|
| 5,184,319 | A | 2/1993 | Kramer |
| 5,512,919 | A | 4/1996 | Araki |
| 5,631,861 | A | 5/1997 | Kramer |
| 5,898,599 | A | 4/1999 | Massie |

(Continued)

FOREIGN PATENT DOCUMENTS

| | | |
|---|---|---|
| DE | 4422971 C2 | 9/2003 |
| JP | 11167419 | 6/1999 |

(Continued)

OTHER PUBLICATIONS

Communication Pursuant to Article 94(3) EPC for European Patent Application No. 14819570.4 mailed from the European Patent Office dated Jan. 23, 2020.
(Continued)

*Primary Examiner* — Thomas J Lett
(74) *Attorney, Agent, or Firm* — Fitch, Even, Tabin & Flannery LLP

(57) ABSTRACT

A human-computer interface system having an exoskeleton including a plurality of structural members coupled to one another by at least one articulation configured to apply a force to a body segment of a user, the exoskeleton comprising a body-borne portion and a point-of-use portion; the body-borne portion configured to be operatively coupled to the point-of-use portion; and at least one locomotor module including at least one actuator configured to actuate the at least one articulation, the at least one actuator being in operative communication with the exoskeleton.

24 Claims, 34 Drawing Sheets

Related U.S. Application Data continuation of application No. 16/807,029, filed on Mar. 2, 2020, now Pat. No. 11,061,472, which is a continuation of application No. 16/245,145, filed on Jan. 10, 2019, now Pat. No. 10,732,711, which is a continuation of application No. 15/591,019, filed on May 9, 2017, now Pat. No. 10,222,859, which is a continuation of application No. 15/372,362, filed on Dec. 7, 2016, now Pat. No. 9,904,358, which is a continuation of application No. 14/981,414, filed on Dec. 28, 2015, now Pat. No. 9,652,037, which is a continuation of application No. PCT/US2014/044735, filed on Jun. 27, 2014.

(60) Provisional application No. 61/843,317, filed on Jul. 5, 2013.

(51) Int. Cl.

| | |
|---|---|
| *B25J 9/00* | (2006.01) |
| *A63F 13/98* | (2014.01) |
| *A63F 13/21* | (2014.01) |
| *A63F 13/24* | (2014.01) |
| *A63F 13/285* | (2014.01) |
| *A63F 13/212* | (2014.01) |
| *G06F 3/16* | (2006.01) |
| *G06T 19/00* | (2011.01) |
| *G09B 9/00* | (2006.01) |
| *A61H 1/02* | (2006.01) |
| *A61H 3/00* | (2006.01) |
| *A61H 3/06* | (2006.01) |

(52) U.S. Cl.
CPC ............ *A63F 13/285* (2014.09); *A63F 13/98* (2014.09); *B25J 9/0006* (2013.01); *B25J 11/003* (2013.01); *G06F 3/011* (2013.01); *G06F 3/012* (2013.01); *G06F 3/014* (2013.01); *G06F 3/015* (2013.01); *G06F 3/016* (2013.01); *G06F 3/162* (2013.01); *G06T 19/006* (2013.01); *G09B 9/00* (2013.01); *A61H 1/024* (2013.01); *A61H 1/0244* (2013.01); *A61H 1/0266* (2013.01); *A61H 1/0277* (2013.01); *A61H 1/0281* (2013.01); *A61H 1/0285* (2013.01); *A61H 3/00* (2013.01); *A61H 2003/063* (2013.01); *A61H 2201/0165* (2013.01); *A61H 2201/0228* (2013.01); *A61H 2201/5007* (2013.01); *A61H 2201/5043* (2013.01); *A61H 2201/5061* (2013.01); *A61H 2201/5069* (2013.01); *A61H 2201/5084* (2013.01); *A61H 2201/5092* (2013.01)

(58) Field of Classification Search
USPC ........................................................ 345/156
See application file for complete search history.

(56) References Cited

U.S. PATENT DOCUMENTS

| | | |
|---|---|---|
| 5,961,541 A | 10/1999 | Ferrati |
| 5,963,891 A | 10/1999 | Walker |
| 5,980,256 A | 11/1999 | Carmein |
| 6,070,269 A | 6/2000 | Tardif |
| 6,102,832 A | 8/2000 | Tani |
| 6,126,373 A | 10/2000 | Yee |
| 6,128,004 A | 10/2000 | McDowall |
| 6,135,928 A | 10/2000 | Butterfield |
| 6,141,497 A | 10/2000 | Reinicke |
| 6,386,507 B2 | 5/2002 | Dhuler |
| 6,435,794 B1 | 8/2002 | Springer |
| 6,521,188 B1 | 2/2003 | Webster |
| 7,011,378 B2 | 3/2006 | Maluf |
| 7,046,151 B2 | 5/2006 | Dundon |
| 7,138,976 B1 | 11/2006 | Bouzit |
| 7,159,618 B2 | 1/2007 | Broyer |
| 7,258,774 B2 | 8/2007 | Chou |
| 7,409,882 B2 | 8/2008 | Massimo |
| 7,918,808 B2 | 4/2011 | Simmons |
| 7,972,718 B2 | 7/2011 | Bailey |
| 8,046,408 B2 | 10/2011 | Torabi |
| 8,096,322 B2 | 1/2012 | Vallet |
| 8,140,339 B2 | 3/2012 | Hernandez-Rebollar |
| 8,156,964 B2 | 4/2012 | Welle |
| 9,299,230 B2 | 3/2016 | Aviles |
| 9,436,338 B2 | 9/2016 | Keller |
| 9,652,037 B2 | 5/2017 | Rubin |
| 9,714,216 B2 | 7/2017 | Hofmann |
| 9,734,393 B2 | 8/2017 | Wang |
| 9,778,746 B2 | 10/2017 | Keller |
| 9,816,799 B2 | 11/2017 | Keller |
| 9,851,799 B2 | 12/2017 | Keller |
| 9,904,358 B2 | 2/2018 | Rubin |
| 9,971,410 B2 | 5/2018 | Keller |
| 9,984,541 B2 | 5/2018 | Aviles |
| 10,013,062 B1 | 7/2018 | Corson |
| 10,013,064 B2 | 7/2018 | Keller |
| 10,025,386 B2 | 7/2018 | Keller |
| 10,025,387 B2 | 7/2018 | Keller |
| 10,032,347 B2 | 7/2018 | Keller |
| 10,067,007 B2 | 9/2018 | Keller |
| 10,088,902 B2 | 10/2018 | Keller |
| 10,158,277 B2 | 12/2018 | Chun |
| 10,197,459 B2 | 2/2019 | Keller |
| 10,209,775 B2 | 2/2019 | Keller |
| 10,216,272 B2 | 2/2019 | Keller |
| 10,222,859 B2 | 3/2019 | Rubin |
| 10,234,950 B1 | 3/2019 | Keller |
| 10,240,622 B1 | 3/2019 | Lindsay |
| 10,241,567 B2 | 3/2019 | Gopalakrishnan |
| 10,261,592 B2 | 4/2019 | Keller |
| 10,281,982 B2 | 5/2019 | Keller |
| 10,283,232 B2 | 5/2019 | Keller |
| 10,310,608 B1 | 6/2019 | Keller |
| 10,310,610 B2 | 6/2019 | Krogstad |
| 10,310,804 B2 | 6/2019 | Keller |
| 10,317,999 B2 | 6/2019 | Ahne |
| 10,324,530 B2 | 6/2019 | Keller |
| 10,331,206 B2 | 6/2019 | Keller |
| 10,347,094 B1 | 7/2019 | Keller |
| 10,353,466 B1 | 7/2019 | Keller |
| 10,372,213 B2 | 8/2019 | Keller |
| 10,372,219 B1 | 8/2019 | West |
| 10,409,375 B1 | 9/2019 | Higgins |
| 10,422,362 B2 | 9/2019 | Ochs |
| 10,422,637 B1 | 9/2019 | Keller |
| 10,423,227 B2 | 9/2019 | Gu |
| 10,429,210 B1 | 10/2019 | Keller |
| 10,458,864 B1 | 10/2019 | Keller |
| 10,460,873 B2 | 10/2019 | Keller |
| 10,474,236 B1 | 11/2019 | Stewart |
| 10,481,262 B1 | 11/2019 | Desalvo |
| 10,488,932 B1 | 11/2019 | Keller |
| 10,496,169 B2 | 12/2019 | Keller |
| 10,502,327 B1 | 12/2019 | Keller |
| 10,502,643 B2 | 12/2019 | Keller |
| 10,514,111 B2 | 12/2019 | Keller |
| 10,514,765 B1 | 12/2019 | Keller |
| 10,528,138 B2 | 1/2020 | Keller |
| 10,528,143 B2 | 1/2020 | Keller |
| 10,528,151 B1 | 1/2020 | Keller |
| 10,534,433 B1 | 1/2020 | Agarwal |
| 10,540,870 B1 | 1/2020 | West |
| 10,546,471 B1 | 1/2020 | West |
| 10,551,916 B2 | 2/2020 | Chen |
| 10,557,699 B1 | 2/2020 | Keller |
| 10,558,036 B2 | 2/2020 | Keller |
| 10,563,776 B1 | 2/2020 | Lindsay |
| 10,564,722 B2 | 2/2020 | Keller |
| 10,572,014 B2 | 2/2020 | Keller |
| 10,572,024 B1 | 2/2020 | Saba |

(56) References Cited

U.S. PATENT DOCUMENTS

| | | |
|---|---|---|
| 10,585,479 B2 | 3/2020 | Keller |
| 10,591,933 B1 | 3/2020 | Keller |
| 10,599,217 B1 | 3/2020 | Keller |
| 10,635,172 B1 | 4/2020 | Keller |
| 10,648,573 B2 | 5/2020 | Keller |
| 10,678,335 B2 | 6/2020 | Keller |
| 10,705,606 B1 | 7/2020 | Colonnese |
| 10,712,818 B2 | 7/2020 | Keller |
| 10,725,541 B1 | 7/2020 | Desalvo |
| 10,732,280 B1 | 8/2020 | Desalvo |
| 10,732,711 B2 | 8/2020 | Rubin |
| 10,732,712 B2 | 8/2020 | Keller |
| 10,747,332 B2 | 8/2020 | Wang |
| 10,748,393 B1 | 8/2020 | Keller |
| 10,779,583 B2 | 9/2020 | Keller |
| 10,782,782 B1 | 9/2020 | Desalvo |
| 10,802,586 B1 | 10/2020 | Zhao |
| 10,802,657 B1 | 10/2020 | Ahne |
| 10,802,658 B2 | 10/2020 | Ahne |
| 10,809,804 B2 | 10/2020 | Goupil |
| 10,817,049 B1 | 10/2020 | Keller |
| 10,818,433 B1 | 10/2020 | Keller |
| 10,824,231 B1 | 11/2020 | Desalvo |
| 10,838,493 B2 | 11/2020 | Desalvo |
| 10,845,212 B1 | 11/2020 | Turkyilmaz |
| 10,852,826 B1 | 12/2020 | Cox |
| 10,852,827 B1 | 12/2020 | Bochereau |
| 10,866,035 B1 | 12/2020 | Keller |
| 10,907,658 B1 | 2/2021 | Corson |
| 10,942,572 B1 | 3/2021 | Israr |
| 10,948,989 B1 | 3/2021 | Blumenschein |
| 10,955,932 B1 | 3/2021 | Saba |
| 10,962,124 B1 | 3/2021 | Stanley |
| 10,976,826 B1 | 4/2021 | Keller |
| 10,989,233 B2 | 4/2021 | Ochs |
| 10,989,330 B1 | 4/2021 | Keller |
| 10,996,756 B1 | 5/2021 | Ahne |
| 11,009,959 B1 | 5/2021 | Piazza |
| 11,011,033 B1 | 5/2021 | Piazza |
| 11,015,926 B1 | 5/2021 | Keller |
| 11,015,989 B2 | 5/2021 | Keller |
| 11,029,757 B1 | 6/2021 | Chen |
| 11,054,056 B1 | 7/2021 | Glick |
| 11,060,621 B2 | 7/2021 | Desalvo |
| 11,061,472 B2 | 7/2021 | Rubin |
| 11,062,573 B2 | 7/2021 | Young |
| 11,068,057 B1 | 7/2021 | Keller |
| 11,069,207 B2 | 7/2021 | West |
| 11,084,031 B1 | 8/2021 | Keller |
| 11,093,035 B1 | 8/2021 | Ng |
| 11,098,737 B1 | 8/2021 | Glick |
| 11,112,868 B1 | 9/2021 | Stewart |
| 11,125,255 B1 | 9/2021 | Stanley |
| 11,131,331 B2 | 9/2021 | Stanley |
| 11,132,058 B1 | 9/2021 | Gupta |
| 11,132,061 B1 | 9/2021 | Stanley |
| 11,143,218 B1 | 10/2021 | Glick |
| 11,193,597 B1 | 12/2021 | Keller |
| 11,579,692 B2 | 2/2023 | Rubin |
| 2001/0003712 A1 | 6/2001 | Roelofs |
| 2003/0025595 A1 | 2/2003 | Langberg |
| 2003/0030397 A1 | 2/2003 | Simmons |
| 2003/0115954 A1 | 6/2003 | Zemlyakov |
| 2006/0017654 A1 | 1/2006 | Romo |
| 2006/0115348 A1 | 6/2006 | Kramer |
| 2007/0225620 A1 | 9/2007 | Carignan |
| 2008/0102991 A1 | 5/2008 | Hawkins |
| 2009/0248202 A1 | 10/2009 | Osuka |
| 2009/0250267 A1 | 10/2009 | Heubel |
| 2009/0312817 A1 | 12/2009 | Hogle |
| 2010/0093559 A1 | 4/2010 | Fan |
| 2010/0165784 A1 | 7/2010 | Jovanovich |
| 2011/0016609 A1 | 1/2011 | Phelps |
| 2011/0023970 A1 | 2/2011 | Rapp |
| 2011/0067157 A1 | 3/2011 | Xiao |
| 2012/0065026 A1 | 3/2012 | Land |
| 2012/0156661 A1 | 6/2012 | Smith |
| 2012/0182135 A1 | 7/2012 | Kusuura |
| 2013/0158444 A1 | 6/2013 | Herr |
| 2013/0231595 A1 | 9/2013 | Zoss |
| 2014/0274397 A1 | 9/2014 | Sebastian |
| 2014/0277739 A1 | 9/2014 | Kornbluh |
| 2014/0358290 A1 | 12/2014 | Kazerooni |
| 2015/0025423 A1* | 1/2015 | Caires ............... A61H 3/00 601/35 |
| 2015/0040288 A1 | 2/2015 | Gaff |
| 2015/0289995 A1 | 10/2015 | Wilkinson |
| 2015/0321339 A1 | 11/2015 | Asbeck |
| 2016/0041581 A1 | 2/2016 | Piccionelli |
| 2016/0139666 A1 | 5/2016 | Rubin |
| 2016/0246369 A1 | 8/2016 | Osman |
| 2016/0259417 A1 | 9/2016 | Gu |
| 2016/0266645 A1 | 9/2016 | Marozau |
| 2016/0342209 A1 | 11/2016 | Provancher |
| 2017/0083085 A1 | 3/2017 | Rubin |
| 2017/0097680 A1 | 4/2017 | Keller |
| 2017/0131769 A1 | 5/2017 | Keller et al. |
| 2017/0131770 A1 | 5/2017 | Keller et al. |
| 2017/0160807 A1 | 6/2017 | Keller |
| 2017/0168565 A1 | 6/2017 | Cohen |
| 2017/0168576 A1 | 6/2017 | Keller |
| 2017/0178471 A1 | 6/2017 | Levesque |
| 2017/0242477 A1 | 8/2017 | Rubin |
| 2017/0300115 A1 | 10/2017 | Kerr |
| 2018/0098583 A1 | 4/2018 | Keller |
| 2018/0179051 A1 | 6/2018 | Keller |
| 2018/0194369 A1 | 7/2018 | Lisseman |
| 2018/0322444 A1 | 11/2018 | Todeschini |
| 2018/0335841 A1 | 11/2018 | Rubin |
| 2018/0335842 A1 | 11/2018 | Rubin |
| 2019/0086996 A1 | 3/2019 | Bahrami |
| 2019/0163269 A1 | 5/2019 | Rubin |
| 2019/0176320 A1 | 6/2019 | Smith |
| 2019/0204921 A1 | 7/2019 | Goupil |
| 2020/0201431 A1 | 6/2020 | Rubin |
| 2020/0219370 A1 | 7/2020 | West |
| 2020/0250942 A1 | 8/2020 | Young |
| 2020/0272235 A1 | 8/2020 | Ng |
| 2021/0018102 A1 | 1/2021 | Stanley |
| 2021/0081048 A1 | 3/2021 | Sedal |
| 2021/0096648 A1 | 4/2021 | Summit |
| 2021/0217246 A1 | 7/2021 | Osborn |
| 2021/0303065 A1 | 9/2021 | Rubin |
| 2021/0311553 A1 | 10/2021 | Keller |
| 2021/0354137 A1 | 11/2021 | Stanley |
| 2022/0129075 A1 | 4/2022 | Kjos |

FOREIGN PATENT DOCUMENTS

| | | |
|---|---|---|
| JP | 2012074076 | 4/2012 |
| KR | 20100091382 | 8/2010 |
| KR | 1020130086235 | 7/2013 |
| KR | 1020130101367 | 9/2013 |
| WO | 2010025409 | 3/2010 |
| WO | 2010049092 | 5/2010 |
| WO | 2012082072 | 6/2012 |
| WO | 2020081384 | 4/2020 |

OTHER PUBLICATIONS

Communication Pursuant to Rule 164(1) EPC and Supplementary Partial European Search Report for European Patent Application No. 14819570.4 mailed from the European Patent Office dated Sep. 26, 2016.

Dexta Robotics; "Exoskeleton Glove Adds Physical Experience To Virtual Reality (Video)";Yahoo Tech; https://www.yahoo.com/tech.exoskeleton-glove-adds-physical-experience-to-virtual-reality; Aug. 24, 2016; downloaded Aug. 30, 2016; pp. 1 and 2.

EP; Partial Supplementary European Search Report issued in EP Patent Application No. 18896343.3 mailed from the European Patent Office dated Sep. 3, 2021.

(56) References Cited

OTHER PUBLICATIONS

EPO; Extended European Search Report issued by the European Patent Office for EP Patent Application No. 18896343.3 dated Nov. 9, 2021.

EPO; Extended European Search Report issued by the European Patent Office for EP Patent Application No. 22180204.4 dated Oct. 4, 2022.

Extended European Search Report for European Patent Application No. 14819570.4 mailed from the European Patent Office on Jan. 16, 2017.

Goupil; U.S. Appl. No. 16/235,588, filed Dec. 28, 2018.

Grover et al; "Development and Multiplexed Control of Latching Pneumatic Valves Using Microfluidic Logical Structures"; Lab Chip; Apr. 6, 2006; pp. 623-631.

International Search Report and Written Opinion of the International Searching Authority for PCT/US14/44735 dated Dec. 17, 2014.

King et al; "A Pneumatic Haptic Feedback Actuator Array for Robotic Surgery or Simulation"; Medicine Meets Virtual Reality 15; IOS Press, 2007; pp. 217-222.

Kjos: U.S. Appl. No. 17/497,821, filed Oct. 8, 2021.

Kratchman et al; "Modeling Pneumatic Bubble Displacements with Membrane Theory"; Haptics Symposium, 2010 IEEE; Mar. 25, 2010; pp. 327-224.

Leithinger et al; "inFORM"; MIT Media Lab Tangible Media Group; 2013; http://tangible.media.mit.edu/project/inform/; downloaded Jun. 1, 2016; 2 pages.

Morales; "Pneumatic Multiplexer—3d printed"; Instructables; http://www.instructables.com/id/Pneumatic-Multiplexer/; 2016 Autodesk, Inc.; downloaded Jun. 7, 2016; 6 pages.

PCT; International Search Report and Written Opinion of the International Searching Authority for PCT/US2018/030106 mailed from the International Searching Authority dated Aug. 14, 2018.

PCT; Internatioanl Search Report and Written Opinion of the International Searching Authority for PCT/US2018/067941 dated Apr. 23, 2019.

PCT; International Search Report and Written Opinion of the International Searching Authority for PCT/US2012/054314 dated Jan. 24, 2022.

Rubin; U.S. Appl. No. 17/345,973, filed Jun. 11, 2021.

Rubin; U.S. Appl. No. 14/981,414, filed Dec. 28, 2015.

Rubin; U.S. Appl. No. 15/372,362, filed Dec. 7, 2016.

Rubin; U.S. Appl. No. 15/591,019, filed May 9, 2017.

Rubin; U.S. Appl. No. 15/599,470, filed May 19, 2017.

Rubin; U.S. Appl. No. 15/599,471, filed May 19, 2017.

Rubin; U.S. Appl. No. 16/245,145, filed Jan. 10, 2019.

Rubin; U.S. Appl. No. 16/807,029, filed Mar. 2, 2020.

Someya; "Building Bionic Skin, How Flexible Electronics Can Provide E-Skins For Human Spectrum"; IEEE.Org; Sep. 2013; pp. 51-56.

USPTO; Final Office Action issued in U.S. Appl. No. 15/599,470 dated May 1, 2019.

USPTO; Final Office Action issued in U.S. Appl. No. 15/599,471 dated Apr. 16, 2019.

USPTO; Non-Final Office Action issued in U.S. Appl. No. 16/235,588 dated Mar. 18, 2020.

USPTO; Non-final Office Action issued in U.S. Appl. No. 14/981,414 dated Oct. 6, 2016.

USPTO; Non-Final Office Action issued in U.S. Appl. No. 15/591,019 dated Apr. 3, 2018.

USPTO; Non-Final Office Action issued in U.S. Appl. No. 15/599,471 dated Sep. 19, 2018.

USPTO; Non-Final Office Action issued in U.S. Appl. No. 16/245,145 dated Jan. 9, 2020.

USPTO; Non-Final Office Action issued in U.S. Appl. No. 15/599,470 dated Oct. 10, 2018.

USPTO; Notice of Allowance issued in U.S. Appl. No. 15/372,362 dated Oct. 11, 2017.

USPTO; Notice of Allowance issued in U.S. Appl. No. 15/591,019 dated Nov. 14, 2018.

USPTO; Notice of Allowance issued in U.S. Appl. No. 16/235,588 dated Jun. 26, 2020.

USPTO; Notice of Allowance issued in U.S. Appl. No. 16/245,145 dated May 28, 2020.

USPTO; Notice of Allowance issued in U.S. Appl. No. 16/807,029 dated Mar. 17, 2021.

USPTO; Notice of Allowance issued in U.S. Appl. No. 17/345,973 dated Oct. 6, 2022.

USPTO; Notice of Allowance issued in U.S. Appl. No. 14/981,414 dated Mar. 10, 2017.

PCT; International Search Report and Written Opinion of the International Searching Authority for PCT/US23/19494 dated Jul. 18, 2023.

* cited by examiner

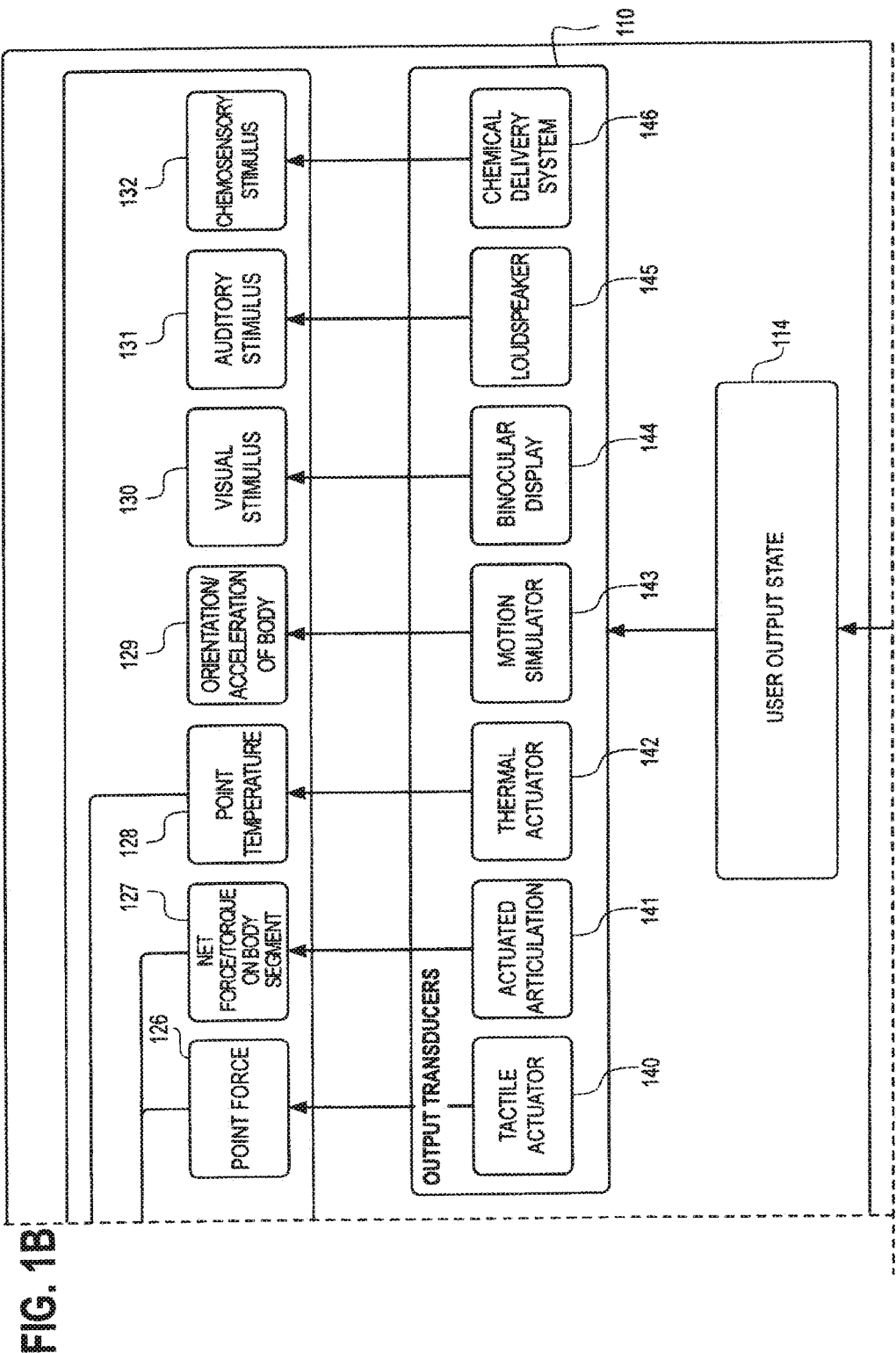

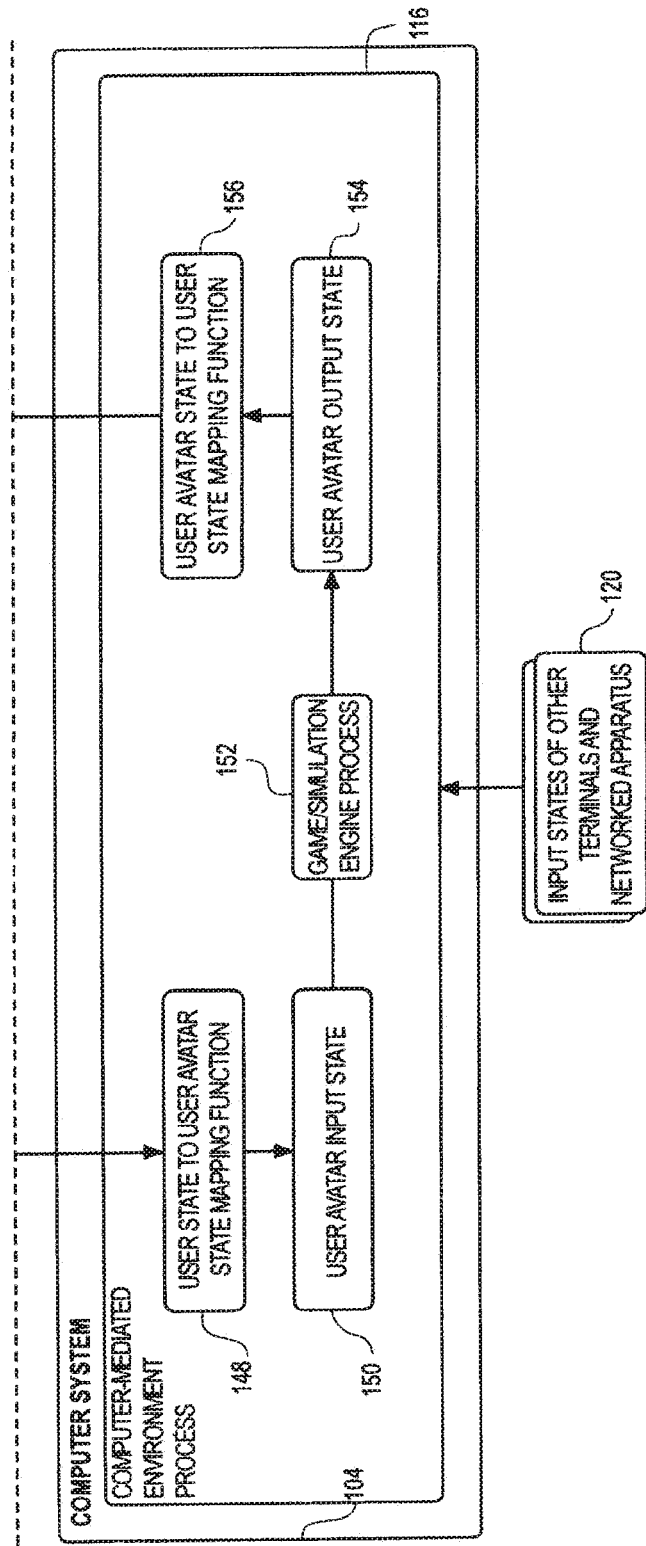

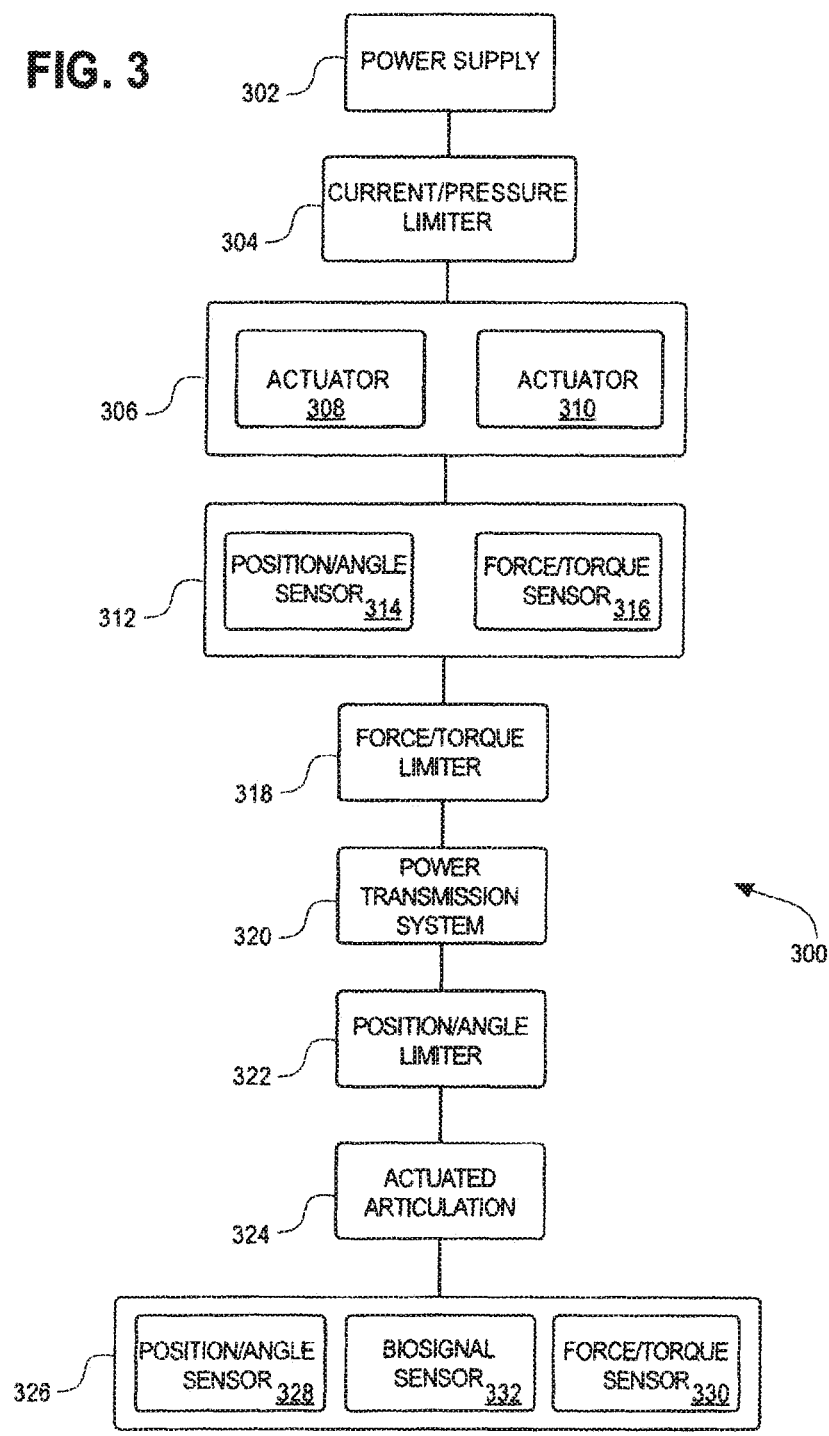

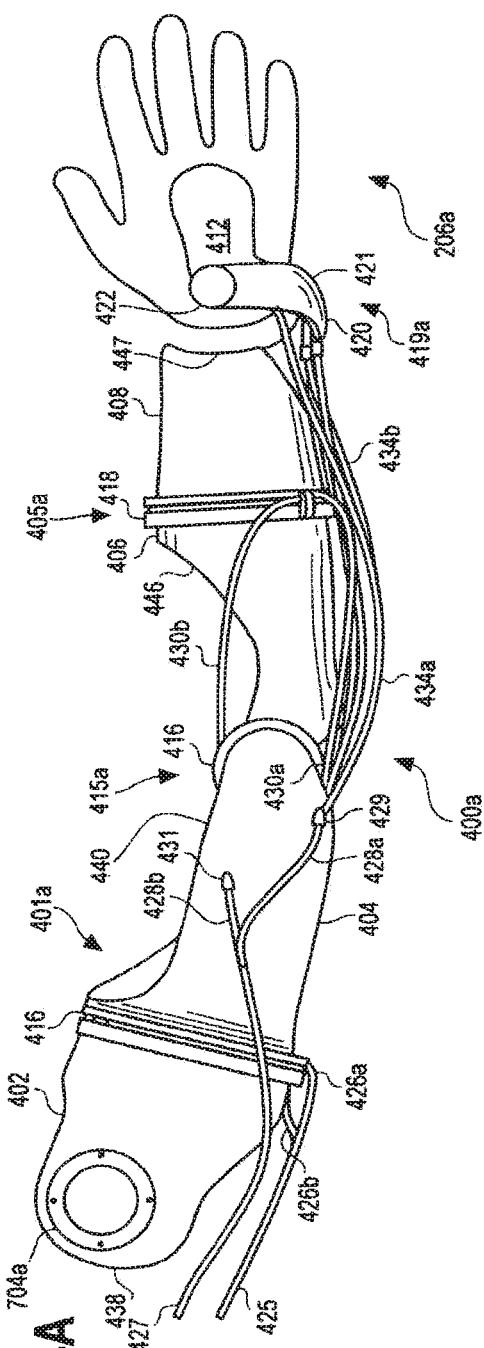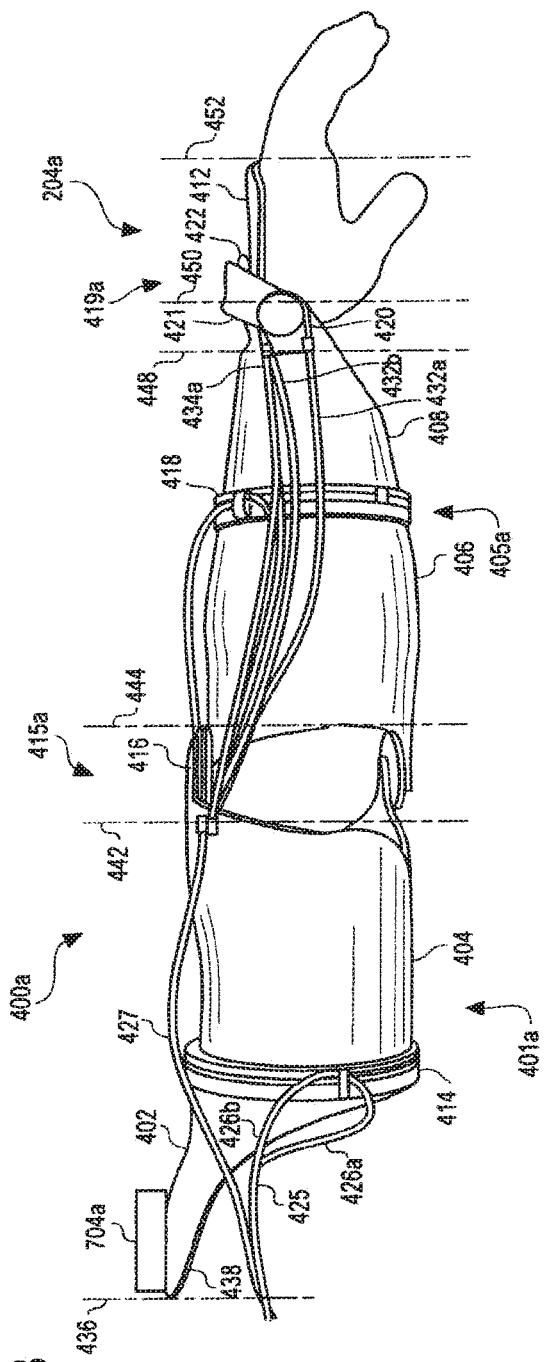
FIG. 4A
FIG. 4B

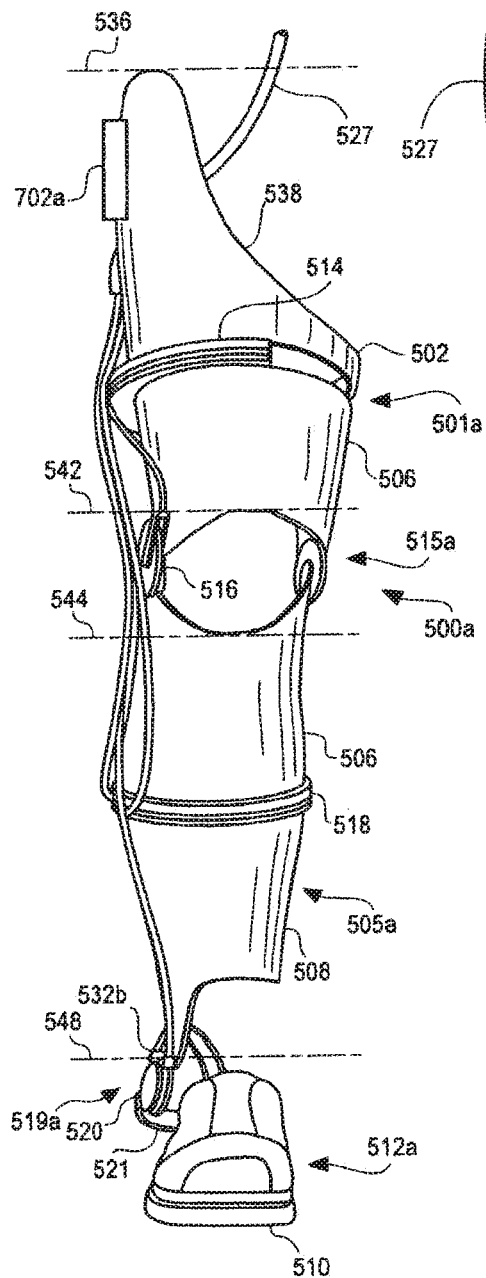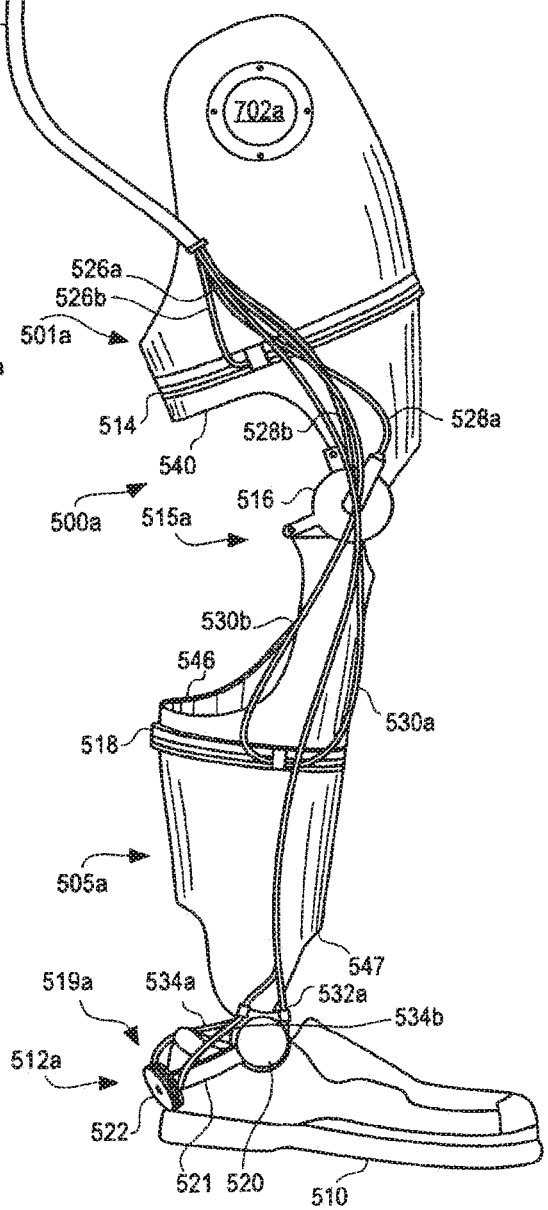

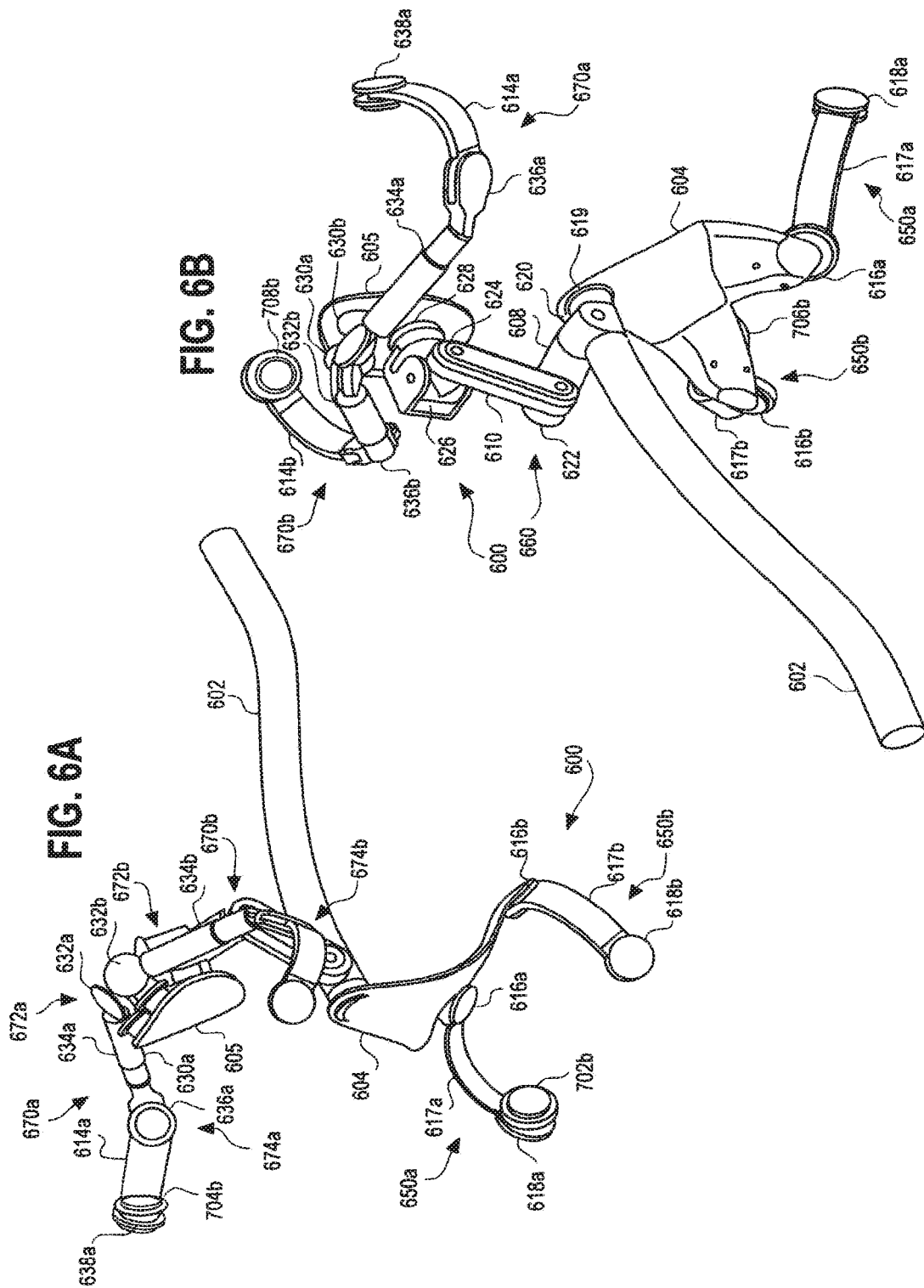

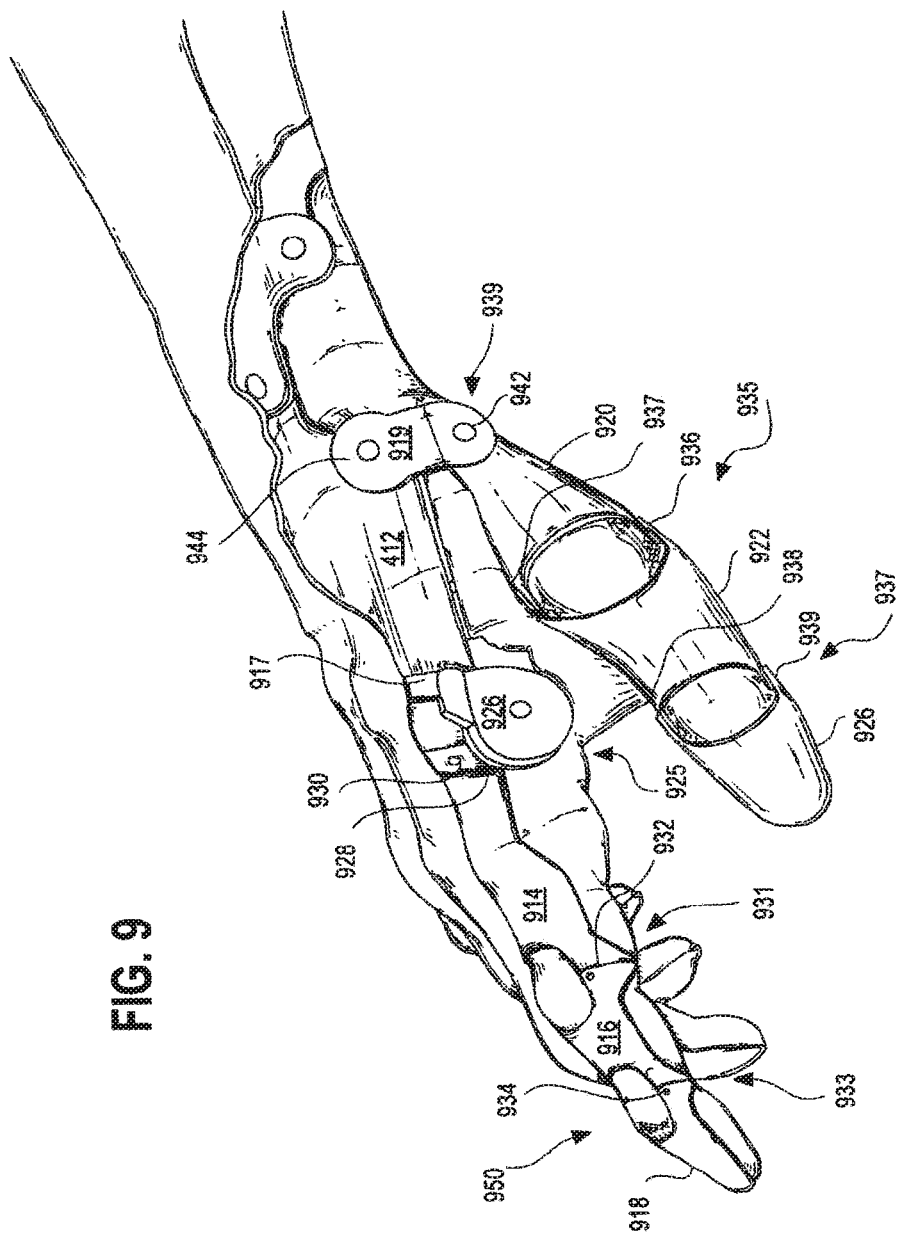

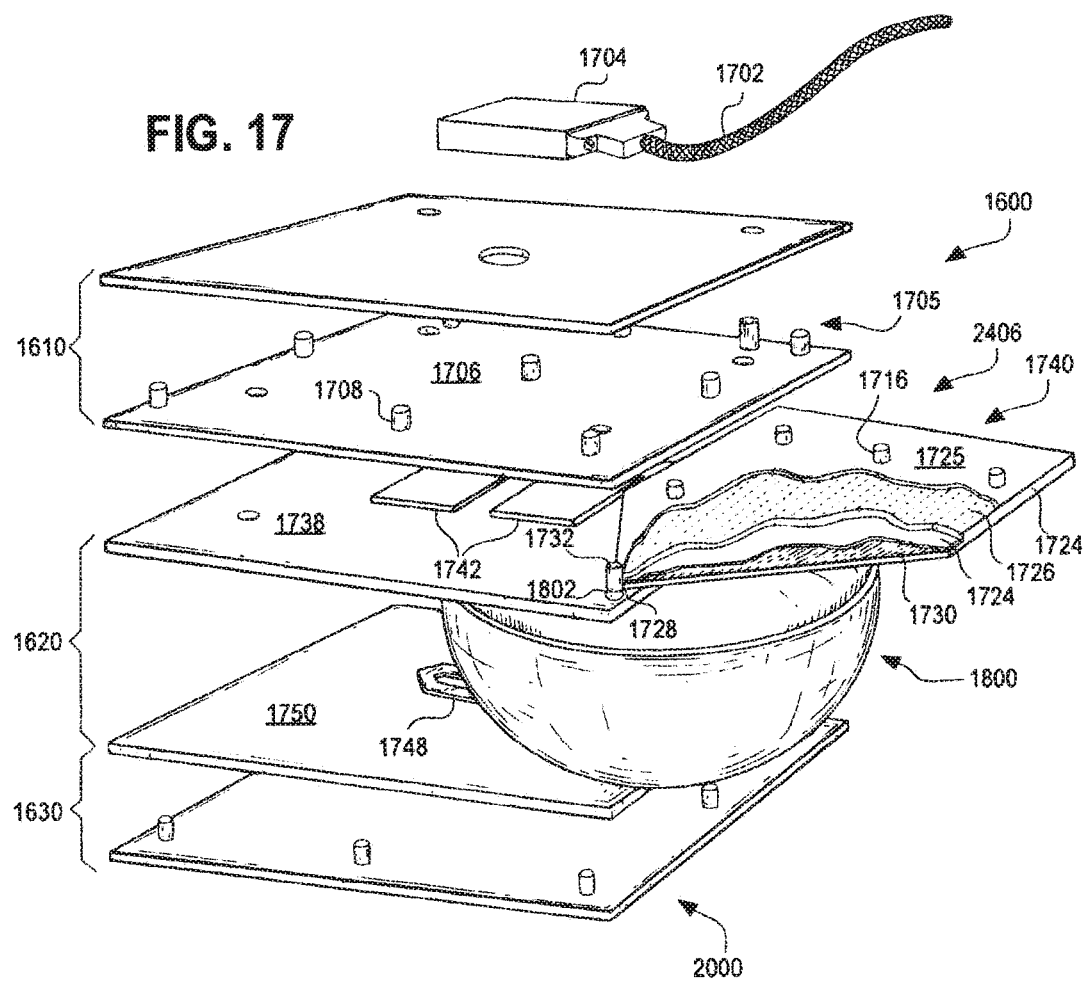

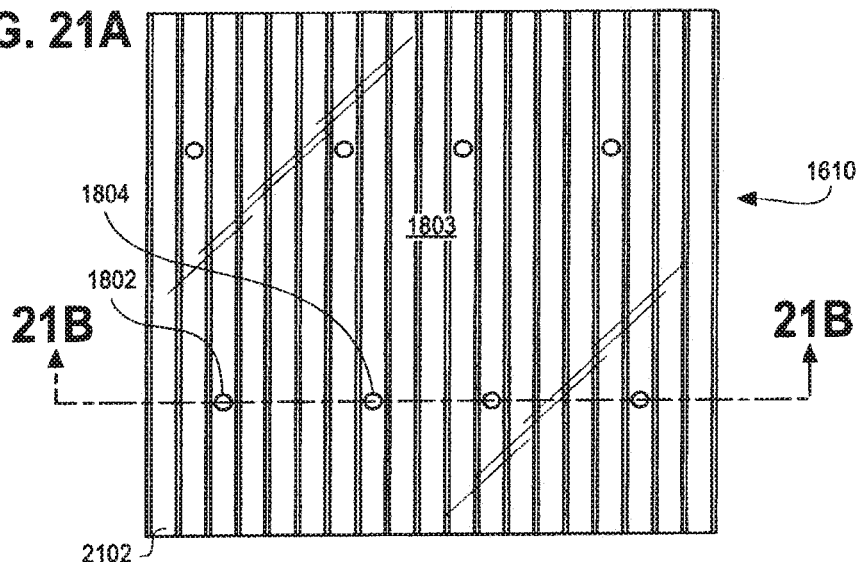
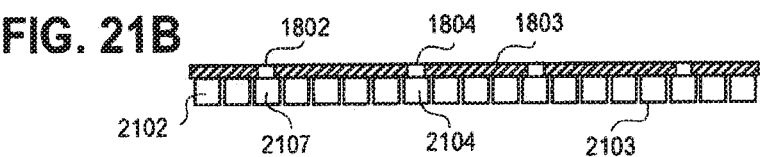
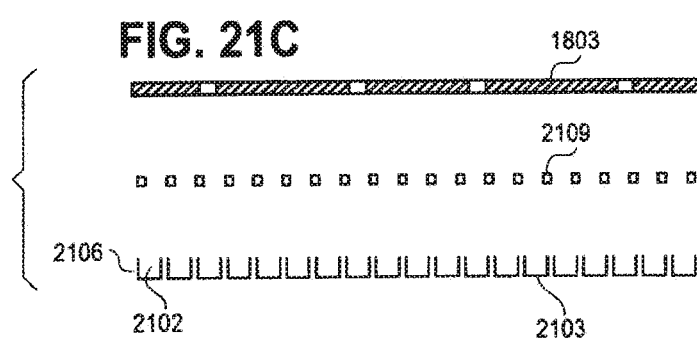
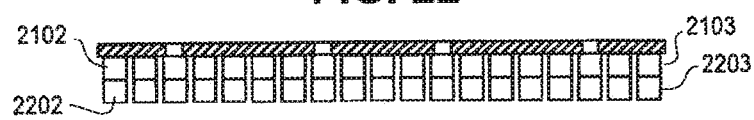

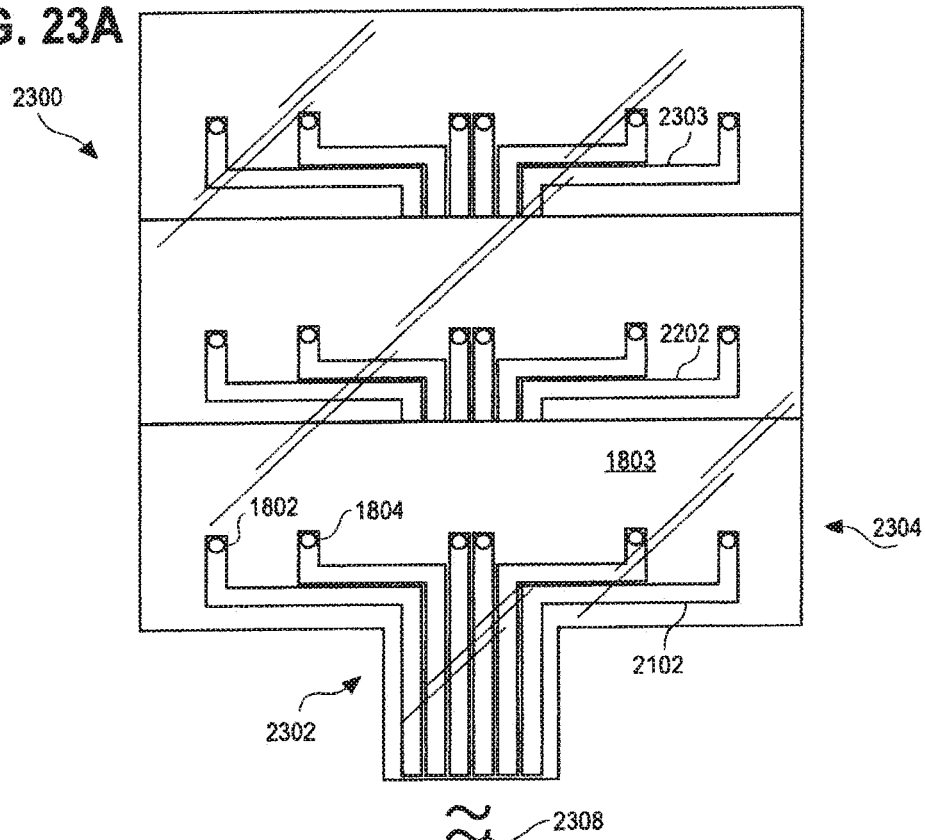
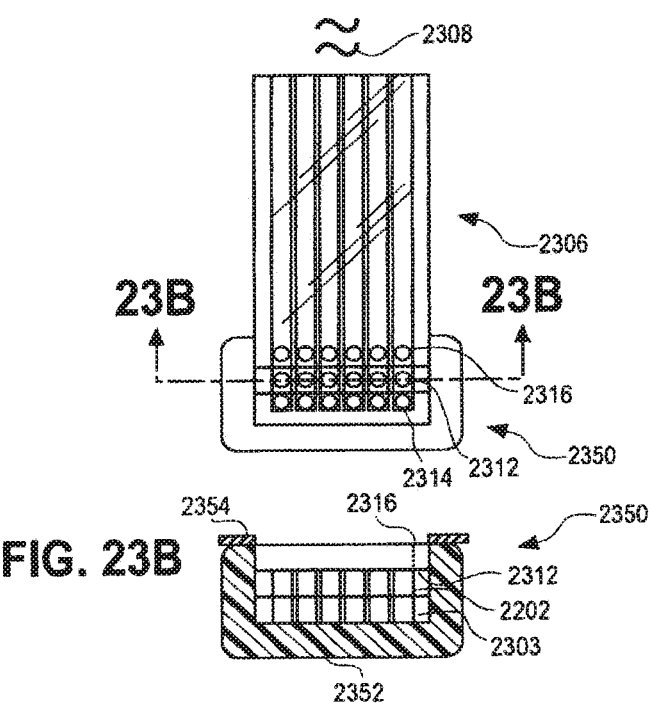

FIG. 25

| FIG. 25A |
|---|
| FIG. 25B |

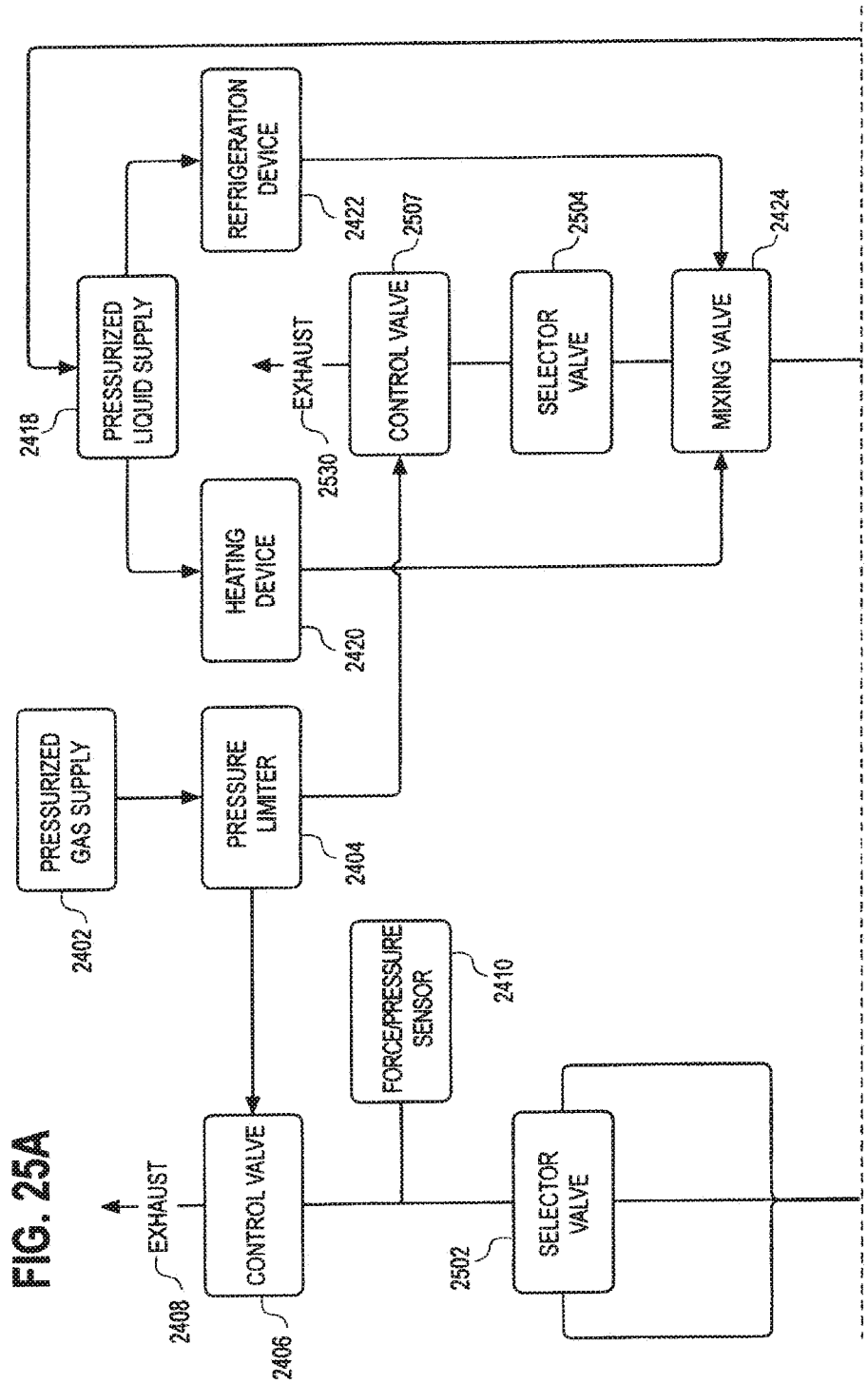

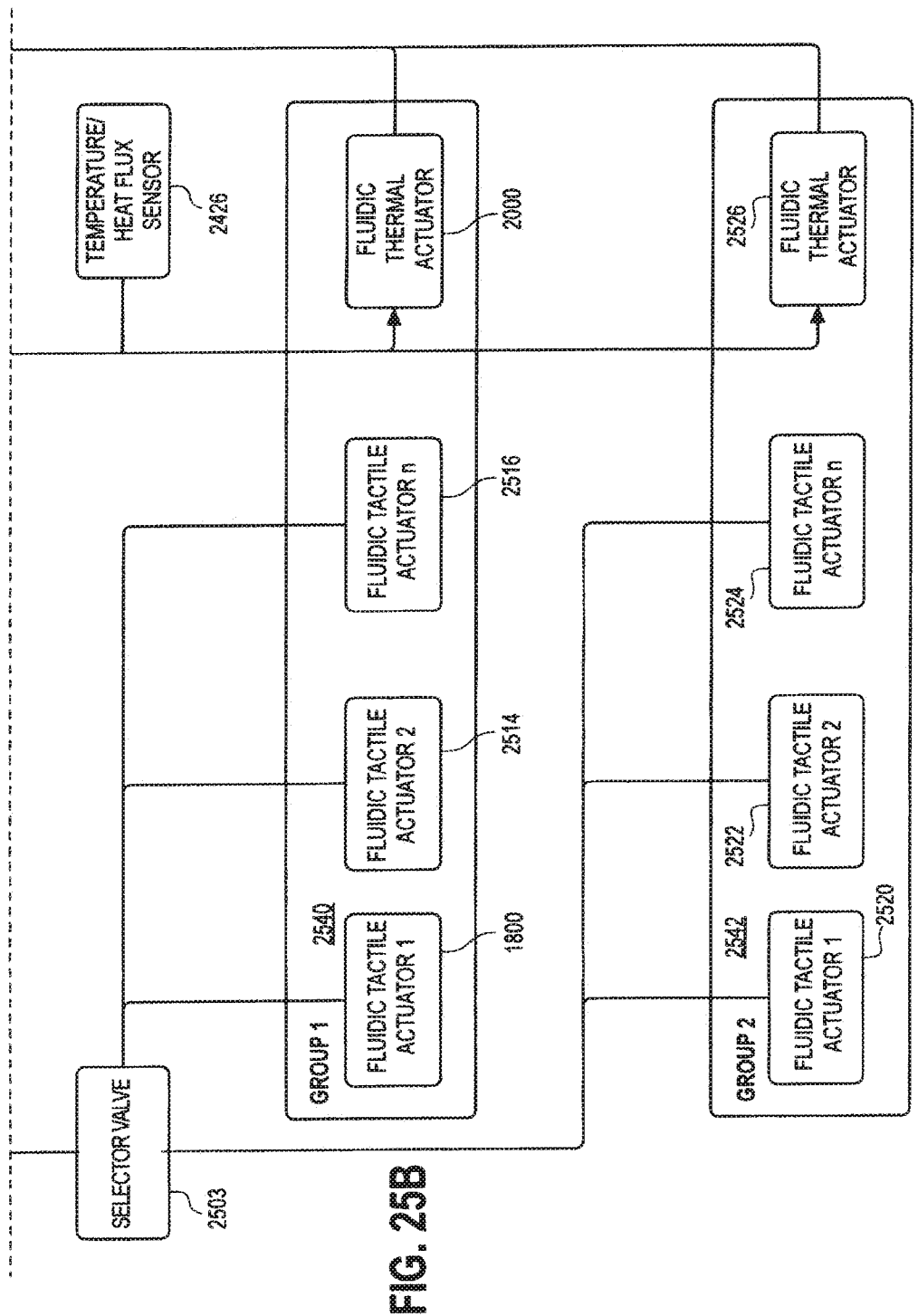

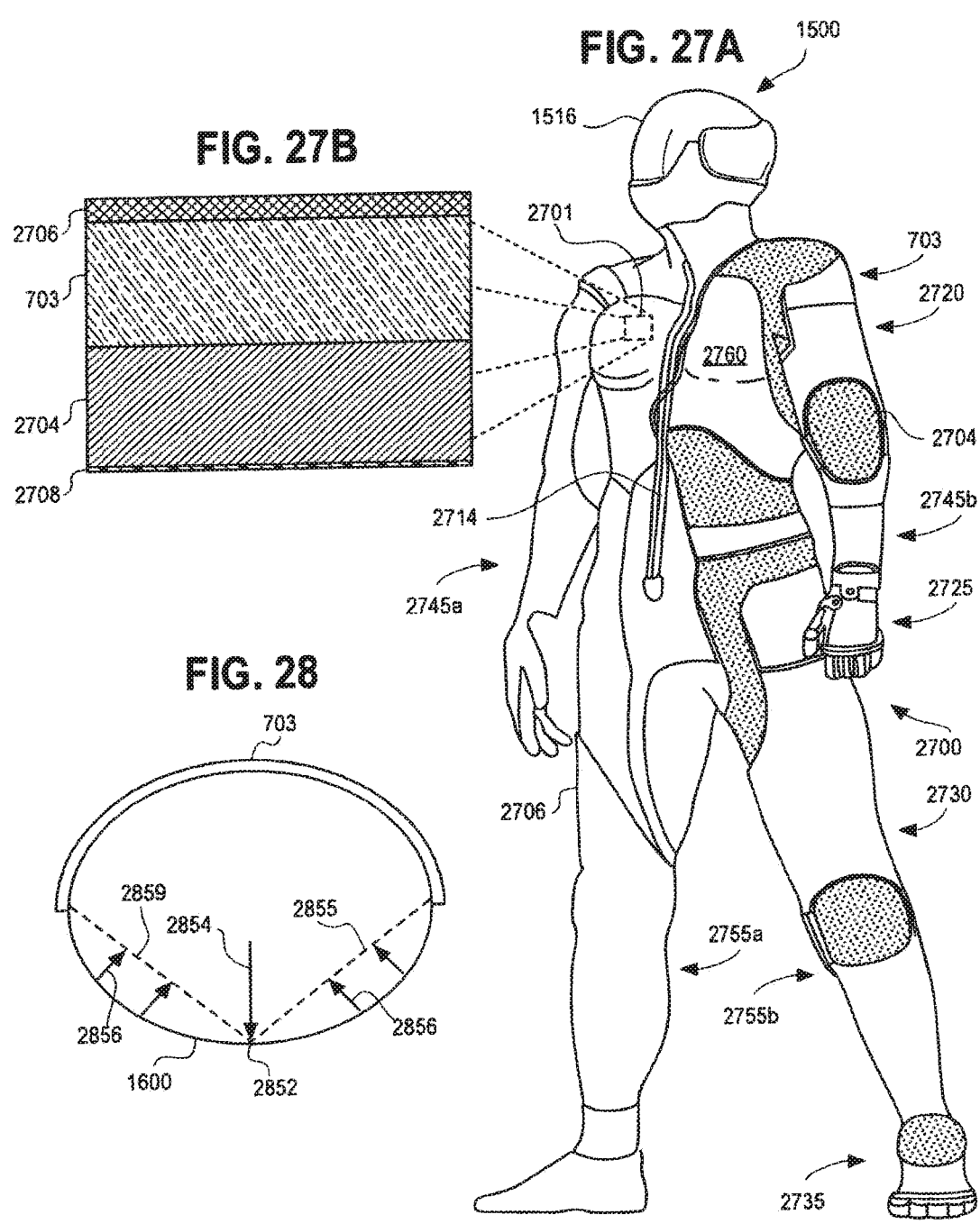

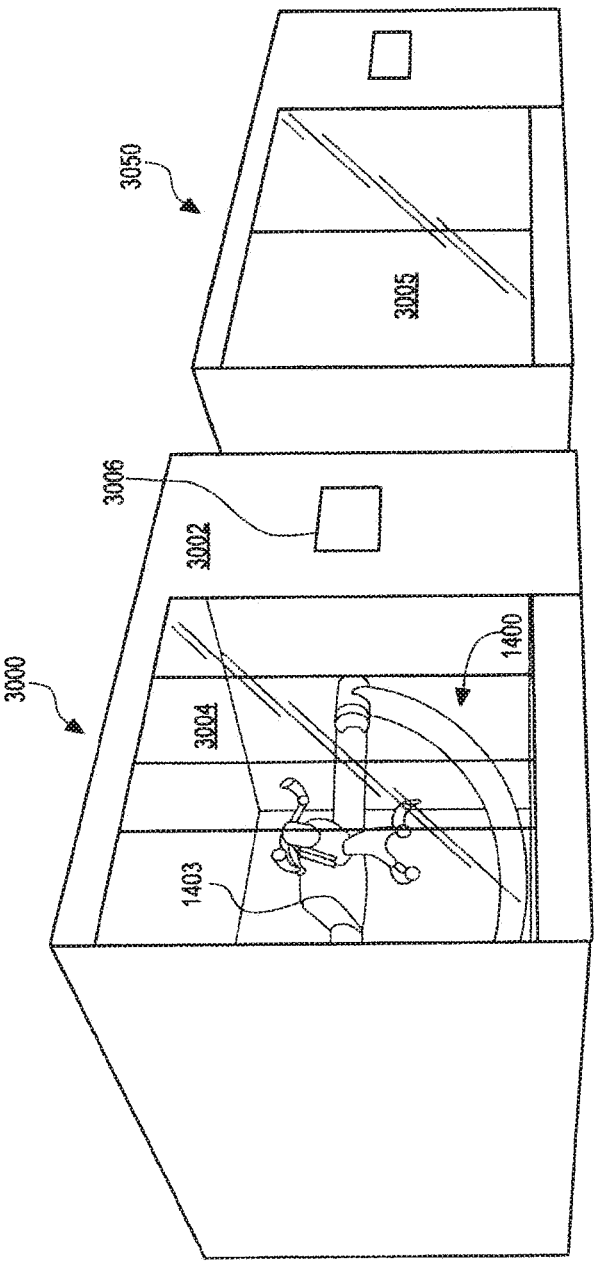

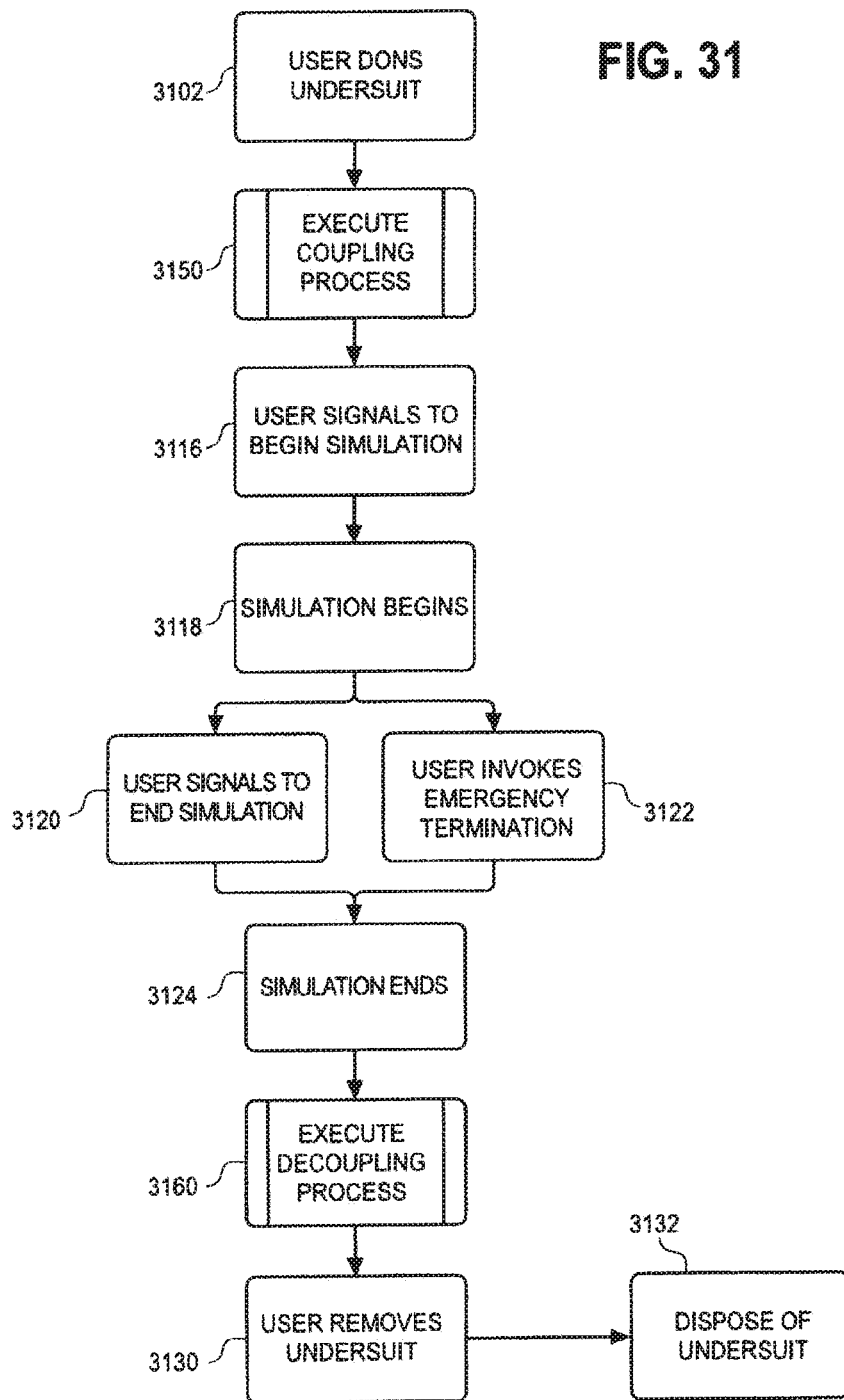

WHOLE-BODY HUMAN-COMPUTER INTERFACE

This application is a continuation of U.S. patent application Ser. No. 17/345,973, filed Jun. 11, 2021, which is a continuation of U.S. patent application Ser. No. 16/807,029, filed Mar. 2, 2020, now U.S. Pat. No. 11,061,472, issued Jul. 13, 2021, which is a continuation of U.S. patent application Ser. No. 16/245,145, filed Jan. 10, 2019, now U.S. Pat. No. 10,732,711, issued Aug. 4, 2020, which is a continuation of U.S. patent application Ser. No. 15/591,019, filed May 9, 2017, now U.S. Pat. No. 10,222,859, issued Mar. 5, 2019, which is a continuation of U.S. patent application Ser. No. 15/372,362, filed Dec. 7, 2016, now U.S. Pat. No. 9,904,358, issued Feb. 27, 2018, which is a continuation of U.S. application Ser. No. 14/981,414, filed Dec. 28, 2015, now U.S. Pat. No. 9,652,037, issued May 16, 2017, which is a continuation of International Application No. PCT/US14/44735, filed Jun. 27, 2014, which claims the benefit of Provisional Application No. 61/843,317 filed Jul. 5, 2013, all of which are incorporated in their entirety herein by reference.

BACKGROUND OF THE INVENTION

1. Field of the Invention

The present invention relates generally to virtual reality human-machine interfaces, and more specifically to immersive virtual reality human-machine interfaces. Even more specifically, the present invention relates to immersive virtual reality human-machine interfaces with auditory, visual, proprioceptive, mechanoreceptive, thermoreceptive, and equilibrioceptive modalities.

2. Discussion of the Related Art

Virtual reality systems are computer-based systems that provide experiences to a participant acting in a simulated environment that forms a three dimensional virtual world. These systems are used in several different applications such as commercial flight simulators, entertainment systems, computer games and video arcade games to name a few.

In virtual reality systems, the participant typically wears a head-mounted device that enables viewing of a virtual reality world generated by the computer. The system also includes an interaction means, such as a pointing device or specially configured glove containing sensors, for interacting with objects in the virtual world. In somewhat sophisticated systems, a data generating body suit, containing sensors and vibrating actuators, may be provided so that the user can influence and receive feedback from objects in the virtual world.

In recent years, owing to a substantial increase in the performance of digital computing hardware and concomitant software improvements, it has become possible to simulate sophisticated three-dimensional computerized environments. Such "immersive digital environments" have become ubiquitous in modern life, broadly deployed in such diverse fields as entertainment, commerce, training, simulation, visualization, and remote presence. However, despite the rapid evolution of software capabilities, the commercial landscape of human-computer interfaces has changed little since the dawn of the personal computing era. A handful of traditional human-computer interface devices—such as the mouse and keyboard, touch screen, gamepad, and planar visual display—still predominate.

No known human-computer interface device has yet come close to achieving the long-held goal of enabling fully immersive (i.e. natural, full-body, and pan-sensory) interaction with a computerized environment. A full explication of the shortcomings of the existing state-of-the art is beyond the scope of this document, but a thorough search of the prior art will ascertain in known devices at least one of the following key performance deficiencies, among others:

Lack of generality: human-computer interfaces of the known art are typically built and programmed for a single narrow range of applications. These systems employ simplified simulation parameters to achieve a design that is conducive to their particular application, but are severely limited in general applicability. Such a design methodology tends to reduce mechanical and computational complexity for many tasks, but at the cost of compromising flexibility, adaptability, and economy of scale of the resultant systems.

Limited or no integration: human-computer interfaces of the known art generally incorporate only one or a small subset of human sensory modalities. At a minimum, auditory, visual, proprioceptive, mechanoreceptive, thermoreceptive, and equilibrioceptive modalities are required for an acceptable level of immersion, with the addition of the chemosensory (olfactory and gustatory) modality being preferred for increased immersion.

Only involve a small portion of the body: voluntary movement, the primary means by which humans affect their environment, occurs at virtually every part of the body. Furthermore, the entirety of the skin surface and musculature are embedded with somatosensory organs, which supply critical sensory information. Human-computer interfaces of the known art generally involve only a small portion of the body. Such a design is antithetical to natural simulation of environmental interactions.

Limited dynamic range and resolution: many human sensory organs are capable of perceiving a large dynamic range of stimulus amplitude and some also have very high spatial and/or temporal resolution. Human-computer interfaces of the known art struggle to match these performance requirements.

Bulky, heavy, intrusive: human-computer interfaces of the known art are largely too bulky and heavy to be practical, especially those that involve larger portions of the body or integrate multiple sensory modalities. Such interfaces may provide high quality sensory stimulation, but often introduce undesirable noise due to their intrinsic dynamics.

Even the best performing devices of the known art (and in fact particularly the best performing devices) are simply impractical, as well as being substantially uneconomical. Even if these devices did overcome all of the shortcomings listed above, they would still likely be incapable of broad application due to their prohibitive cost and complexity. Thus, there remains a significant need for an improved human-computer interface device enabling natural, full-body interaction with a computer-mediated environment.

SUMMARY OF THE INVENTION

In accordance with one embodiment, the present invention can be charactized as a human-computer interface system comprising an exoskeleton including a plurality of structural members coupled to one another by at least one articulation configured to apply a force to a body segment of a user, the exoskeleton comprising a body-borne portion and a point-of-use portion; the body-borne portion configured to be operatively coupled to the point-of-use portion; and at least one locomotor module including at least one actuator configured to actuate the at least one articulation, the at least one actuator being in operative communication with the exoskeleton.

In accordance with another embodiment, the present invention can be characterized as a method for using the human-computer interface system comprising fitting the user with the body-borne portion of the exoskeleton; permitting an authenticated user to enter a point-of-use enclosure; coupling the point-of-use portion of the exoskeleton fitted on the user to the point-of-use enclosure via at least one temporary coupling point; beginning simulation in response to receiving a signal from the user to begin simulation; ending simulation in response to receiving a signal from the user to end simulation; and decoupling the point-of-use portion of the exoskeleton from the point-of-use enclosure.

In accordance with a further embodiment, the present invention can be characterized as a human-computer interface system comprising a human-computer interface terminal coupled to a computer system, the human-computer interface terminal including a plurality of input transducers configured to receive input from a user and to transduce the input to a computer-interpretable user input state; the computer system configured to receive at least one input from the human-computer interface terminal, the computer system including a processor configured to receive a user input state and to map at least one element of the user input state to at least one corresponding element of a user avatar input state; the human-computer interface terminal including a plurality of output transducers configured to transduce a computer-interpretable user output state to stimulate at least one sensory system of the user; and a simulation engine configured to receive and process the user avatar input state and to output a user avatar output state and to map at least one element of the user avatar output state to corresponding elements of a user output state.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 is a block diagram of a locomotor module in accordance with one embodiment.

FIG. 4A is a side view of a right arm segment of an exoskeleton of the embodiment of FIG. 2.

FIG. 4B is a bottom view of a right arm segment of an exoskeleton of the embodiment of FIG. 2.

FIG. 5A is a front view of a right leg segment of an exoskeleton of the embodiment of FIG. 2.

FIG. 5B is a side view of a right leg segment of an exoskeleton of the embodiment of FIG. 2.

FIG. 6A is a front perspective view of a torso segment of an exoskeleton of the embodiment of FIG. 2.

FIG. 6B is a rear perspective view of a torso segment of an exoskeleton of the embodiment of FIG. 2.

FIG. 9 is a perspective view of a hand segment of an exoskeleton in accordance with one embodiment.

FIG. 17 is an exploded perspective view of an interface laminate in accordance with a second embodiment.

FIG. 21A is a bottom view of a fluidic distribution laminate in accordance with one embodiment. The inner surface of the fluidic distribution laminate is rendered as semi-transparent for clarity.

FIG. 21B is a sectional view of the fluidic distribution laminate of the embodiment of FIG. 21A.

FIG. 21C is an exploded view of the cross-section of FIG. 21B.

FIG. 22 is a sectional view through the same plane as the sectional view of FIG. 21B of an alternate embodiment of a fluidic distribution laminate.

FIG. 23A is a top view of a fluidic distribution laminate in accordance with one embodiment.

FIG. 23B is a sectional view of a ribbon assembly and fluidic connector of the fluidic distribution laminate of the embodiment of FIG. 23A.

FIG. 25 (FIG. 25A and FIG. 25B) is a block diagram of sensors and actuators of an interface laminate in accordance with a second embodiment.

FIG. 27A is a front perspective view of an interface garment in accordance with one embodiment. A cutaway shows a front perspective view of a body-borne portion of an exoskeleton and an intermediate layer in accordance with one embodiment.

FIG. 27B is a sectional view of the indicated portion of the interface garment of the embodiment of FIG. 27A through a plane orthogonal to the surface of the interface garment.

FIG. 28 is a sectional view through a simplified structural member of an interface garment illustrating the effect of a force applied to a portion of the inner surface of an intermediate layer bonded to said structural member in accordance with one embodiment.

FIG. 30 is a front perspective view of two point-of-use enclosures in accordance with one embodiment.

FIG. 31 is a flow diagram of events that constitute a user experience with a human-computer interface terminal of a whole-body human-computer interface in accordance with one embodiment of the present invention, as described here and above in FIGS. 1 through 30.

Figure 1:
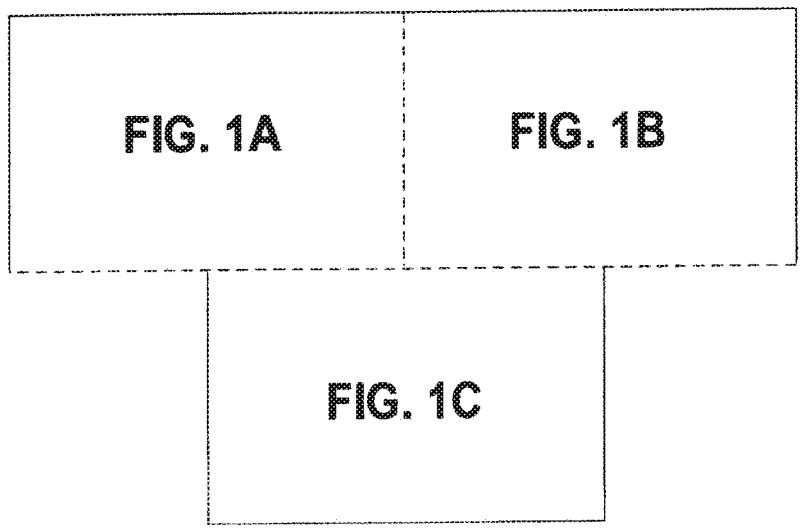
FIG. 1 (FIG. 1A, FIG. 1B and FIG. 1C) is a block diagram of a whole-body human-computer interface in accordance with one embodiment of the present invention.
Figure 1A:
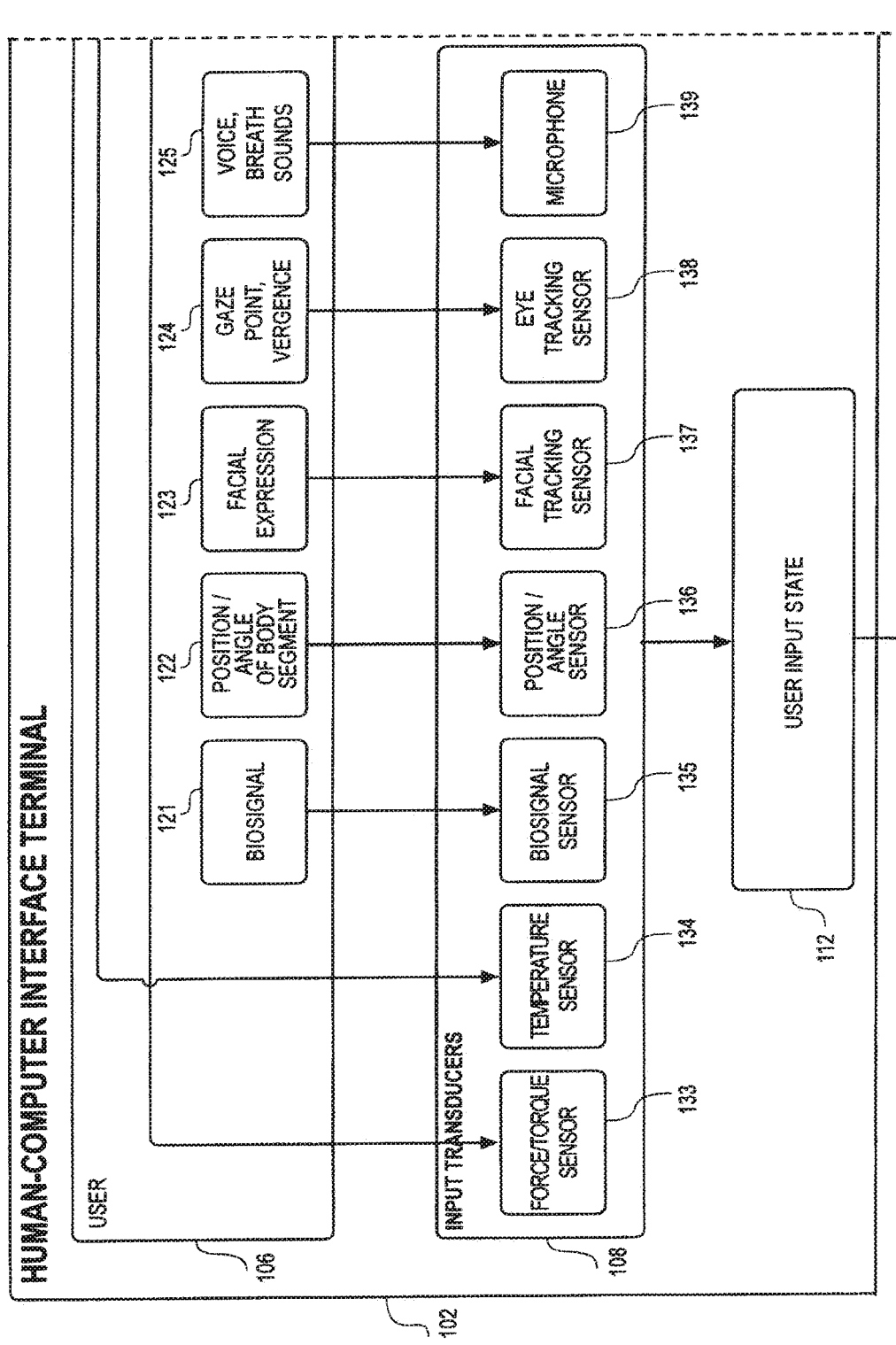

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or not described in detail to avoid obscuring aspects of the invention.

Overview

FIG. 1 shows a block diagram of a whole-body human-computer interface in accordance with one embodiment. Shown is a human-computer interface terminal 102 coupled to a computer system 104. The computer system 104, optionally, receives input states 120 from additional human-computer interface terminals associated with additional users.

The human-computer interface terminal 102 services at least one user, providing a user 106 that is sensed by a plurality of input transducers 108. The input transducers 108 receive input from the user 106, and transduce that input to a user input state 112 preferably defined at a discrete time step n. The human-computer interface terminal 102 receives a user output state 114 from the computer system 104, preferably defined at a discrete time step n+1. The user output state 114 is transduced by the output transducers 110 to an appropriate form so as to stimulate one or more of the user's 106 sensory systems.

Within the computer system 104, a computer-mediated environment process 116 receives the user input state 112, and maps one or more elements of that user input state to corresponding elements of a user avatar input state 150 via a mapping function 148. The user avatar input state 150 is received by game/simulation engine process 152 and used to calculate the interaction of the user avatar with a computer-mediated environment. Elements of the game/simulation engine process include, for example, simulations of physical processes such as electromagnetism, acoustics, and dynamics that will be familiar to those skilled in the relevant art. The game/simulation engine process 152 outputs a user avatar output state 154, and maps one or more elements of that user avatar output state 154 to corresponding elements of a user output state 114 via a mapping function 156.

Additional input states 120 include, in accordance with one embodiment, the input states of other human-computer interface terminals, or of other apparatus. Such apparatus optionally affect or are affected by the physical world, as in "mixed-reality" or "augmented-reality" applications; for example: a user controls a machine by means of a user avatar representing that machine. In this example, the machine contains one or more sensors which affect the state of computer-mediated environment process 116, and the machine contains one or more actuators which are affected by the user avatar output state 154. The user avatar is of any morphology, not necessarily resembling the user, for example: being an arbitrary humanoid, animal, machine, or abstract form. Different avatars may be useful or preferred for different applications.

Definitions and Conventions

Reference throughout this specification to "a user," "the user," or similar language means a user 106 of a human-computer interface terminal 102. "A wearer" or "the wearer" is a user who is wearing a portion of a human-computer interface terminal 102 on his or her body. All descriptions are with respect to a user in the standard anatomical position, unless otherwise specified.

Reference throughout this specification to an "inner" surface means a surface nearer to a user's skin. Conversely, an "outer" surface means a surface farther away from a user's skin.

All units of measure are defined in accordance with the International System of Units (SI).

As used herein, the term "two-point discrimination threshold" means: the minimum distance between two points of pressure stimuli applied to the skin surface of a user at which the user can reliably distinguish between said two points and a single point applying the same amount of total pressure. The two-point discrimination threshold should be understood to vary across the surface of the user's body based on the tactile sensitivity of a given portion of the user's skin.

As used herein, the term "pressure-pain threshold" means: the minimum pressure applied to the skin surface of a user sufficient to induce pain. Like the two-point discrimination threshold, the pressure-pain threshold should be understood to vary across the surface of the user's body.

As used herein, the term "workspace" means: the set of reachable configurations of a mechanical or biological kinematic chain.

As used herein, the term "Z-width" means: the range of mechanical impedances capable of being stably rendered by a haptic device.

As used herein, the term "mechanical ground" means: a point that is substantially fixed and immovable with respect to the user.

As used herein, the term "rigid structural material" means: steel, aluminum, titanium, amorphous metals, various other metals and metal alloys; thermoplastics and other polymers, oxide and non-oxide technical ceramics, other non-metals (such as glasses); composite constructions of the aforementioned metals and non-metals or other suitable materials, including carbon fiber reinforced polymer, fiberglass, and other reinforced polymers, sandwich type composites, and matrix-type composites; micro- and nano-structured constructions of the aforementioned metals and non-metals or other suitable materials, including cellular solids having a lattice, foam, honeycomb, or truss-based structure; or combinations of two or more of the above.

As used herein, the term "friction-reducing material" means: a solid, liquid, or other material having a low coefficient of friction in contact with a target material. Examples include: polytetrafluoroethylene or other fluoropolymers, or polyoxymethylene or other polymers; brass, bronze, steel, or other metals; composite constructions of the aforementioned metals and polymers or of other metals, polymers, ceramics, glasses, or other materials; liquid lubricants such as oil or grease; or combinations of two or more of the above.

As used herein, the term "variable stiffness material" means: a material whose stiffness can be controllably varied—as by electrorheological, magnetorheological, fluidic, thermal, mechanical, electromagnetic, or other means, or by combinations of two or more of the above.

As used herein, the term "contractile material" means: a metal, ceramic, polymer or other material that changes shape or size when exposed to varying temperatures, electric currents, or other stimuli, including: copper-based shape-memory alloys, nickel-titanium-based shape-memory alloys, or other types of shape-memory alloys; dielectric electroactive polymers, ionic electroactive polymers and polymer-metal composites, ferroelectric polymers, electrostrictive graft polymers, liquid crystal polymers, or another of the class of electroactive polymers; piezoelectric ceramics, piezoelectric polymers, or other piezoelectric materials; carbon nanotubes, graphene, or other carbon-based compounds; nylon fibers, polyethylene fibers or other polymer fibers; polydimethylsiloxane or other elastomers; or vanadium oxide; or combinations of two or more of the above.

As used herein, the term "flexible substrate material" means: a flexible and substantially gas and liquid impermeable material, preferably suitable for use with a soft lithography process. Examples include: polydimethylsiloxane or other elastomers; metal-filled elastomers or other metal-elastomer composites; ceramic-elastomer composites; carbon-filled elastomers or other carbon-elastomer composites; watertight fabrics, including metalized fabrics; or combinations of two or more of the above.

Exoskeleton

Figure 2:
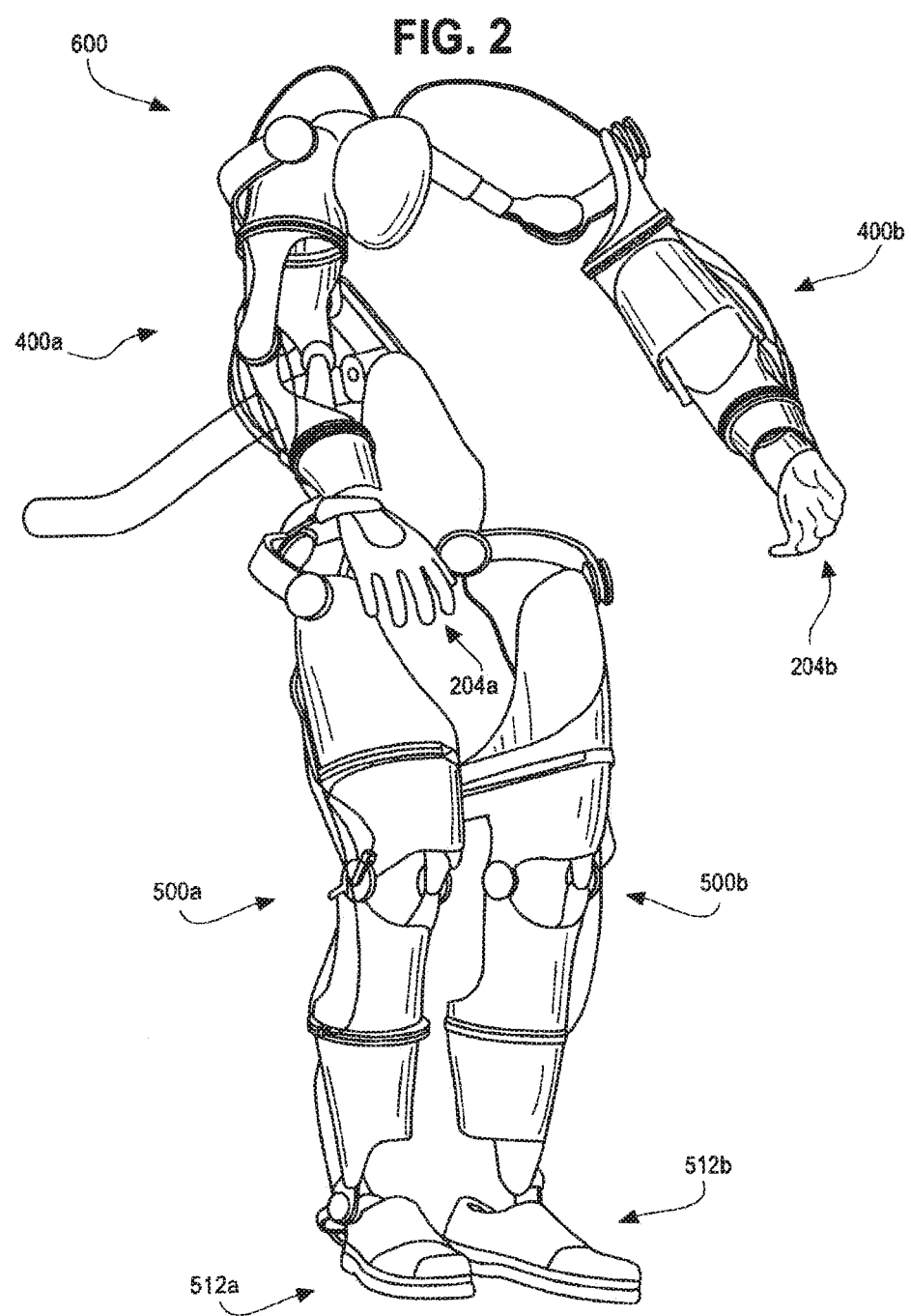
FIG. 2 is a front perspective view of an exoskeleton in accordance with one embodiment.
Figure 7:
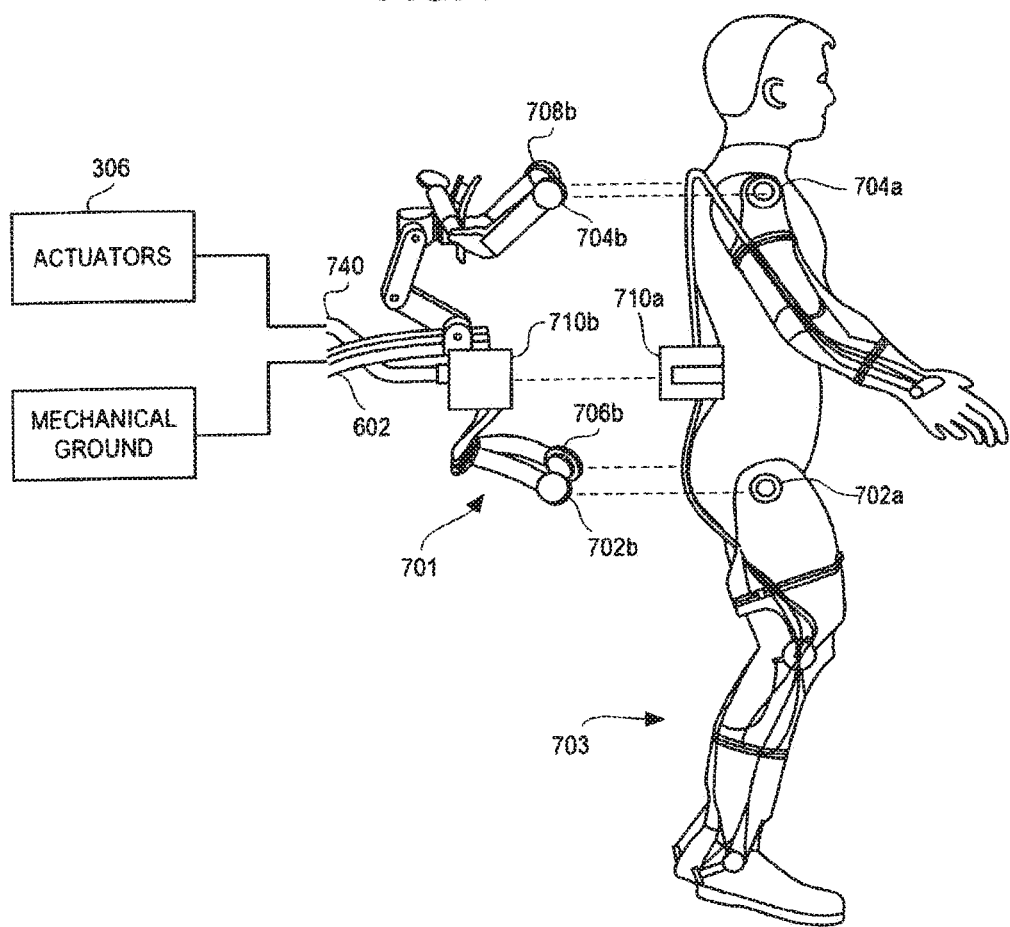
FIG. 7 is a side view illustrating the coupling of a body-borne portion of an exoskeleton to a point-of-use portion of an exoskeleton to form an operative exoskeleton in accordance with one embodiment.

Referring to FIG. 1, in a preferred embodiment of the present invention, a human-computer interface terminal 102 comprises an exoskeleton. Said exoskeleton comprises one or more actuated articulations 141 configured to apply a net force or torque 127 to a body segment of user 106. In various embodiments, an exoskeleton also comprises force or torque sensors 133, position or angle sensors 136, or biosignal sensors 135. FIG. 2 generally depicts one embodiment of an exoskeleton. A plurality of structural members are each coupled to at least one other structural member by one or more articulations. A plurality of locomotor modules (300 of FIG. 3) are configured to actuate one or more articulations of the exoskeleton. Referring now to FIG. 7, in a preferred embodiment, an exoskeleton comprises a body-borne portion 703 operatively coupled to point-of-use portion 701 by means of one or more temporary coupling points 702a-710b.

Structural Members and Articulations

A structural member is a load-bearing element configured to provide a substantially rigid load path. In one embodiment, structural members of an exoskeleton are composed in part or whole of a rigid structural material. In another embodiment, one or more structural members are composed in part or whole of a variable stiffness material.

Structural members are generally shaped to minimize interference with a wearer's workspace while maintaining sufficient stiffness to provide a substantially rigid load path. In one embodiment, a structural member is shaped to enclose one or more portions of a wearer's body. Said member's inner surface is preferably substantially parallel to the wearer's skin surface throughout. Portions of the member are omitted around articulations of an exoskeleton where necessary to prevent interference with motion of the exoskeleton or wearer. Structural members of this type are preferred to be employed in the extremities of an exoskeleton, as shown in FIGS. 4A-B and FIGS. 5A-B in accordance with one embodiment.

Structural members are preferred to be as thin as possible while maintaining sufficient stiffness to provide a substantially rigid load path, particularly those located in extremities of an exoskeleton. In a preferred embodiment, the thickness of structural members 401a/b, 405a/b (FIGS. 4A-B) and 501a/b, 505a/b (FIGS. 5A-B) is between 0.20 and 5.0 mm. In a more preferred embodiment the thickness of structural members 401a/b, 405a/b (FIGS. 4A-B) and 501a/b, 505a/b (FIGS. 5A-B) is between 0.50 and 2.5 mm. In an even more preferred embodiment, the thickness of structural members 401a/b, 405a/b (FIGS. 4A-B) and 501a/b, 505a/b (FIG. 5A-B) is between 1.0 and 2.0 mm.

Articulations of an exoskeleton enable it to move with its wearer. In a preferred embodiment, the articulations of an exoskeleton are configured and positioned so as to permit an aggregate range of motion approximately equal to that of a wearer's body. Many articulations are preferably positioned such that a center of rotation of the articulation is aligned with an average (best-fit) center of rotation of a corresponding biological joint.

Articulations are preferred to comprise revolute pairs where possible, due to their simplicity and robustness. Revolute articulations can be of a "pin type" having a center of rotation outside of the body of the wearer, or of a "rotary type" having a center of rotation inside of the body of the wearer. A person skilled in the art will recognize that other basic kinematic pairs (such as prismatic, cylindrical, screw, planar, and spherical pairs) can be substituted individually or in combination for some or all revolute articulations of an exoskeleton to produce motion similar to that of the joints of the embodiments described herein without departing from the scope of the present invention.

Figure 11:
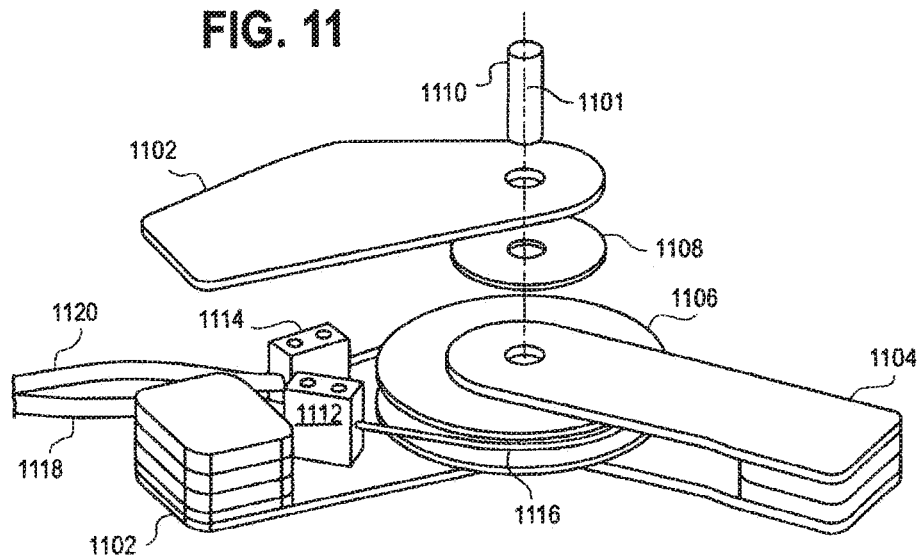
FIG. 11 is an exploded perspective view of a pin-type revolute articulation of an exoskeleton actuated by a tensile member assembly of a locomotor module in accordance with one embodiment.

Referring to FIG. 11, an exploded view of a pin-type articulation of a structural exoskeleton actuated by a tensile member assembly of a locomotor module is shown in accordance with one embodiment. A proximal structural member 1102 is coupled to a distal structural member 1104 by means of a pin 1110 so as to permit a single degree of rotational freedom about axis 1101. The distal structural member 1104 comprises a pulley 1106. A tensile member 1116 is coupled to the pulley 1106 via an inside termination (not shown), and to a first housing 1118 and second housing 1120. Housings 1118 and 1120 are coupled to distal structural member 1104 by means of housing terminations 1112 and 1114 respectively. Tensile load applied to either end of tensile member 1116 will produce a rotational displacement of distal structural member 1104 relative to proximal structural member 1102 in opposite directions. Bushing or bearing element 1108 prevents undue friction between proximal structural member 1102 and distal structural member 1104.

Figure 12A:
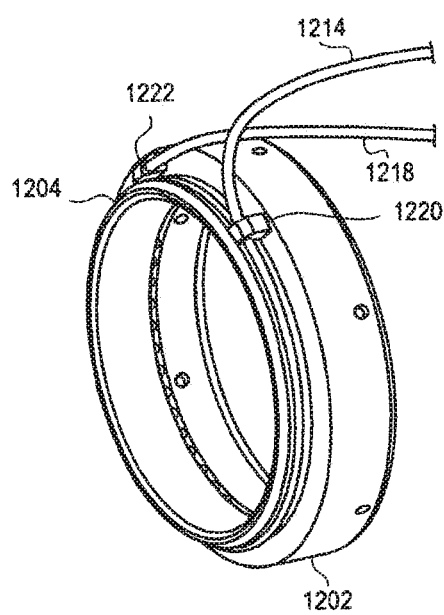
FIG. 12A is a perspective view of a rotary-type revolute articulation of an exoskeleton actuated by a tensile member assembly of a locomotor module in accordance with one embodiment.
Figure 12B:
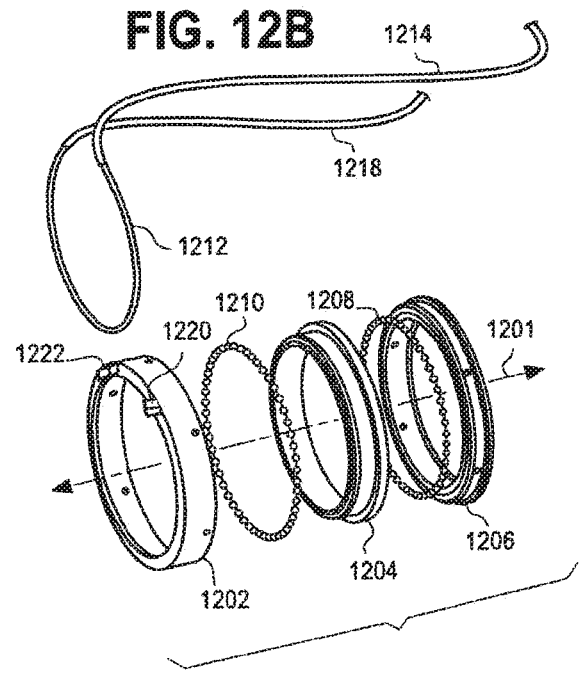
FIG. 12B is an exploded perspective view of the rotary-type revolute articulation of the embodiment of FIG. 12A.

Referring to FIG. 12A, a rotary-type articulation of a structural exoskeleton actuated by a tensile member assembly of a locomotor module is shown in accordance with one embodiment. FIG. 12B shows an exploded view of the embodiment of FIG. 12A. A distal structural member 1204 is coupled to a proximal structural member 1206 via a ball bearing and cage assembly 1208. A retaining member 1202 is coupled first to distal structural member 1204—via a ball bearing and cage assembly 1210—and second to proximal structural member 1206. The combined assembly of elements 1202-1210 permits a single degree of rotational freedom about axis 1201. A tensile member 1212 is coupled to distal structural member 1204 via an inside termination (not shown), and to a first housing 1214 and second housing 1218. Housings 1214 and 1218 are coupled to retaining member 1202 by means of housing terminations 1220 and 1222 respectively. Tensile load applied to either end of tensile member 1212 will produce a rotational displacement in opposite directions of distal structural member 1204 relative to proximal structural member 1206 and retaining member 1202.

A tensile member of a tensile member power transmission assembly comprises a monofilament or multi-strand construction in various embodiments. A tensile member preferably comprises a flexible material having a high tensile strength, and capable of being formed into strands. Such contemplated materials include: steel, or other metals; polyethylene (including ultra-high molecular weight polyethylene), aromatic polyamide, or other polymers; glass fiber; carbon fiber or other carbon-based materials; or a combination of two or more of the above. A housing of a tensile member power transmission assembly preferably comprises a rigid structural material configured to be flexible in bending, but substantially stiff under compressive load. In one variation, said rigid structural material is arranged in a continuous structure, such as a single-, or multiple-helix wrapped around a tensile member. In another variation, said rigid structural material is arranged in a discontinuous structure, such as a plurality of close-packed tubes enclosing a tensile member.

A housing of a tensile member power transmission assembly preferably comprises an element, such as a coating or liner preferably comprising a friction-reducing material, configured to reduce friction between the housing and its tensile member. Tensile member diameter is preferably selected for a given tensile member such that the material elastic limit of the tensile member is greater than or equal to: the stress produced on said tensile member by the maximum allowed torque of the articulation to which it is coupled, multiplied by a safety factor of not less than 3.

In one embodiment, an articulation is of a continuum type e.g. comprising a "snake arm" or "elephant trunk" structure having a plurality of members coupled to a plurality of actuated degrees of freedom to form a hyper-redundant manipulator. In a second embodiment, one or more articulations are composed in part or whole of a variable stiffness material. In a third embodiment, an articulation comprises a multi-layer sliding spring mechanism configured to produce a bending torque in response to a linear input force.

Joints of an exoskeleton comprise one or more articulations. Embodiments of each joint are contemplated in which said joint comprises each of the following variations: a kinematic chain having fewer degrees of freedom than the biological joint or joints whose motion it is configured to emulate; a kinematic chain having an equal number of degrees of freedom to the biological joint or joint whose motion it is configured to emulate; a kinematic chain having a greater number of degrees of freedom than the biological joint or joints whose motion it is configured to emulate (i.e.

a redundant kinematic chain); or a kinematic chain having a significantly greater number of degrees of freedom than the biological joint or joints whose motion it is configured to emulate (i.e. a hyper-redundant kinematic chain). Despite its increased complexity, a redundant or hyper-redundant kinematic chain can provide an advantage in some embodiments by, for example: reducing potential kinematic singularities; increasing range or fidelity of motion; or permitting multiple configurations of a joint for a single end effector position. By way of example, a limited number of the aforementioned variations are described below for each joint; however, all suitable variations are contemplated for each joint, including kinematic chains having anywhere from zero to an infinite number of degrees of freedom in various configurations.

One or more joints described herein may be omitted from an exoskeleton without departing from the scope of the present invention; however, omission of joints is anticipated to have a significant negative impact on the controllability and performance of an exoskeleton having one or more omitted joints. Additionally, omission of joints severely constrains the forces or torques that can safely be applied to the body of the wearer, as all forces or torques applied by the exoskeleton must be transmitted through the wearer's musculoskeletal system where joints are omitted.

Referring now to FIG. 2, in a preferred embodiment, the combined structure of an arm segment 400*a/b* and any apparatus by which it is coupled to mechanical ground is sufficiently stiff to maintain a deflection of less than 30 mm under the following conditions: a load of 100 N is applied at the extreme distal point of arm segment 400*a/b* (e.g. the hand) along an axis perpendicular to the proximal-distal axis of the segment; deflection is measured as the displacement of the extreme distal point along said axis; all articulations of the structure are locked. In a more preferred embodiment, said deflection is less than 10 mm. In a preferred embodiment, the combined structure of a leg segment 500*a/b* and any apparatus by which it is coupled to mechanical ground is sufficiently stiff to maintain a deflection of less than 15 mm under the same test conditions described hereinabove. In a more preferred embodiment, said deflection is preferably less than 5.0 mm.

FIGS. 6A and 6B show a front and rear perspective view of a torso segment 600 of an exoskeleton in accordance with one embodiment. Torso segment 600 comprises: pelvic structural member 604 and thoracic structural member 605, optionally coupled via a thoracic spinal joint 660; shoulder joints 670*a*, 670*b* or a portion thereof; and hip joints 650*a*, 650*b* or a portion thereof. Torso segment 600 of an exoskeleton is preferably coupled to mechanical ground by means of an elongated structural member 602. Alternately, any other suitable portion of an exoskeleton can be coupled to mechanical ground.

Elongated structural member 602 is optionally coupled to mechanical ground via a motion simulator (see "Motion Simulator" section) or other apparatus. Length of elongated structural member 602 is preferably selected to position any structures to which it is coupled (e.g. a motion simulator, actuator array, or other apparatus) outside or substantially outside the wearer's workspace.

In one embodiment, a pelvic structural member 604 or a thoracic structural member 605 are secured to the body of the wearer by an element (not shown) that encircles the wearer's pelvis or thorax respectively. In one variation of this embodiment, the encircling element comprises one or more flexible portions, such as a fabric strap, a harness, a vest, or a belt. In another variation, the encircling element comprises one or more portions consisting of a stiff structural material, such as a stiff band or plate.

Pelvic structural member 604 and thoracic structural member 605 are optionally coupled via thoracic spinal joint 660. Thoracic spinal joint 660 is preferred to comprise a serial manipulator having at least 5 degrees of freedom. In an even more preferred embodiment, thoracic spinal joint 660 comprises a serial manipulator having 5, 6, or 7 revolute articulations arranged in the manner of a robotic arm. FIGS. 6A and 6B show an exemplary embodiment of a serial manipulator of this type. Articulation 619 is coupled to articulation 620. Articulation 620 is coupled, via structural member 608, to articulation 622. Articulation 622 is in turn coupled to 3 degrees of freedom wrist assembly 624-628 via structural member 610. Lengths of structural members 608 and 610 are preferably selected to enable full spinal flexion (i.e. where the wearer is touching his or her toes) at or near maximum extension of thoracic spinal joint 660. Other variations of the aforementioned embodiment of thoracic spinal joint 660 producing a similar aggregate range of motion are contemplated, including: variations wherein revolute articulations 619-628 are arranged in a different order; variations wherein some or all revolute articulations 619-628 are replaced with articulations comprising other basic kinematic pairs (such as prismatic, screw, or spherical pairs); variations wherein one or more portions of thoracic spinal joint 660 are arranged in a parallel, rather than serial, kinematic configuration; and variations wherein one or more portions of a thoracic spinal joint 660 comprise a continuum-type manipulator. Additionally, the head of the wearer can optionally be coupled to one or more portions of an exoskeleton by a cervical spinal joint (not shown in FIGS. 6A-B), preferably of a substantially similar design to thoracic spinal joint 660 as described hereinabove.

FIGS. 6A and 6B show a right and left shoulder joint 670*a* and 670*b* in accordance with one embodiment. Note that right shoulder joint 670*a*, which will be described herein, is substantially equivalent to left shoulder joint 670*b* mirrored across the median plane of the body. In one embodiment, shoulder joint 670*a* comprises a sternoclavicular joint 672*a* and a glenohumeral joint 674*a*. Sternoclavicular joint 672*a* comprises: a first articulation 630*a* configured to emulate motion of the wearer's scapula during scapular elevation and depression, and a second articulation 632*a* configured to emulate motion of the wearer's scapula during scapular protraction and retraction. Articulations 630*a* and 632*a* preferably each comprise a pin-type revolute articulation. Said pin-type revolute articulations preferably have an axis of rotation substantially aligned with the average axis of rotation of the sternoclavicular joint of the wearer in scapular elevation/depression and scapular protraction/retraction respectively.

The average axis of rotation of the wearer's scapula during scapular protraction/retraction is not readily accessible from many of the preferred locations of sternoclavicular joint 672*a*. Therefore, a variety of means are contemplated to align articulation 632*a* with this average axis of rotation. A first contemplated means of alignment comprises adding a third articulation 634*a* to sternoclavicular joint 672*a* so as to enable three-degree-of-freedom positioning of glenohumeral joint 674*a*. A second contemplated means of alignment comprises placing articulation 632*a* above the head of the wearer. A third contemplated means of alignment comprises providing an external-center-of-rotation mechanism for articulation 632*a*. Said external-center-of-rotation mechanism comprises, for example, a mechanism located behind the wearer's back producing a simultaneous rotation and translation that substantially replicates the motion of the wearer's sternoclavicular protraction and retraction without the need for a shared axis of rotation.

In an alternate embodiment of a sternoclavicular joint 672a, a sternoclavicular joint 672a comprises only a single articulation 630a emulating elevation and depression of the wearer's scapula. Articulations providing for scapular protraction and retraction are omitted (owing to the relatively small motion of protraction and retraction), and the wearer's scapula is allowed to protract and retract freely relative to sternoclavicular joint 672a. In a variation of this embodiment, articulation 630a comprises a prismatic or screw pair or other pair capable of producing linear motion, rather than a revolute pair.

Glenohumeral joint 674a preferably comprises three revolute articulations having mutually intersecting axes of rotation, which are configured to emulate the motion of the glenohumeral joint of the wearer. In the embodiment of FIGS. 6A and 6B, torso segment 600 comprises two pin-type revolute articulations 636a and 638a of a glenohumeral joint 674a. A third rotary-type revolute articulation 414, located on the upper arm, is shown in FIGS. 4A-B. In this embodiment, articulations 636a and 638a are coupled by means of an arc-shaped structural member 614a, and emulate via a compound motion the wearer's glenohumeral flexion/extension and adduction/abduction. Arc-shaped structural member 614a is preferred to be shaped so as to project as little as possible from the shoulder of the wearer without limiting the range of motion of the wearer or the exoskeleton. Articulation 414 (FIGS. 4A-B) emulates the motion of the wearer's glenohumeral internal and external rotation. Articulation 414 is coupled to the rest of glenohumeral joint 670a by an upper arm structural member 402 (FIGS. 4A-B). Axes of rotation of articulations 636a, 638a, and 414 (FIGS. 4A-B) preferably approximately intersect the center of rotation of the glenohumeral joint of the wearer. In an alternate embodiment, a glenohumeral joint comprises three revolute articulations with mutually intersecting axes of rotation, all of which are located in a torso segment of an exoskeleton.

Due to the large range of motion of the human glenohumeral joint, careful attention must be paid to placement of each articulation in order to avoid or minimize kinematic singularities. For example, in the embodiment of FIGS. 6A and 6B, the axes of rotation of articulations 636a and 638a are angled so as to place kinematic singularities induced by motion of the wearer's shoulder in rarely used portions of the wearer's workspace. In some contemplated embodiments, additional degrees of freedom are added to shoulder joint 670a in order to resolve or mitigate kinematic singularities in the wearer's workspace.

FIGS. 6A and 6B show a left and right hip joint 650a and 650b in accordance with one embodiment. Note that right hip joint 650a, which will be described herein, is substantially equivalent to left hip joint 650b mirrored across the median plane of the body. Hip joint 650a preferably comprises three revolute articulations having mutually intersecting axes of rotation, which are configured to emulate the motion of the hip joint of the wearer. In the embodiment of FIGS. 6A and 6B, torso segment 600 comprises two pin-type revolute articulations 616a and 618a of a hip joint 650a. A third rotary-type revolute articulation 514, located on the upper leg, is shown in FIGS. 5A-B. In this embodiment, articulations 616a and 618a are coupled by means of an arc-shaped structural member 617a, and emulate via a compound motion the wearer's hip flexion/extension and adduction/abduction. Arc-shaped structural member 617a is preferred to be shaped so as to project as little as possible from the hip of the wearer without limiting the range of motion of the wearer or the exoskeleton. Articulation 514 (FIGS. 5A-B) emulates the wearer's hip internal and external rotation. Articulation 514 is coupled to the rest of hip joint 650a by an upper leg structural member 502 (FIGS. 5A-B). Axes of rotation of articulations 616a, 618a, and 514 (FIGS. 5A-B) preferably approximately intersect the center of rotation of the hip joint of the wearer. In an alternate embodiment, a hip joint comprises three revolute articulations with mutually intersecting axes of rotation, all of which are located in a torso segment of an exoskeleton.

Though the human hip joint does not have as large a range of motion as the human glenohumeral joint, careful attention must still be paid to placement of each articulation in order to avoid or minimize kinematic singularities. For example, in the embodiment of FIGS. 6A and 6B, the axes of rotation of articulations 616a and 618a are angled so as to place kinematic singularities induced by motion of the wearer's hip in rarely used portions of the wearer's workspace. In some contemplated embodiments, additional degrees of freedom are added to hip joint 650a in order to resolve or mitigate kinematic singularities in the wearer's workspace.

Figure 8:
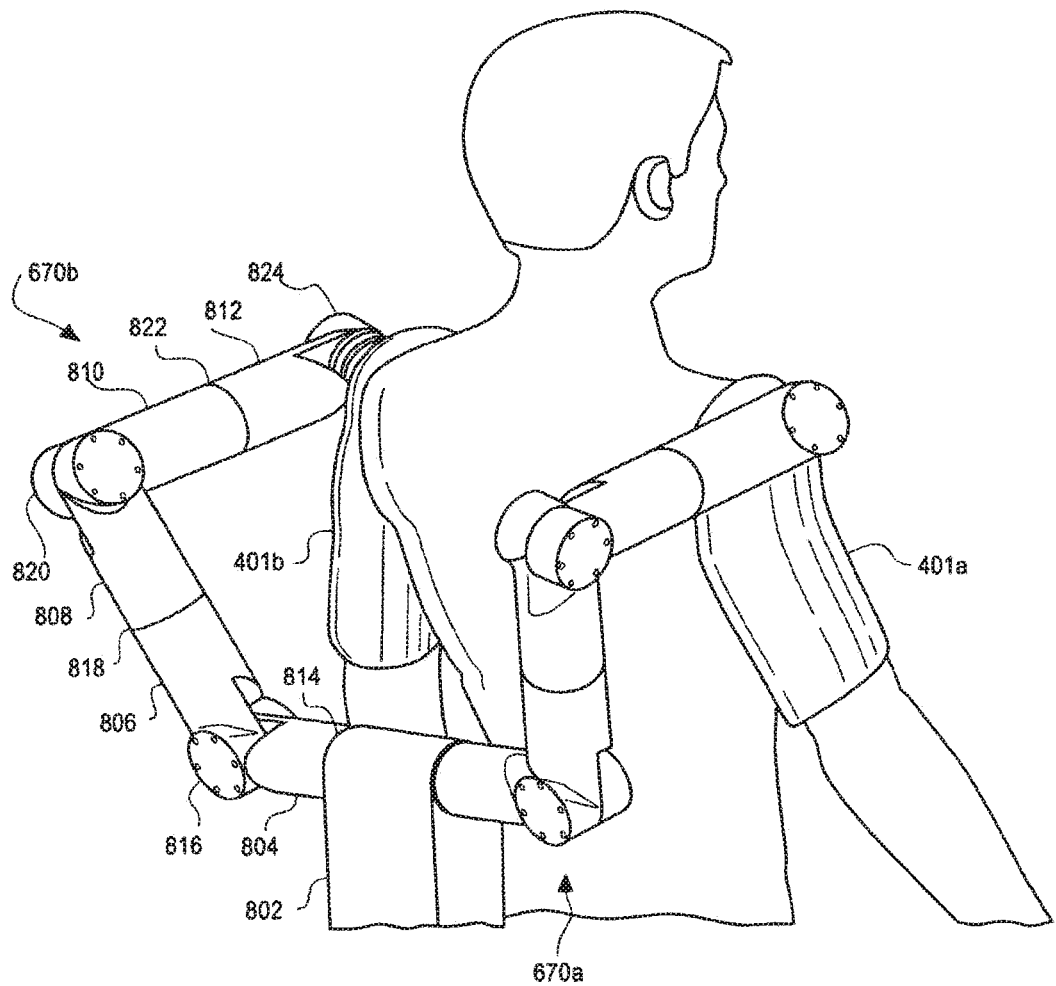
FIG. 8 is a rear perspective view of a torso segment of an exoskeleton in accordance with one embodiment.

FIG. 8 shows one embodiment of a torso segment 600 of an exoskeleton in which a shoulder joint 670a/b comprises a serial manipulator having at least 5 degrees of freedom. In a preferred embodiment, a serial manipulator of a shoulder joint 670a/b comprises 6 or 7 revolute articulations arranged in the manner of a robotic arm. Said serial manipulator comprises a base 802 coupled to structural member 804 via an articulation 814. Structural member 804 is in turn coupled to structural member 806 via articulation 816. Structural member 806 is coupled to structural member 808 via articulation 818. Structural member 808 is in turn coupled to structural member 810 via articulation 820. Structural member 810 is coupled to structural member 812 via articulation 822. Lastly, the serial manipulator is coupled to an upper arm structural member 401b by means of articulation 824.

Other variations of a serial manipulator of a shoulder joint 670a/b producing a similar aggregate range of motion are contemplated, including: variations wherein revolute articulations 814-824 are arranged in a different order; variations wherein some or all revolute articulations 814-824 are replaced with articulations comprising other basic kinematic pairs (such as prismatic or spherical pairs); variations wherein one or more portions of a serial manipulator are arranged in a parallel, rather than serial, kinematic configuration; and variations wherein one or more portions of a serial manipulator comprise a continuum-type manipulator. In one embodiment, a hip joint 650a/b (FIGS. 6A-B) of an exoskeleton comprises a serial manipulator of the embodiment of FIG. 8, or of another suitable type as described hereinabove.

Referring now to FIGS. 6A-B, in one embodiment of a torso segment 600 of an exoskeleton, thoracic spinal articulation 660 is omitted, and thoracic structural member 605 is not directly coupled to the wearer's torso. Structural member 605 instead comprises a back support capable of supporting the wearer's thorax when sitting or lying down, but configured not to otherwise restrict the wearer's range of motion. In one embodiment, a head support is also included. Said head support is preferably configured to support the wearer's head when sitting or lying down, but not to otherwise restrict the wearer's range of motion. In another embodiment, a back support or head support comprises a revolute articulation configured to allow the wearer's spine to extend while still supporting the wearer's head or back against the force of gravity.

A right arm segment 400a of an exoskeleton can be seen, in accordance with one embodiment, in FIGS. 4A-4B. Note that left arm segment 400b, while not shown in FIGS. 4A-4B, is substantially equivalent to right arm segment 400a mirrored across the median plane of the body. An upper arm structural member 401a partially or completely enclosing the wearer's upper arm is preferably coupled to a shoulder joint 670a (FIGS. 6A-B) of a torso segment 600 (FIGS. 6A-B). In one embodiment of a right arm segment 400a, upper arm structural member 401a is bisected somewhere along the length of the wearer's upper arm substantially perpendicular to the proximal-distal axis by rotary-type articulation 414 of glenohumeral joint 674a (FIGS. 6A-B) to form proximal and distal upper arm structural members 402 and 404. In an alternate embodiment of glenohumeral joint 674a (FIGS. 6A-B), as described hereinabove, internal and external rotation of the wearer's shoulder is enabled by an articulation of torso segment 600 (FIGS. 6A-B), and thus no bisection of upper arm structural member 401a is required.

Portions of upper arm structural member 401a are preferably omitted around the wearer's glenohumeral joint and elbow joint to avoid interfering with the motion of these joints. The proximal boundary 436 of upper arm structural member 401a is preferably delimited approximately by the acromion process of the wearer's scapula. Proximal edge 438 of upper arm structural member 401a is preferably shaped so as to avoid the wearer's underarm. Distal edge 440 preferably follows approximately the arc formed on the wearer's upper arm by the edge of skin-to-skin contact of the wearer's forearm and upper arm at the point of extreme flexion of the wearer's elbow. Distal boundary 442 is preferably delimited approximately by the olecranon process of the wearer's elbow. A portion of upper arm structural member 401a or articulation 414 is preferred to completely encircle the wearer's upper arm to lend additional torsional rigidity to the structural member; however, embodiments are contemplated of upper arm structural member 401a where the structural member or its articulations only partially encircle the wearer's upper arm. In one example, articulation 414 only partially encircles the wearer's upper arm. In one embodiment, an upper arm structural member 401a comprises a length adjustment mechanism (not shown), preferably located near elbow joint 415a. An upper arm structural member 401a optionally also comprises a mechanism that adjusts upper arm structural member's 401a angle relative to forearm structural member 405a to account for variation in carrying angle of a wearer's elbow. Said angle adjustment mechanism is preferably located near elbow joint 415a.

A distal portion of upper arm structural member 401a is coupled by means of an elbow joint 415a to a forearm structural member 405a partially or completely enclosing the wearer's forearm. Elbow joint 415a preferably comprises one or more pin-type articulations 416 having an axis of rotation substantially aligned with the average axis of rotation of the elbow joint in flexion/extension. Articulations 416 of elbow joint 415a are preferably configured with pin-type revolute articulations both medial and lateral to the wearer's elbow for increased strength and rigidity. Alternately, elbow joint 415a comprises only a single pin-type revolute articulation, preferably located lateral to elbow joint 415a. Forearm structural member 405a is preferably bisected somewhere along the length of the wearer's forearm substantially perpendicular to the proximal-distal axis by a rotary-type articulation 418 allowing for pronation and supination of the wearer's wrist. Bisection of forearm structural member 405a forms proximal and distal forearm structural members 406 and 408. In one embodiment, a forearm structural member 405a comprises a length adjustment mechanism (not shown), preferably located near elbow joint 415a.

Portions of forearm structural member 405a are preferably omitted around the wearer's elbow joint and wrist joint to avoid interfering with the motion of these joints. The proximal boundary 444 of forearm structural member 405a is preferably delimited approximately by the olecranon process of the wearer's elbow (with some additional room left between the distal edge of upper arm structural member 401a and the proximal edge of forearm structural member 405a to allow for full extension of the wearer's elbow). Proximal edge 446 of forearm structural member 405a preferably follows approximately the arc formed on the wearer's forearm by the edge of skin-to-skin contact of the wearer's forearm and upper arm at the point of extreme flexion of the wearer's elbow. Distal edge 447 of forearm structural member 405a is preferably shaped so as to leave an opening of a sufficient size to permit passing the hand of the wearer through during donning and removal of the exoskeleton. Alternately, a structural discontinuity sufficient to permit passing the hand of the wearer through and an accompanying fastener is included in the distal portion of forearm structural member 405a. Distal boundary 448 is preferably approximately delimited by the ulnar styloid process of the wearer's wrist. A portion of forearm structural member 405a or articulation 418 is preferred to completely encircle the wearer's forearm to lend additional torsional rigidity to the structural member; however, embodiments are contemplated of forearm structural member 405a where the structural member or its articulations only partially encircle the wearer's forearm. In one example, articulation 418 only partially encircles the wearer's forearm.

A distal portion of forearm structural member 405a is coupled by means of a wrist joint 419a to an opisthenar structural member 412 partially or completely overlying the wearer's second through fifth metacarpals. In a preferred embodiment, wrist joint 419a comprises a first pin-type revolute articulation 420 coupled to a second pin-type revolute articulation 422 by means of structural member 421. An axis of rotation of articulation 420 is preferably substantially aligned with the average axis of rotation of the wearer's wrist in flexion/extension. An axis of rotation of articulation 422 is preferably substantially aligned with the average axis of rotation of the wearer's wrist in radial/ulnar deviation. Structural member 421 is preferred to be shaped so as to project as little from the wrist of the wearer as possible without limiting the range of motion of the wearer or the exoskeleton.

The proximal boundary 450 of opisthenar structural member 412 is preferably delimited approximately by the radial styloid process of the wearer's wrist. Distal boundary 452 is preferably delimited approximately by the proximal edge of the metacarpophalangeal joints of the wearer's second through fifth metacarpals. Medial and lateral boundaries of opisthenar structural member 412 are preferably delimited approximately by the outside edges of the wearer's second and fifth metacarpal respectively. In one embodiment, an opisthenar structural member 412 comprises a length adjustment mechanism (not shown), preferably located near wrist joint 419a. In a first embodiment, a hand segment 204a/b (FIG. 2) of an exoskeleton comprises an opisthenar structural member 412 and a means of securing the opisthenar structural member 412 to the wearer's hand (not shown in FIGS. 4A-4B). Said means can, for example, comprise a strap, band, glove, brace, or similar element.

Referring now to FIG. 9, a second embodiment of a hand segment 204a/b is shown. Opisthenar structural member 412 is coupled to thumb proximal phalangeal structural member 920 via thumb metacarpophalangeal joint 939. Thumb metacarpophalangeal joint 939 preferably comprises two pin-type revolute articulations 942 and 944, whose compound motion emulates flexion/extension and abduction/adduction of the metacarpophalangeal joint of the wearer's thumb. Articulation 934 is coupled to articulation 942 via an arc-shaped structural member 919. Arc-shaped structural member 919 is preferred to be shaped so as to project as little as possible from the hand of the wearer without limiting the range of motion of the wearer or the exoskeleton.

Thumb proximal phalangeal structural member 920 is coupled to thumb intermediate phalangeal structural member 922 via thumb proximal interphalangeal joint 935. Thumb proximal interphalangeal joint 935 preferably comprises one or more pin-type articulations 936, 937 having an axis of rotation substantially aligned with the average axis of rotation of the proximal interphalangeal joint of the wearer's thumb in flexion/extension. Articulations 936, 937 of thumb proximal interphalangeal joint 935 are preferably configured with pin-type revolute articulations both medial and lateral to the wearer's thumb for increased strength and rigidity. Alternately, thumb proximal interphalangeal joint 935 comprises only a single pin-type revolute articulation. Thumb intermediate phalangeal structural member 922 is coupled to thumb distal phalangeal structural member 924 via thumb distal interphalangeal joint 938. Thumb distal interphalangeal joint 938 is preferably substantially similar to thumb proximal interphalangeal joint 936 as described hereinabove.

Opisthenar structural member 412 is coupled to index finger proximal phalangeal structural member 914 and a middle finger proximal phalangeal structural member (not shown) via finger metacarpophalangeal joint 925. Finger metacarpophalangeal joint 925 preferably comprises: a first pin-type revolute articulation 928—having an axis of rotation substantially aligned with the average axis of rotation of the wearer's index finger in flexion/extension—coupled to a second pin-type revolute articulation 930—having an axis of rotation substantially aligned with the average axis of rotation of the wearer's index finger in abduction/adduction. Metacarpophalangeal joint 925 preferably also comprises: a third pin-type revolute articulation 926—having an axis of rotation substantially aligned with the average axis of rotation of the wearer's middle finger in flexion/extension—coupled by means of a metacarpophalangeal structural member 917 to a fourth pin-type revolute articulation (not shown)—having an axis of rotation substantially aligned with the average axis of rotation of the wearer's middle finger in abduction/adduction. Metacarpophalangeal structural member 917 is preferably positioned and shaped to project as little as possible from the hand of the wearer without limiting the range of motion of the wearer or the exoskeleton. In particular, metacarpophalangeal structural member 917 is preferably positioned and shaped to project as little as possible from the hand of the wearer without colliding with the top of the proximal phalanx of the wearer's index finger in simultaneous hyperextension of the metacarpophalangeal joint of the wearer's index finger and flexion of the metacarpophalangeal joint of the wearer's middle finger.

Structural members 914-918 and joints 931 and 933 of index finger segment 950, as well as the equivalent structural members and joints of a middle finger segment (not shown) are preferably substantially similar to thumb structural members 920-924 and thumb joints 936 and 938, as described hereinabove. Structural members, joints, and articulations of a pinky finger and ring finger (not shown) are preferably substantially similar to the structural members, joints, and articulations of the index and middle finger segments respectively, as described hereinabove.

In a third embodiment of a hand segment 204a/b (FIG. 2), a device is provided to be held in the wearer's hand. Said device is preferably coupled to opisthenar structural member 412 (FIGS. 4A-4B). In one variation, said device comprises a controller, such as a game controller. This controller preferably comprises at least one input transducer, such as a button, which can be used to provide input to a computer-mediated environment process 116 (FIG. 1). In another variation, said hand-held device comprises a "prop," such as a gun, sword, or medical instrument that represents a corresponding article in a computer-mediated environment process 116 (FIG. 1). This prop likewise optionally comprises one or more input transducers, such as a trigger, which can be used to provide input to a computer-mediated environment process 116 (FIG. 1). In an additional variation, said hand-held device comprises a handle or other stiff projection that can be enclosed by the hand of the wearer.

In a fourth embodiment, a hand segment 204a/b (FIG. 2) comprises one or more articulations coupled to opisthenar structural member 412 (FIGS. 4A-4B) and configured to produce a force or torque on one or more of the wearer's fingers or phalanges thereof. In a preferred variation of this embodiment, one or more articulations of a hand segment 204a/b (FIG. 2) comprise a multi-layer sliding spring mechanism. Said mechanism is preferably configured to produce a compound bending motion similar to that of combined motion of the wearer's metacarpophalangeal, proximal interphalangeal, and distal interphalangeal joints in flexion and extension of a finger of the wearer. In one variation, the multi-layer sliding spring mechanism is coupled to a pin-type revolute articulation in order to emulate abduction/adduction of a metacarpophalangeal joint of the wearer. Said pin-type revolute articulation preferably has an axis of rotation substantially aligned with the average axis of rotation of a metacarpophalangeal joint of the wearer in abduction/adduction of a finger of the wearer.

A right leg segment 500a of an exoskeleton can be seen, in accordance with one embodiment, in FIGS. 5A-B. Note that left leg segment 500b, while not shown in FIGS. 5A-B, is substantially equivalent to right leg segment 500a mirrored across the median plane of the body. An upper leg structural member 501a partially or completely enclosing the wearer's upper leg is preferably coupled to a hip joint 650a (FIGS. 6A-B) of a torso segment 600 (FIGS. 6A-B). In one embodiment of a right leg segment 500a, upper leg structural member 501a is bisected somewhere along the length of the wearer's upper leg substantially perpendicular to the proximal-distal axis by rotary-type articulation 514 of hip joint 650a (FIGS. 6A-B) to form proximal and distal upper leg structural members 502 and 504. In an alternate embodiment of hip joint 650a (FIGS. 6A-B), as described hereinabove, internal and external rotation of the wearer's hip is enabled by an articulation of torso segment 600 (FIGS. 6A-B), and thus no bisection of upper leg structural member 501a is required.

Portions of upper leg structural member 501a are preferably omitted around the wearer's hip joint and knee joint to avoid interfering with the motion of these joints. The proximal boundary 536 of upper leg structural member 501a is preferably delimited approximately by the greater trochanter of the wearer's femur. Proximal edge 538 of upper leg structural member 501a is preferably shaped so as to avoid the wearer's groin. Distal edge 540 preferably follows approximately the arc formed on the wearer's upper leg by the edge of skin-to-skin contact of the wearer's lower leg and upper leg at the point of extreme flexion of the wearer's knee. Distal boundary 542 is preferably delimited approximately by the lateral epicondyle of the wearer's femur. A portion of upper leg structural member 501a or articulation 514 is preferred to completely encircle the wearer's upper leg to lend additional torsional rigidity to the structural member; however, embodiments are contemplated of upper leg structural member 501a where the structural member or its articulations only partially encircle the wearer's upper leg. In one example, articulation 514 only partially encircles the wearer's upper leg. In one embodiment, an upper leg structural member 501a comprises a length adjustment mechanism (not shown), preferably located near knee joint 515a.

A distal portion of upper leg structural member 501a is coupled by means of a knee joint 515a to a lower leg structural member 505a partially or completely enclosing the lower leg. Knee joint 515a preferably comprises one or more pin-type articulations 516 having an axis of rotation substantially aligned with the average axis of rotation of the wearer's knee joint in flexion/extension. Articulations 516 of knee joint 515a are preferably configured with pin-type revolute articulations both medial and lateral to the wearer's knee for increased strength and rigidity. Alternately, knee joint 515a comprises only a single pin-type revolute articulation, preferably located lateral to knee joint 515a. In an alternate embodiment, knee joint 515a comprises a four-bar mechanism producing a simultaneous rotation and translation configured to approximately follow the corresponding rotation and translation of the wearer's knee joint in flexion/extension. Lower leg structural member 505a is optionally bisected somewhere along the length of the wearer's lower leg substantially perpendicular to the proximal-distal axis by a rotary-type articulation 518 allowing for internal and external rotation of the wearer's knee. Optional bisection of lower leg structural member 505a forms proximal and distal lower leg structural members 506 and 508. In a preferred embodiment, internal and external rotation of the wearer's knee is accommodated by motion of other articulations such as those of hip joint 650a (FIGS. 6A-B) or ankle joint 519a and thus no bisection of lower leg structural member 505a is required. In one embodiment, a lower leg structural member 505a comprises a length adjustment mechanism (not shown), preferably located near knee joint 515a.

Portions of lower leg structural member 505a are preferably omitted around the wearer's knee joint and ankle joint to avoid interfering with the motion of these joints. The proximal boundary 544 of lower leg structural member 505a is preferably delimited approximately by the lateral epicondyle of the wearer's femur (with some additional room left between the distal edge of upper leg structural member 501a and the proximal edge of lower leg structural member 505a to allow for full extension of the wearer's knee). Proximal edge 546 of lower leg structural member 505a preferably follows approximately the arc formed on the wearer's lower leg by the edge of skin-to-skin contact of the wearer's lower leg and upper leg at the point of extreme flexion of the wearer's knee. Distal edge 547 of lower leg structural member 505a preferably is shaped so as to leave an opening of a sufficient size to permit passing the foot of the wearer through during donning and removal of the exoskeleton. Alternately, a structural discontinuity sufficient to permit passing the foot of the wearer through and an accompanying fastener is included in the distal portion of lower leg structural member 505a. Distal boundary 548 of lower leg structural member 505a is preferably delimited approximately by the lateral malleolus of the wearer's fibula. A portion of lower leg structural member 505a or articulation 518 is preferred to completely encircle the wearer's lower leg to lend additional torsional rigidity to the structural member; however, embodiments are contemplated of lower leg structural member 505a where the structural member or its articulations only partially encircle the wearer's lower leg.

A distal portion of lower leg structural member 505a is coupled by means of an ankle joint 519a to a foot segment 512a. In a preferred embodiment, ankle joint 519a comprises a first pin-type revolute articulation 520 coupled to a second pin-type revolute articulation 522 by means of structural member 521. An axis of rotation of articulation 520 is preferably substantially aligned with the average axis of rotation of the wearer's ankle in dorsiflexion/plantarflexion. An axis of rotation of articulation 522 is preferably substantially aligned with the average axis of rotation of the wearer's ankle in inversion/eversion. Structural member 521 is preferred to be shaped so as to project as little from the ankle of the wearer as possible without limiting the range of motion of the wearer or the exoskeleton.

Figure 14:
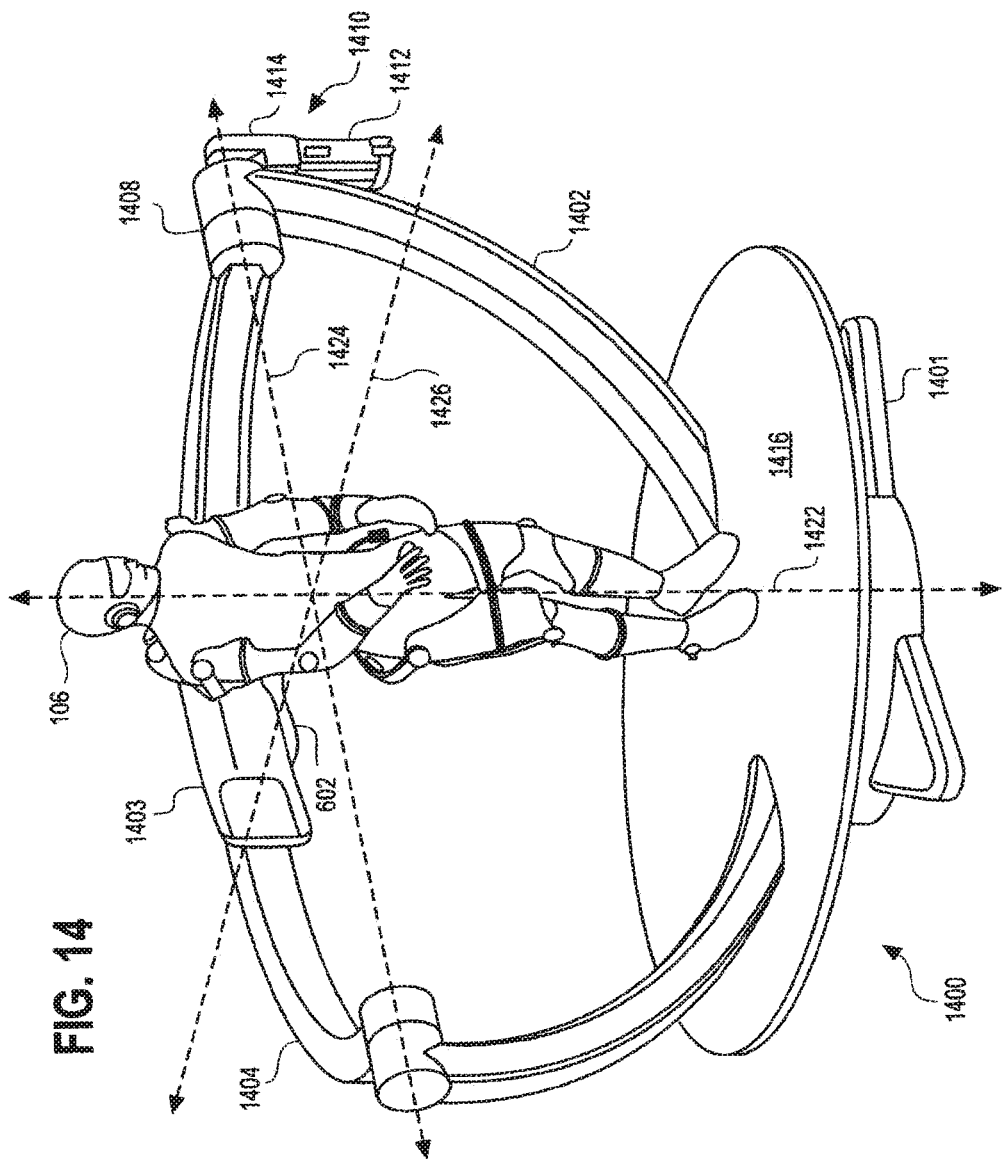
FIG. 14 is a front perspective view of a motion simulator coupled to an exoskeleton in accordance with one embodiment.

In one embodiment, foot segment 512a comprises a shoe with a stiff, load-bearing portion 510 (preferably the sole) that is coupled to the foot of the wearer. In this embodiment, the other elements of foot segment 512a comprise any suitable combination of straps or bands (in the manner of a sandal), or an "upper" composed of any of a variety of suitable materials with one or more fasteners such as laces, Velcro, or buckles (in the manner of an athletic shoe or boot). In an alternate embodiment, foot segment 512a comprises a load-bearing portion 510 (again preferably the sole), and one or more fasteners for securing a separate shoe or other foot covering to the load-bearing portion 510 of foot segment 512a. In one embodiment, foot segment 512a comprises a length adjustment mechanism (not shown), preferably located near ankle joint 519a. The bottom of foot segment 512a is optionally lined or coated with a variety of functional materials. In one example, a durable coating of a material such as rubber with or without grooves or treads is applied to increase traction. In another example, a friction-reducing material is applied to facilitate use of an exoskeleton with a supplementary support surface 1416 (FIG. 14; see "Motion Simulator" section).

In one embodiment of foot segment 512a, one or more separate toe segments are coupled by means of one or more metatarsophalangeal articulations to load-bearing portion 510. In one variation of this embodiment, a first toe segment partially or completely overlies the hallux, and a second toe segment partially or completely overlies the remaining toes.

Locomotor System

One or more articulations of an exoskeleton are actuated by a locomotor system comprising a plurality of locomotor modules. FIG. 3 shows a block diagram of a locomotor module 300 in accordance with one embodiment. An actuator assembly 306—comprising one or more actuators driven by a power supply 302—is coupled to an actuated articulation 324 by a power transmission system 320. A first sensor package 312 senses the position, angle, force, or torque at actuator assembly 306 by means of a position or angle sensor 314 or a force or torque sensor 316. A second sensor package 326 optionally senses the position, angle, force, or torque at actuated articulation 324 by means of a position or angle sensor 328 or a force or torque sensor 330. The second sensor package 326 optionally also includes a biosignal sensor 332, such as an electrode suitable for surface electromyography that is configured to contact the wearer's skin.

One or more safety features are preferred to be included in a locomotor module to prevent the application of harmful forces or torques to the wearer's body. A first safety feature comprises a current or pressure limiter 304 which prevents power supply 302 from transmitting excessive power to actuator assembly 306. A second safety feature comprises a force or torque limiter 318 which prevents actuator assembly 306 from transmitting excessive force or torque to power transmission system 320. A third safety feature comprises a position or angle limiter that prevents actuated articulation 324 from reaching a position or angle which could injure the wearer's joints.

Any suitable actuators can be used in actuator assembly 306 in any combination, including electromechanical, fluidic, or solid-state actuators. In a preferred embodiment, actuator assembly 306 comprises one or more contractile actuators, such as one of the class of "artificial muscles." In an even more preferred embodiment, a contractile actuator of actuator assembly 306 comprises a McKibben-type artificial muscle comprising an expandable inner tube surrounded by an outer braided sheath. This assembly is closed off at one end and coupled to a tension member. The other end is coupled to a pressurized fluid line. When working fluid is allowed into the muscle, the flexible inner tube expands in diameter. This applies tension to the sheath and causes the artificial muscle fiber to contract in length, thus applying a controllable tensile force to the tensile member.

In an alternate embodiment, a contractile actuator of actuator assembly 306 comprises a contractile material. In a variation of this embodiment, the displacement of a contractile actuator of actuator assembly 306 is amplified by twisting the material of the actuator. In another variation, a number of small-diameter artificial muscle fibers are ganged together into a muscle bundle so as to arbitrarily increase total power output. Said muscle bundle is, for example, arranged in a largely planar fashion around the outside surface of an exoskeleton.

In another preferred embodiment, actuator assembly 306 comprises one or more electromechanical actuators, such as a brushed or brushless DC motor, or an AC induction or synchronous motor. In many embodiments, a speed reduction mechanism is preferably used to increase the torque output of an electromechanical actuator. In a preferred embodiment, a speed reduction mechanism comprises a continuous, cable-driven mechanism. In an alternate embodiment, a speed reduction mechanism comprises a gearbox, such as a strain wave, planetary, or spur gearbox. In an additional embodiment, actuator assembly 306 comprises one or more series-elastic elements, such as a spring, between the actuator 308, 310 and the actuated articulation 324 for improved force control.

In another additional embodiment, actuator assembly 306 comprises one or more variable stiffness or variable impedance actuators, preferably comprising a variable stiffness material. In a version of this embodiment, one or more variable stiffness or variable impedance actuators are used to join one or more structural members in place of or in addition to one or more articulations.

Power supply 302 and current/pressure limiter 304 are chosen to be compatible with the selected actuator or actuators. For example, an electrical power supply and a circuit breaker or fuse respectively is used with an electromechanical actuator or other electrically driven actuator, while a pressurized pneumatic or hydraulic supply and a relief valve or burst disc respectively is used with a fluidic actuator.

Actuator assembly 306 optionally includes multiple actuators in a variety of configurations. In one embodiment, two coupled actuators 308 and 310 are configured to independently regulate both the force or torque and the damping of an actuated articulation 324. Independent control of damping may provide numerous advantages including an increased Z-width, increased maximum resistive force or torque at actuated articulation 324, and reduced power consumption with some actuator types.

In one embodiment of independent damping control, two contractile actuators are arranged into an agonist-antagonist pair acting in tension on actuated articulation 324. Force or torque in one direction can be regulated by actuating the first actuator and relaxing the second; force or torque in the opposite direction can be regulated by doing the reverse. Damping of the actuated articulation 324 can be regulated by actuating both actuators equally to a varying degree. In another embodiment of independent damping control, an actuator is coupled to a resistive mechanism such as an electromagnetic brake (including a friction-plate brake, particle brake, hysteresis power brake, magnetorheological brake, or eddy current brake) or a non-electromagnetic brake (including a piezoelectric brake or electrorheological brake). In this embodiment, bi-directional force or torque is controlled by an actuator and damping is controlled by a resistive mechanism.

Position or angle sensors 314, 328 can be placed anywhere within a locomotor module in any combination. A first embodiment of a position or angle sensor comprises: a plurality of optical, acoustic, magnetic, or radio frequency markers located on an exoskeleton; and one or more externally located devices which transduce the 3D position of the markers to a computer-interpretable form in real time. A second embodiment comprises an inertial sensor such as an accelerometer or gyroscope coupled to one or more segments of an exoskeleton to measure linear and/or rotational acceleration of a portion of the exoskeleton. In a third embodiment, magnetometers are placed adjacent to small permanent magnets on opposite sides of an articulation of an exoskeleton. Change in field strength due to displacement of the magnet relative to the magnetometer is measured in order to ascertain change in angle and/or position of the corresponding articulation. In a fourth embodiment, a potentiometer, encoder, or other goniometer is utilized to transduce the angle or position of an actuator, actuator assembly, or articulation of an exoskeleton to which it is attached. In a fifth embodiment, a magnetometer is used to sense a magnetic field originating externally to an exoskeleton (such as magnetic north) to ascertain orientation, or an accelerometer or inclinometer is used to ascertain orientation relative to the gravity vector. Multiple motion tracking systems, as for example any and all of those referenced hereinabove, can be combined to increase accuracy or robustness of the resultant data.

Force or torque sensors 316, 330 can also be placed anywhere within a locomotor module in any combination. In various embodiments, force or torque sensors 316, 330 comprise a strain gauge (such as a foil, semiconductor, thin film, or wire strain gauge), piezoelectric sensor (such as a piezoelectric crystal or piezoelectric film sensor), or other type of sensor (such as a linear variable differential transformer, capacitive displacement sensor, optical sensor, magneto-elastic device, or vibrating element force transducer). In a first embodiment, the force or torque to be measured acts on one or more intermediate elements, rather than directly acting on the aforementioned sensors. In one example of said first embodiment, a linear variable differential transformer is used to measure the displacement of a spring (with a known spring constant) under load in order to approximate the force acting on the spring. In a second example of said first embodiment, deformation of a structural member of an exoskeleton is measured by means of e.g. a strain gauge in order to approximate the force or torque acting on the structural member. In a second embodiment, the force or torque is derived from measurement of the power flowing into or out of an actuator assembly 306. For instance, the current flowing into an electromechanical actuator is measured to estimate the force or torque output of said actuator.

In one embodiment, force or torque limiter 318 comprises a mechanism that predictably disconnects, breaks, or slips under a given force or torque. Examples include mechanical devices (such as a shear pin, a ball detent, a pawl and spring or a friction plate) and non-mechanical devices (such as a magnetic coupling or magnetic clutch).

A power transmission system 320 transfers power between portions of a locomotor system—especially between actuator assembly 306 and actuated articulation 324—by mechanical, fluidic, electrical, or other means. Power transmission systems can be placed anywhere within a locomotor system in any combination. In a preferred embodiment, a power transmission system 320 enables one or more articulations 324 to be remotely actuated—i.e. actuated by an actuator assembly 306 located some distance away. Remote actuation is preferred for many actuated articulations 324 in order to reduce the size and mass of the exoskeleton. A portion of one or more locomotor modules 300 (particularly power supply 302, current/pressure limiter 304, actuator assembly 306, sensor package 312, or force/torque limiter 318) are advantageously located away from the body of the wearer, preferably within housing 1403 (FIG. 14). Directly actuated articulations—i.e. articulations that are directly coupled to an actuator assembly 306—do not require a power transmission system 320 between the actuator assembly 306 and actuated articulation 324.

In a preferred embodiment of a power transmission system 320, actuator assembly 306 is coupled to actuated articulation 324 by one or more tensile member assemblies. Tensile member assemblies are preferably grouped into agonist-antagonist pairs. A housing of a tensile member assembly is preferably positioned and routed so as to minimize the total angular displacement of the distal end of said housing relative to the proximal end. In a preferred variation, each tensile member assembly is selectively secured to one or more of the structural members along its run so as to delimit a preferred path for the tensile member assembly.

In one embodiment, one or more pulleys are used to redirect a tensile member instead of, or in combination with, one or more housings in order to reduce friction. Said pulleys are preferably arranged such that a first idler pulley and a second idler pulley rotate relative to each other about the axis of rotation of a primary pulley. A first tensile member and second tensile member are preferably configured to cross over each other between the first idler pulley and the primary pulley, and again between the primary pulley and the second idler pulley.

In another embodiment, a power transmission system 320 comprises a fluidic transmission system that supplies a pressurized working fluid to actuate one or more fluidic actuators of a rotary, cylinder, artificial-muscle, or other type. Fluidic lines are preferably arranged in a similar manner to the tensile members shown in FIGS. 2, 4A-5B, and 7. Like a tensile member, a fluidic line is preferably selectively secured to one or more of the structural members or articulations along its run so as to delimit a preferred path for the line.

In some embodiments of a locomotor module 300, a position or angle limiter 322 is included. Position or angle limiter 322 is preferred to comprise a mechanical device that physically stops actuated articulation 324 from reaching an unsafe position or angle.

Referring now to FIGS. 6A-B, some or all articulations of a torso segment 600 of an exoskeleton are preferred to be directly actuated, as they are anticipated to be positioned substantially outside the workspace of the wearer; however, distal articulations of a shoulder joint or hip joint of an exoskeleton are preferred to be remotely actuated to minimize interference with the wearer's workspace. In one embodiment of shoulder joint 670a/b, hip joint 650a/b or thoracic spinal joint 660, a position or angle sensor, a force or torque sensor, or a force or torque limiter is located at each articulation. In another embodiment, a multiple-degree-of-freedom position or angle senor, a multi-axis force or torque sensor, or a force or torque limiter is located at the distal end of shoulder joint 670a/b, hip joint 650a/b or thoracic spinal joint 660. In one embodiment of a serial manipulator 660, 802-824 (FIG. 8), a position or angle limiter, a force or torque limiter, or other suitable means is provided to prevent harmful collision of parts of a serial manipulator with the wearer's body. Power transmission elements (not shown in FIGS. 6A-B for clarity), such as fluidic lines or tensile members, emanating from torso segment 600 or other portions of an exoskeleton are preferably gathered in a single terminal group 740, which is coupled to a plurality of actuator assemblies 306 (FIG. 3) of a locomotor system.

Referring now to FIGS. 4A-4B, locomotor systems of a right arm segment 400a of an exoskeleton are shown in accordance with one embodiment. Although the embodiment of FIGS. 4A-4B depicts a tensile-member-based power transmission system, placement and routing of fluidic lines for a fluidic power transmission system is anticipated to be substantially similar. Radial or ulnar deviation of wrist articulation 422 is produced by the action of tensile member assemblies 434a and 434b respectively. Flexion or extension of wrist articulation 420 is produced by the action of tensile member assemblies 432a and 432b respectively. Pronation or supination of articulation 418 is produced by the action of tensile member assemblies 430a and 430b respectively. Tensile member assembly 430b is secured to upper arm structural member 401a by anchor point 431. Tensile member assemblies 430a and 432a-434b are secured to upper arm structural member 401a by anchor point 429. Flexion or extension of elbow articulation 416 is produced by the action of tensile member assemblies 428a and 428b respectively. Tensile member assemblies 428a-434b are coupled to form tensile member assembly bundle 427. Internal or external rotation of shoulder articulation 414 is produced by the action of tensile member assemblies 426a and 426b respectively. Tensile member assemblies 426a and 426b are coupled to form tensile member assembly bundle 425.

In one embodiment, tensile member assembly bundles 425, 427 of right arm segment 400a terminate on or near upper arm structural member 401a. In another embodiment, tensile member assembly bundles terminate on the back of the wearer. Tensile member assembly bundles 425 and 427 are preferably routed to a point near the shoulder blades of the wearer. Said routing preferably follows a path configured to minimize angular displacement of the distal end of said bundles (e.g. anchor points 429 and 431) in a common posture of the wearer's arms (i.e. where the wearer's shoulders are angled as they would be when holding a small object approximately 20 cm out from the wearer's abdomen approximately level with the wearer's solar plexus). In another embodiment, tensile member assemblies 430a-434b of a forearm segment or tensile member assemblies of a hand segment 204a/b are coupled to one or more pulleys having a center of rotation substantially aligned with the average center of rotation of the wearer's elbow in flexion/extension.

In one embodiment, a hand segment 204a/b (FIG. 2) of an exoskeleton comprises one or more tensile members of a power transmission system 320 (FIG. 3) configured to produce a net force or torque on one or more of the wearer's fingers or the phalanges thereof. In one variation of this embodiment, tensile members are secured to the opisthenar and palmar surfaces of one or more phalanges of a finger by one or more anchor points. In another variation, articulations of a hand segment 204a/b are omitted, allowing one or more tensile members to act directly on the wearer's joints. In a third variation, a multi-layer sliding spring mechanism is actuated by means of a mechanism that comprises: a first tensile member configured to produce a force on the sliding spring mechanism sufficient to induce bending in one direction; and a spring or second tensile member, acting in opposition to the first tensile member, configured to induce bending in the opposite direction.

Referring now to FIGS. 5A-B, locomotor systems of a right leg segment 500a of an exoskeleton are shown in accordance with one embodiment. Although the embodiment of FIGS. 5A-B depicts a tensile-member-based power transmission system, placement and routing of fluidic lines for a fluidic power transmission system is anticipated to be substantially similar. Inversion or eversion of ankle articulation 522 is produced by the action of tensile member assemblies 534a and 534b respectively. Dorsiflexion or plantarflexion of ankle articulation 520 is produced by the action of tensile member assemblies 532a and 532b respectively. Internal or external rotation of articulation 518 is produced by the action of tensile member assemblies 530a and 530b respectively. Flexion or extension of knee articulation 516 is produced by the action of tensile member assembly 528a and 528b respectively. Internal or external rotation of hip articulation 514 is produced by the action of tensile member assemblies 526a and 526b respectively. Tensile member assemblies of right leg segment 500a are coupled to form tensile member assembly bundle 527.

In one embodiment, tensile member assembly bundles 525, 527 of right leg segment 500a terminate on or near upper leg structural member 501a. In another embodiment, tensile member assembly bundles terminate on the back of the wearer. Tensile member assembly bundles 525 and 527 are preferably routed to a point near the sacrum of the wearer. Said routing preferably follows a path configured to minimize angular displacement of the distal end of said bundles in a common posture of the wearer's legs (i.e. where the wearer's hips are angled as they would be when standing straight up). In another embodiment, tensile member assemblies 530a-534b of a lower leg segment or tensile member assemblies of a foot segment 512a/b are coupled to one or more pulleys having a center of rotation substantially aligned with the average center of rotation of the wearer's knee in flexion/extension.

In one embodiment, a foot segment 512a/b (FIGS. 5A-B) of an exoskeleton comprises one or more tensile members of a power transmission system 320 (FIG. 3) configured to produce a net force or torque on one or more of the wearer's toes. In one variation of this embodiment, tensile members are secured to the plantar and dorsal surfaces of one or more toes by one or more anchor points. In another variation, articulations of a foot segment 512a/b are omitted, allowing one or more tensile members to act directly on the wearer's joints.

Temporary Coupling

FIG. 7 shows an exoskeleton in accordance with a preferred embodiment. The exoskeleton comprises: a point-of-use portion 701 located at the intended point of use of the human-computer interface terminal 102 (FIG. 1) of which the exoskeleton is a part, and a body-borne portion 703 worn on the body of a user. The point-of-use portion 701 is configured to be transitively coupled to one or more body-borne portions 703 so as to form an operative exoskeleton. Having a point-of-use portion 701 configured to be transitively coupled to one or more body-borne portions 703 allows multiple users 100 (FIG. 1) of a human-computer interface of potentially disparate body sizes and shapes to efficiently share a single human-computer interface terminal 102 (FIG. 1). This transitive-coupling arrangement also allows body-borne portion 703 to be lighter, simpler, less expensive, and potentially easier to don and take off.

Body-borne portion 703 is operatively coupled to point-of-use portion 701 by means of one or more temporary coupling points 702a-710b. In various embodiments, temporary coupling points 702a-710b comprise power-transmission couplings (of fluidic, electrical, tensile-member, or other types), or non-power-transmission couplings (such as mechanical couplings or data transmission couplings). Temporary coupling points 702a-710b are preferably located so as to minimize interference of the coupling points with free movement of the wearer or exoskeleton.

In one embodiment, a temporary coupling point comprises a mechanical coupling that attaches a point-of-use portion 701 of an exoskeleton to a body-borne portion 703 of an exoskeleton to form a composite load-bearing structure. A mechanical coupling of a temporary coupling point is preferably composed in whole or in part of a rigid structural material.

Figure 10A:
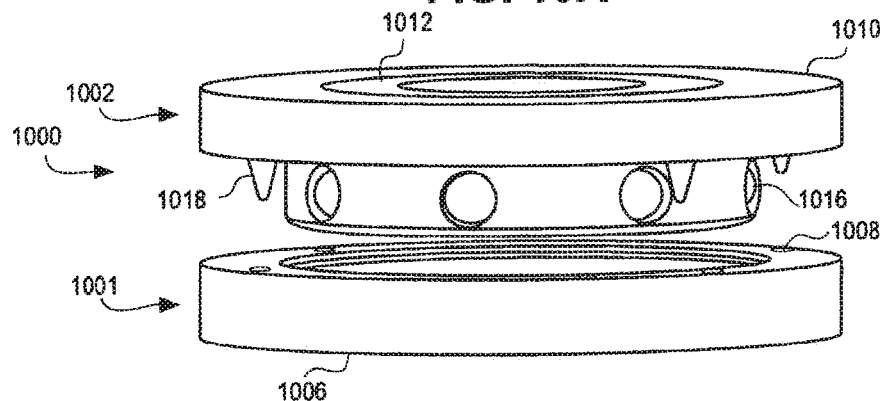
FIG. 10A is a side perspective view of a male connector and a female connector of a mechanical coupling of a temporary coupling point of an exoskeleton in accordance with one embodiment.
Figure 10B:
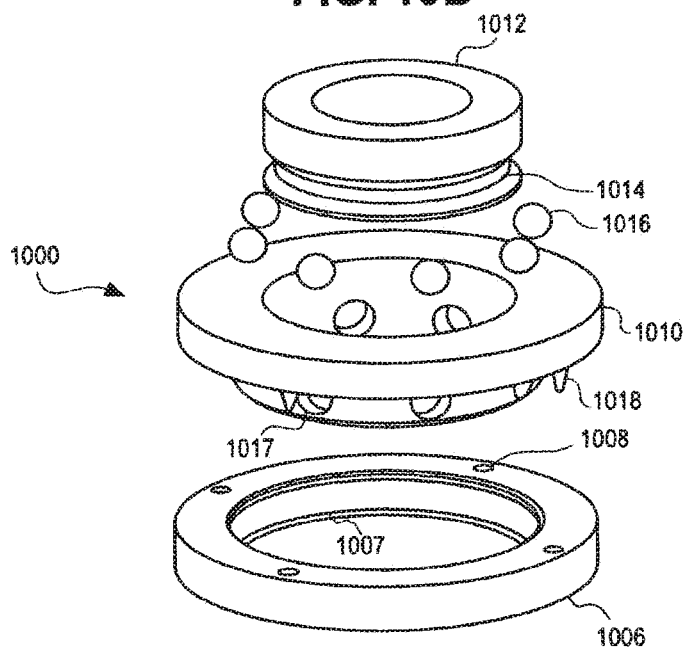
FIG. 10B is an exploded perspective view of the mechanical coupling of the embodiment of FIG. 10A.

FIGS. 10A and 10B show a mechanical coupling 1000 of a temporary coupling point in accordance with one embodiment. Mechanical coupling 1000 comprises: a female connector 1001, preferably located on a body-borne portion 703 of an exoskeleton; and a male connector 1002, preferably located on a point-of-use portion 701 of an exoskeleton. Female connector 1001 comprises: a ring member 1006 having a groove 1007 configured to receive a plurality of locking balls 1016; and one or more receptacles 1008, each configured to receive a pin 1018. Male connector 1002 comprises: a plurality of locking balls 1016, each positioned adjacent to a corresponding hole 1017 in member 1010; and a plunger 1012 having a groove 1014 configured to receive a plurality of locking balls 1016.

In order to effect a coupling between female connector 1001 and male connector 1002, first the two connectors are positioned approximately as shown in FIG. 10A with pins 1018 substantially aligned with receptacles 1008. Next, pins 1018 are inserted into receptacles 1008. Finally a locking force is applied to plunger 1012, pushing it down toward female connector 1001. Said locking force pushes locking balls 1016 outward through holes 1017 due to the profile of groove 1014. Locking balls 1016 now protrude into groove 1007 in ring member 1006 of female connector 1001. The profile of groove 1007 prevents separation of the female connector 1001 and male connector 1002 while locking force is applied to plunger 1012. Pins 1018 in receptacles 1008 prevent rotation of the two connectors relative to one another. In order to uncouple the male connector 1002 from the female connector 1001, locking force is removed from plunger 1012, thereby allowing the two connectors to be separated.

Numerous alternate embodiments of a mechanical coupling of a temporary coupling point are contemplated. In a first alternate embodiment, a mechanical coupling of a temporary coupling point comprises a hook and loop fastener, threaded fastener, buckle, button, clasp, clamp, latch, pin, strap, tie, zipper, anchor, snap, or other mechanically mated temporary fastener, or a combination of two or more of the above. In a second alternate embodiment, a mechanical coupling of a temporary coupling point comprises a dry or wet adhesive or other chemically mated temporary fastener. In a third alternate embodiment, a mechanical coupling of a temporary coupling point comprises a suction cup or other temporary fastener mated by means of fluid pressure. In a fourth alternate embodiment, a mechanical coupling of a temporary coupling point comprises a permanent magnet, electromagnet, or other temporary fastener mated by means of electromagnetic attraction or repulsion.

In one embodiment, a temporary coupling point comprises one or more electrical connectors or fluidic connectors 2350 (FIGS. 23A-B). In one variation, an electrical connection is effected via wireless transmission by means of, for example: electromagnetic radiation of radio, microwave, optical or other frequencies; ultrasonic communication; electromagnetic induction; or combinations of two or more of the above. In another embodiment, a temporary coupling point comprises one or more alignment aids. In one embodiment, an alignment aid comprises one or more magnets placed on female connector 1001 and one or more corresponding magnets placed on male connector 1002. Said magnets are configured to produce a corrective force aiding alignment when brought into close proximity. Alignment and coupling of connectors 1001 and 1002 is optionally automated (i.e. effected by a serial manipulator or other actuated element of an exoskeleton) or manual (i.e. effected by the wearer of an exoskeleton or by another person). In the case of automated coupling, additional alignment aids are optionally included, such as: a still or video camera; a capacitive, inductive, optical, or other proximity sensing device; or additional position/angle sensors of the type described hereinabove (in the "Locomotor System" section), or of another suitable type; or a combination of two or more of the above.

In a third embodiment, a temporary coupling point comprises one or more tensile member power transmission couplings. A tensile member power transmission coupling comprises one or more mating connectors, preferably with a shared locking mechanism, configured to transmit a tensile force from a first tensile member to a second tensile member. Said locking mechanism preferably comprises a rotating or sliding element having a face coupled to a face of another rotating or sliding element. Coupling of one element to another is accomplished, in accordance with one variation, by means of any of the mechanical couplings described hereinabove or by means of another suitable mechanical coupling.

Figure 13A:
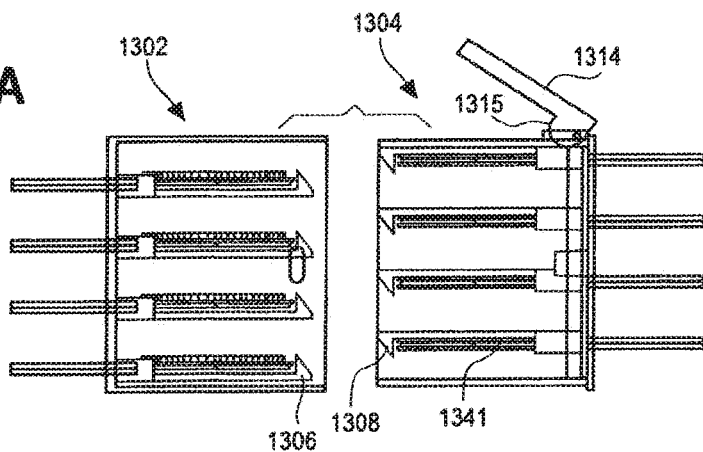
FIG. 13A is a top view of a male connector and a female connector of a tensile member power transmission coupling of a temporary coupling point of an exoskeleton in accordance with one embodiment. The housings of the male and female connectors are rendered as semi-transparent to illustrate key systems within.
Figure 13B:
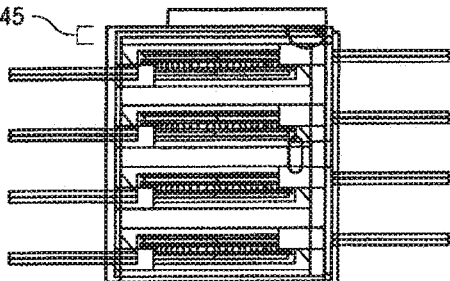
FIG. 13B is a top view of the tensile member power transmission coupling of the embodiment of FIG. 13A in a coupled state.
Figure 13C:
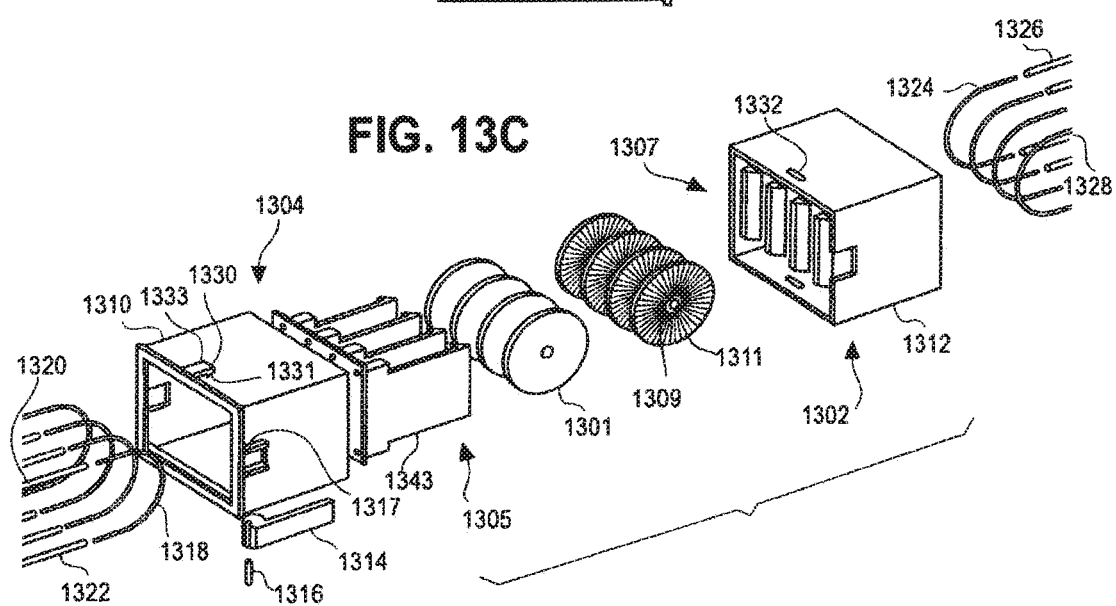
FIG. 13C is an exploded perspective view of the tensile member power transmission coupling of the embodiment of FIG. 13A.

FIGS. 13A-C show a tensile member power transmission coupling in accordance with a preferred embodiment. A tensile member power transmission coupling comprises a male connector 1304 configured to mate with a female connector 1302. The female connector 1302 is preferably located on a body-borne portion of an exoskeleton. Male connector 1304 comprises a plurality of pulleys 1301. Each pulley 1301 is coupled by means of an inside termination (not shown) to a tensile member assembly comprising: a tensile member 1318 coupled to a first housing 1320, and to a second housing 1322. Each pulley 1301 is also coupled by means of an axle (not shown) to a projection 1343 so as to allow the pulley 1301 to rotate about said axle. Similarly, female connector 1302 comprises a plurality of pulleys 1311. Each pulley 1311 is coupled by means of an inside termination (not shown) to a tensile member assembly comprising: a tensile member 1324 coupled to a first housing 1326, and to a second housing 1328. Each pulley 1311 is also coupled by means of an axle (not shown) to a projection 1341 so as to allow the pulley 1301 to rotate about said axle. Pulleys 1301 of a male connector and pulleys 1311 of a female connector each comprise a face having a plurality of interlocking elements 1309, each interlocking element 1309 preferably having a wedge-shaped profile. Male connector 1304 is contained within an enclosure 1310. Female connector 1302 is contained within a second enclosure 1312.

In order to effect a power transmission coupling between a tensile member of a male connector 1304 and a tensile member of a female connector 1302, first the two connectors are aligned as shown in FIG. 13A. Second, the male connector 1304 is inserted into the female connector 1302 until retaining clip 1330 of the male connector 1304 snaps into orifice 1332 of the female connector 1302; chamfered outside edge 1333 of retaining clip 1330 forces retaining clip 1330 over the edge of enclosure 1312 of female connector 1302. Flanges 1306, 1308 of projections 1343, 1341 prevent contact between pulleys 1301, 1311 during insertion. Lastly, lever 1314 is moved from the position seen in FIG. 13A to the position seen in FIG. 13B, causing cam 1315 to displace 1345 pulley assembly 1307 relative to enclosure 1312. When force is applied to pulley assembly 1307 by the action of cam 1315, the profile of interlocking elements 1309 of each pulley forces pulleys 1301 of the male connector 1304 to align with pulleys 1311 of the female connector 1302, thus coupling their rotations. Once the pulley assemblies 1305 and 1307 of the male and female connectors are aligned, a force applied to a tensile member of one pulley assembly will be transmitted to a tensile member of the other assembly.

To disengage the male and female connectors, lever 1314 is moved back to the position of FIG. 13A, and a pulling force is applied to separate the two connectors. Chamfered inside edge 1331 of retaining clip 1330 forces the retaining clip 1330 out of orifice 1332 when said pulling force is applied. The construction of retaining clip 1330 regulates the force required to couple and decouple the male and female connectors. In one embodiment, coupling or decoupling of the male and female connectors is automated by, for example, coupling lever 1314 to an actuator.

In an alternate embodiment, a tensile member power transmission coupling comprises a coupling stage assembly configured to slide along a rail. Said coupling stage assembly is coupled to a tensile member of a tensile member assembly. In order to effect a power transmission coupling between two tensile members, a first coupling stage assembly and a second coupling stage assembly are arranged with a surface face-to-face and pressed together so as to couple their lateral motion. Once the first and second coupling sled assemblies are locked together, a force applied to a tensile member of one assembly will be transmitted to a tensile member of the other assembly.

FIGS. 6A-B show temporary coupling points of a torso segment 600 of an exoskeleton in accordance with one embodiment. Referring now to FIGS. 4A-7, right shoulder joint 670a is mechanically coupled to right upper arm structural member 401a via a temporary coupling point comprising connectors 704a and 704b. Left shoulder joint 670b is mechanically coupled to left upper arm structural member 401b via a temporary coupling point comprising connectors 708a and 708b. Right hip joint 650a is mechanically coupled to right upper leg structural member 501a via a temporary coupling point comprising connectors 702a and 702b. Left hip joint 650b is mechanically coupled to left upper leg structural member 501b via a temporary coupling point comprising connectors 706a and 706b.

In one embodiment, temporary coupling points 702a-708b comprise a plurality of tensile member power transmission couplings configured to transmit power from actuator assemblies 306 to a body-borne portion 703 of an exoskeleton; however, given the limited accessible surface area of upper arm structural members 401a/b and upper leg structural members 501a/b, tensile member power transmission couplings between point-of-use portion 701 and body-borne portion 703 are preferred to be located on the back of the wearer. FIG. 7 shows a single temporary coupling point (comprising connectors 710a and 710b), which comprises a tensile member power transmission coupling.

In one embodiment, a first temporary coupling point is configured to transmit power to actuated articulations of arm segments 400a and 400b (FIG. 2) and other actuated articulations of the upper body, and a second temporary coupling point is configured to transmit power to actuated articulations of leg segments 500a and 500b (FIG. 2) and other actuated articulations of the lower body. Said first temporary coupling point is preferred to be located approximately between the shoulder blades of the wearer. Tensile member assemblies emanating from the first temporary coupling point are preferably pointed toward the wearer's feet at a slight to moderate lateral-facing angle so as to minimize the angular displacement of the tensile member assemblies relative to their proximal-most anchor point as discussed hereinabove (in the "Locomotor System" sub-section). Said second temporary coupling point is preferred to be located adjacent to the wearer's pelvis. Tensile member assemblies emanating from the second temporary coupling point are preferably pointed toward the wearer's feet at a slight lateral-facing angle so as to minimize the angular displacement of the tensile member assemblies relative to their proximal-most anchor point.

In a preferred embodiment, as shown in FIG. 7, a point-of-use portion 701 of an exoskeleton comprises a torso segment 600, and a body-borne portion 703 of an exoskeleton comprises arm segments 400a/b (FIG. 2) and leg segments 500a/b (FIG. 2); however, embodiments are contemplated wherein an exoskeleton is either wholly body-borne, located permanently at a point-of-use of a human-computer interface terminal, or anywhere in between. In a first example, temporary coupling points 702a-708b are omitted, and a body-borne portion 703 comprises shoulder joints 670a/b, hip joints 650a/b, or thoracic spinal joint 670. In a second example, temporary coupling points 702a-708b are located on forearm structural members 405a/b or lower leg structural members 505a/b, and a point-of-use portion 701 comprises upper arm structural members 401a/b or upper leg structural members 501a/b. In a variation of said second example, a point-of-use portion 701 also comprises elbow joints 415a/b or knee joints 515a/b. In a third example, a body-borne portion 703 comprises one or more structural members 402, 404, 406, 408, 412, 502, 504, 506, 508, or 512 and a point-of-use portion comprises one or more joints 414, 415, 418, 419, 515, 515, 518, or 519. In this example, structural members of a body-borne portion 703 are preferably coupled to joints of a point-of-use portion 701 by a first and second temporary coupling point located on a proximal and distal portion respectively of each joint and structural member. In a fourth example, a body-borne portion 703 is divided into a first collection of elements and a second collection of elements. Said first collection of elements preferably comprises at least structural members 402, 404, 406, 408, 412, 502, 504, 506, 508, or 512. In a preferred variation of this last example, the aforementioned second collection of elements of a body-borne portion 703 is shared between multiple first collections of elements of a body-borne portion 703.

Motion Simulator

Referring to FIG. 1, in one embodiment, a human-computer interface terminal 102 comprises a motion simulator 143 configured to affect the orientation or acceleration of the body of a user 106. A motion simulator 143 variously enables the simulation of: forces opposing gravity, such as lying in a bed or sitting in a chair; rotational acceleration and corresponding change in orientation, such as that produced by a cartwheel; linear acceleration, such as that produced by driving a vehicle; or free locomotion, i.e. freely moving around a virtual environment of arbitrary size without the requirement for corresponding locomotion in a physical environment.

FIG. 14 shows a preferred embodiment 1400 of a motion simulator 143 (FIG. 1) comprising an actuated platform having at least three degrees of rotational freedom. A base 1401 is coupled to an outer pivoted support 1402 via an actuated revolute articulation (not shown) configured to produce a rotation about axis 1422. Outer pivoted support 1402 is in turn coupled to an inner pivoted support 1404 via a second actuated revolute articulation 1408 configured to produce a rotation about axis 1424. Pivoted supports 1402 and 1404 are preferably composed in whole or in part of a rigid structural material. A point-of-use portion of an exoskeleton, and a housing 1403 are preferably coupled to inner pivoted support 1404 via a third actuated revolute articulation (not shown) configured to produce a rotation about axis 1426. Said third actuated revolute articulation is preferably contained within housing 1403.

The three aforementioned articulations are each actuated by an actuator assembly 1410 preferably comprising an electromechanical actuator 1412 (e.g. a brushed or brushless DC motor, or an AC induction or synchronous motor) preferably coupled to a right-angle speed reduction mechanism 1414. Actuator 1412 can also be of any of the other types described hereinabove (in the "Locomotor System" section), or of another suitable type. Speed reduction mechanism 1414 preferably comprises a gearbox, such as a strain wave, planetary, or spur gearbox. Actuator assembly 1410 preferably also comprises a potentiometer, encoder, or other goniometer. Actuator assembly 1410 optionally comprises a braking system to reduce steady-state power consumption, said braking system being of the type of any of the resistive mechanisms described hereinabove (in the "Locomotor System" section), or of another suitable type. Motion simulator 1400 preferably comprises at least one additional degree of freedom (not shown) that can be actuated so as to position a point-of-use portion 701 of an exoskeleton at an appropriate height to couple to one or more body-borne portions 703 (FIG. 7) worn by people of differing heights.

In one embodiment, a human-computer interface terminal 102 (FIG. 1) comprises a supplementary support surface 1416 configured to support some or all of the weight of a user 106. Supplementary support surface 1416 is preferably coupled to outer pivoted support 1402 of motion simulator 1400, but can also be coupled to inner pivoted support 1404 or to elongated structural member 602 in various contemplated embodiments. In one embodiment, supplementary support surface 1416 comprises an upper face configured to allow the feet of a user 106 to slide along said face with a minimum of friction. Friction is reduced, for example, by means of: a friction-reducing material; or a plurality of rolling elements, such as ball bearings. As discussed hereinabove, one or more friction-reducing elements for use with a supplementary support surface 1416 are optionally included in a foot segment 512 of an exoskeleton. In a second embodiment, a supplementary support surface comprises an actuated degree of freedom. In one variation, said actuated degree of freedom is configured to move a supplementary support surface 1416 or a portion thereof along axis 1422. This motion can be employed to, for example, more easily accommodate users 106 of differing heights, or to improve the fidelity of simulations of motions of user 106 involving a translation of the user's center of gravity along axis 1422 (such as sitting, crouching, climbing stairs, or walking on a slope). In a second variation, said actuated degree of freedom is configured to move a supplementary support surface 1416 or a portion thereof along axis 1424 or 1426 (e.g. in the manner of a treadmill). This motion can be employed, for example, to improve the fidelity of simulations of motions of user 106 involving a translation of the user's center of gravity along axis 1424 or 1426 (such as walking or running). In some contemplated embodiments, supplementary support surface 1416 is coupled to one or more articulations of a motion simulator. Thus, one or more of the aforementioned axes 1422-1426 of supplementary support surface 1416 can variously remain fixed relative to either the reference frame of mechanical ground or the reference frame of the user.

In some embodiments, a motion simulator 1400 comprises one or more additional actuated articulations. In a first embodiment, motion simulator 1400 comprises one or more actuated articulations configured to apply a linear acceleration to the body of a user 106. In a second embodiment, a motion simulator comprises one or more actuated articulations coupled to an inner pivoted support 1404 and an exoskeleton. Said actuated articulations are preferably arranged to form a parallel manipulator comprising at least 3 rotational degrees of freedom configured to affect the orientation or acceleration of the body of a user 106. Said actuated articulations are employed, in accordance with one embodiment, to increase the responsiveness of motion simulator 1400 to rapid rotations or translations of a user's body.

When a human-computer interface terminal 102 (FIG. 1) comprising a motion simulator 1400 is in use, a user 106 is preferably positioned vertically such that they are suspended above the ground. User 106 is also preferably positioned such that the user's center of gravity (with legs and arms fully extended straight up and down) is approximately aligned with the mid-point of one or more axes of rotation of motion simulator 1400. The diameter of the inner pivoted support 1404 is preferably sized such that a user 106 is unable to make contact with it when suspended in this manner regardless of body position. In a preferred embodiment, the diameter of pivoted support 1404 is between 2.5 and 3.0 m.

An exoskeleton, a user 106, a housing 1403 and its contents, or other masses coupled to a motion simulator 1400 can produce a substantial torque on actuated articulations of said motion simulator when acted upon by gravity. In order to minimize this undesirable torque, said masses are preferably arranged to balance each other about the axis of rotation of one or more of the articulations of a motion simulator 1400. In one variation, one or more counterweights are also employed to aid in balancing masses acting on said articulations. In one alternate embodiment, a motion simulator 1400 is supplemented or replaced by a serial manipulator configured to affect the orientation or acceleration of the body of a user 106.

Interface Laminate

Figure 16:
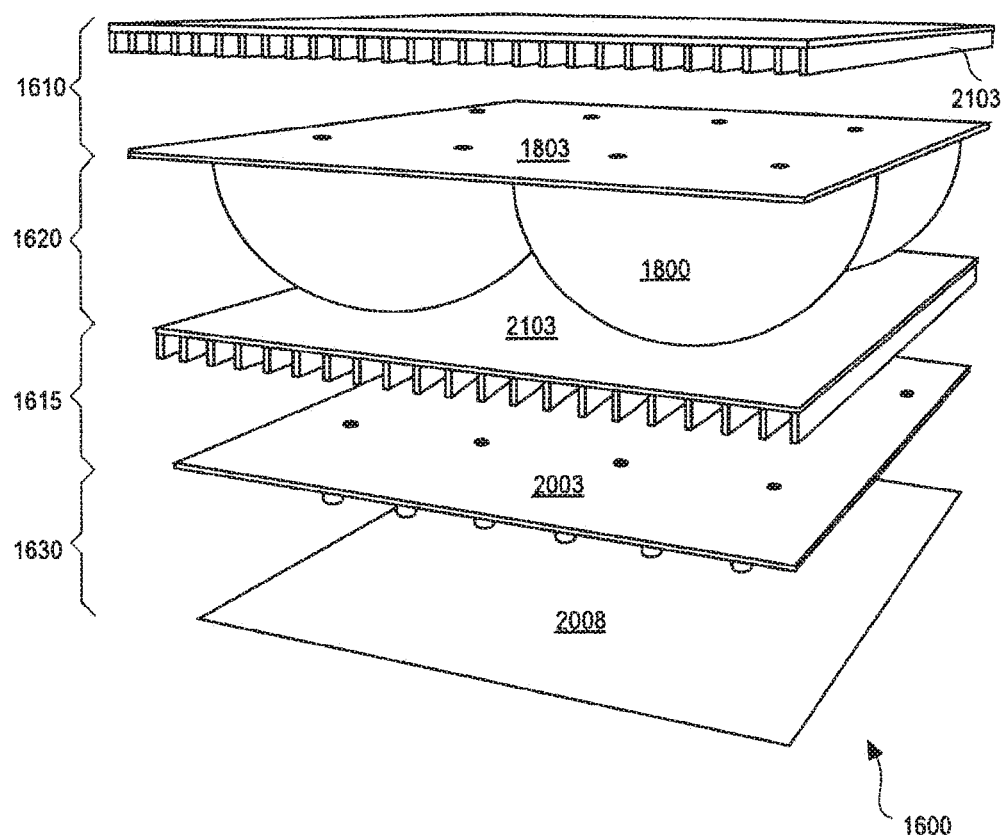
FIG. 16 is an exploded perspective view of an interface laminate in accordance with one embodiment.

Referring to FIG. 1, in one embodiment of the present invention, a human-computer interface terminal 102 comprises an interface laminate. Said interface laminate preferably comprises: a plurality of tactile actuators 140 each coupled to a force sensor 133; and a plurality of thermal actuators 142, each coupled to a temperature sensor 134. An interface laminate optionally also comprises one or more biosignal sensors 135. FIG. 16 generally depicts one embodiment of an interface laminate 1600. A tactile actuator laminate 1620, comprising a fluidic tactile actuator 1800, is coupled to a thermal actuator laminate 1630. A first fluidic distribution laminate 1610 supplies a pressurized working fluid to tactile actuator laminate 1620. A second fluidic distribution laminate 1615 supplies a pressurized working fluid to thermal actuator laminate 1630. Interface laminate 1600 is preferably positioned substantially parallel to the skin surface of a user. An inner surface of interface laminate 1600 is configured to transmit forces and heat between interface laminate 1600 and the user's skin.

Tactile Actuator Laminate

Figure 18A:
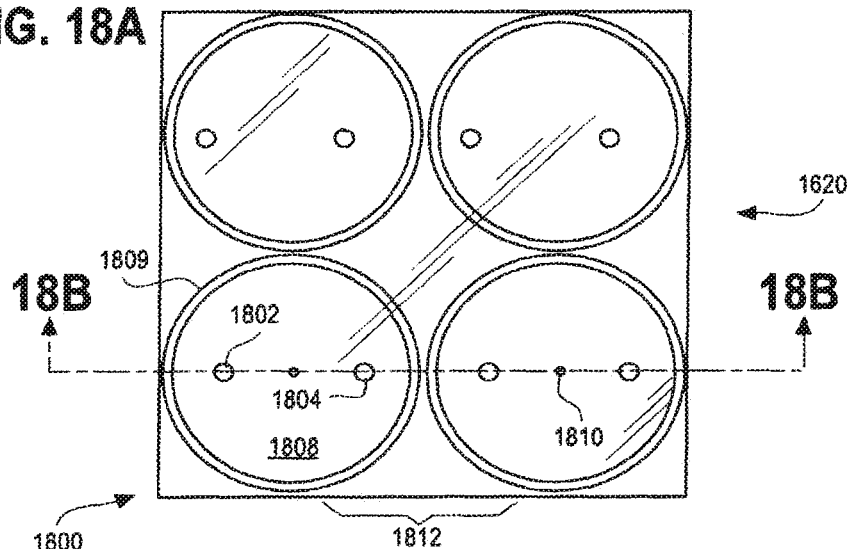
FIG. 18A is a bottom view of a tactile actuator laminate in accordance with one embodiment. The inner surface of the tactile actuator laminate is rendered as semi-transparent for clarity.
Figure 18B:
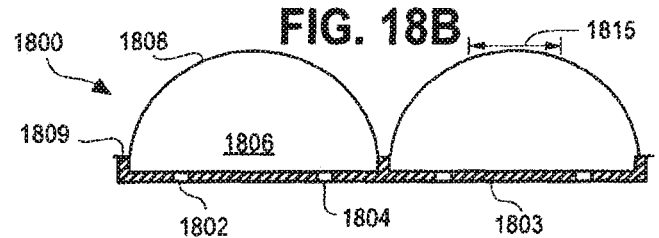
FIG. 18B is a sectional view of the tactile actuator laminate of the embodiment of FIG. 18A.
Figure 18C:
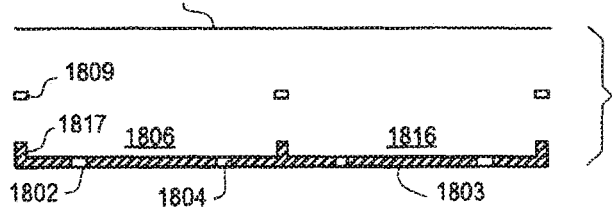
FIG. 18C is an exploded view of the cross-section of FIG. 18B.
Figure 19:
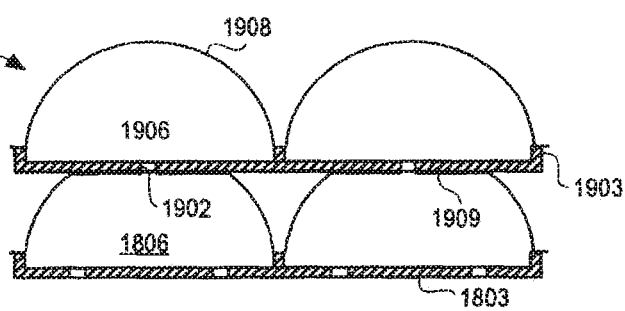
FIG. 19 is a sectional view through the same plane as the sectional view of FIG. 18B of an alternate embodiment of a tactile actuator laminate.

FIGS. 18A-19 show a tactile actuator laminate 1620 in accordance with various embodiments. Tactile actuator laminate 1620 comprises a plurality of tactile actuators 140 (FIG. 1) arranged in a thin, flexible layer. In a preferred embodiment, a tactile actuator 140 (FIG. 1) of a tactile actuator laminate 1620 comprises a fluidic tactile actuator 1800. FIG. 18B shows a cross-section of two fluidic tactile actuators 1800 in accordance with one embodiment. A fluidic tactile actuator 1800 comprises an elastic membrane 1808 bonded to a substrate 1803 to form a chamber 1806. A pressurized working fluid enters chamber 1806 through a supply orifice 1802, preferably located in the base of substrate 1803, and exits through an exhaust orifice 1804. Elastic membrane 1808 can be controllably actuated by regulating the volume or pressure of working fluid flowing into and out of chamber 1806.

In one embodiment of a fluidic tactile actuator 1800, shown in FIG. 19, two or more chambers 1806, 1906 are combined in order to increase the achievable displacement of said fluidic tactile actuator 1800. In the embodiment of FIG. 19, a second chamber 1906 comprises a second elastic membrane 1908 whose outside edge is bonded to a second substrate 1903. Substrate 1903 is bonded to the top of elastic membrane 1808 by means of a bonding surface 1909. An orifice 1902 couples the enclosed volume of chamber 1906 to the enclosed volume of chamber 1806. Additional chambers beyond a second chamber 1906 are optionally added to fluidic tactile actuator 1800 in the manner described hereinabove to further increase the achievable displacement of the actuator.

FIG. 18A shows a bottom view of a tactile actuator laminate 1620 comprising four fluidic tactile actuators 1800, in accordance with one embodiment. Shown is a substrate 1803 (FIG. 18B) bonded to an elastic membrane 1808 (rendered as semi-transparent in FIG. 18A for clarity) overlying four pairs of supply orifices 1802 and exhaust orifices 1804. Fluidic tactile actuators 1800 of a tactile actuator laminate 1620 are preferably positioned such that the distance 1812 from the center 1810 of one actuator to the center 1810 of another actuator is less than or equal to the two-point discrimination threshold of a user at the point on the user's skin surface opposite said fluidic tactile actuators 1800. Fluidic tactile actuators 1800 of a tactile actuator laminate 1620 are preferably sized such that they occupy a majority of the surface area of the inner surface of a tactile actuator laminate, as shown in FIG. 18A in accordance with one embodiment.

FIG. 18C shows an exploded view of the cross section of FIG. 18B in accordance with one embodiment. Substrate 1803 is preferably composed of a flexible substrate material. Elastic membrane 1808 is bonded to substrate 1803 via bonding surface 1809 to form enclosed, substantially airtight chambers 1806, 1816. Elastic membrane 1808 preferably comprises polydimethylsiloxane or another elastomer, including natural or synthetic rubbers. In an alternate embodiment, substrate 1803 is composed from a first and second layer of a flexible substrate material. In this alternate embodiment, lip 1817 of chamber 1806 is formed from a hole cut in a first layer of flexible substrate material. Said first layer is bonded to the inner surface of a second layer of flexible substrate material to form a chamber 1806.

Contemplated means of bonding a first layer of an interface laminate to a second layer of an interface laminate to form a laminate structure (as in a tactile actuator laminate) include: plasma-activated bonding, welding, anodic bonding, or other treatments that alter the surface chemistry of one or more of said layers; adhesive bonding (including via thermoset or thermoplastic adhesives), eutectic bonding, glass frit bonding, or other means of joining said layers by means of an intermediate layer of material; combinations of two or more of the above.

Referring now to FIG. 1, in a preferred embodiment, tactile actuators 140 remain in constant contact with a user's skin, and are configured to maintain a nominal contact pressure in the absence of a commanded pressure, force, or vibration. In a preferred variation, said nominal contact pressure is between 0.10 and 5.0 kPa. In a more preferred variation, said nominal contact pressure is between 0.50 and 2.5 kPa. In an even more preferred embodiment, said nominal contact pressure is between 1.0 and 2.0 kPa. This nominal contact pressure is preferably employed to assist in cloaking any anomalous contact forces resulting from the intrinsic dynamics or operation of an interface laminate or other structures to which it is coupled.

The maximum pressure produced on a user's skin by a given tactile actuator 140 preferably does not exceed the pressure-pain threshold of a user at the point on the user's skin surface opposite said tactile actuator 140. Pressure produced on a user's skin by a plurality of tactile actuators 140 for a period of time greater than c.a. 5 sec preferably does not exceed approximately 8 kPa to avoid impeding the user's blood flow, particularly where said tactile actuators 140 substantially encircle an extremity of the user. In an alternate embodiment, tactile actuators 140 maintain a nominal "air gap" distance from user's skin surface, said distance preferably being in the range of approximately 0.5-3 mm.

Thermal Actuator Laminate

Figure 20A:
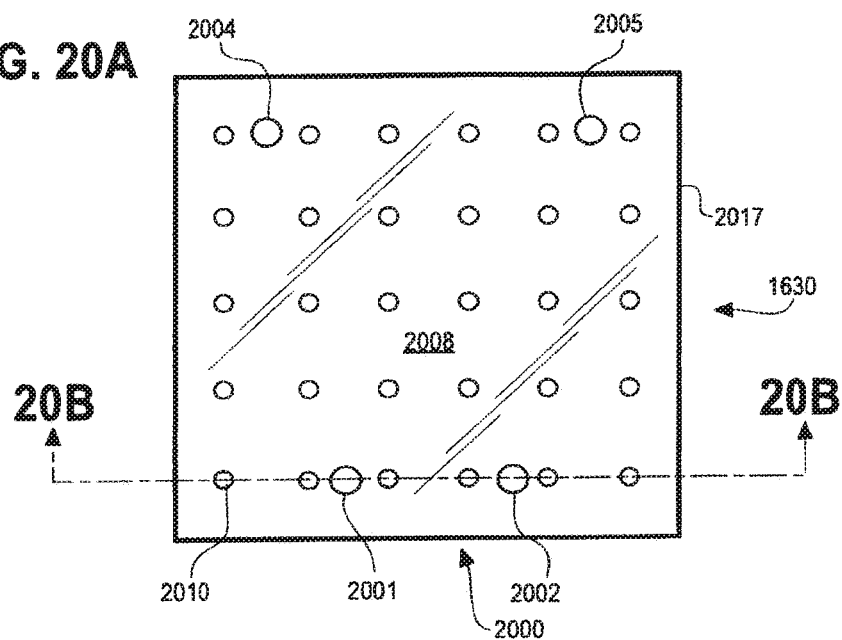
FIG. 20A is a bottom view of a thermal actuator laminate in accordance with one embodiment. The inner surface of the thermal actuator laminate is rendered as semi-transparent for clarity.
Figure 20B:
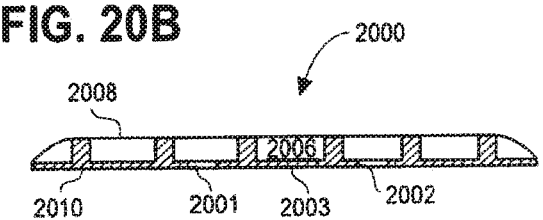
FIG. 20B is a sectional view of the thermal actuator laminate of the embodiment of FIG. 20A.
Figure 20C:
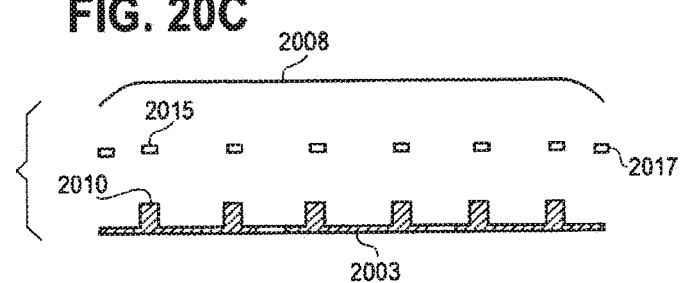
FIG. 20C is an exploded view of the cross-section of FIG. 20B.

FIGS. 20A-C show a thermal actuator laminate 1630 in accordance with one embodiment. Thermal actuator laminate 1630 comprises a plurality of thermal actuators 142 (FIG. 1) arranged in a thin, flexible layer. In a preferred embodiment, a thermal actuator 142 (FIG. 1) of a thermal actuator laminate 1630 comprises a fluidic thermal actuator 2000. FIG. 20A shows a bottom view of a thermal actuator laminate 1630 comprising a single fluidic thermal actuator 2000, in accordance with one embodiment. Shown is a substrate 2003 (FIG. 20B) bonded to a thermally-conductive membrane 2008 (rendered as semi-transparent in FIG. 20A for clarity) overlying supply orifices 2001, 2002 and exhaust orifices 2004, 2005.

FIG. 20B shows a cross-section of a fluidic thermal actuator 2000 in accordance with one embodiment. A fluidic thermal actuator 2000 comprises a thermally-conductive membrane 2008 bonded to a substrate 2003 to form a chamber 2006. A pressurized working fluid enters chamber 2006 through supply orifices 2001, 2002, and exits through exhaust orifices 2004, 2005 (FIG. 20A). Supply orifices 2001, 2002 and exhaust orifices 2004, 2005 are preferably located in the base of substrate 2003. Substrate 2003 comprises a plurality of projections 2010. Projections 2010 prevent chamber 2006 from collapsing under pressure exerted e.g. by a user or tactile actuator 140 (FIG. 1). Projections 2010 also preferably are shaped and positioned so as to encourage chaotic flow of working fluid inside chamber 2006 in order to increase heat transfer between said fluid and the skin of a user. Heat flux through thermally-conductive membrane 2008 can be controllably varied by regulating the temperature or amount of working fluid flowing into and out of chamber 2006. In an alternate embodiment, a chamber 2006 of a fluidic thermal actuator 2000 is formed from one or more enclosed channels (e.g. channels of the type of a fluidic distribution laminate of FIGS. 21A-23B).

FIG. 20C shows an exploded view of the cross section of FIG. 20B in accordance with one embodiment. Substrate 2003 is preferably composed of a flexible substrate material. Substrate 2003 is preferably configured to permit low heat flux relative to thermally-conductive membrane 2008 (e.g. via low thermal conductivity or increased thickness). Thermally-conductive membrane 2008 is bonded to projections 2010 of substrate 2003 via a bonding surface 2015. The edges of thermally-conductive membrane 2008 are bonded to substrate 2003 via a bonding surface 2017 to form an enclosed, substantially airtight chamber 2006. Thermally-conductive membrane 2008 comprises a flexible, and preferably elastic, material configured to permit high heat flux (e.g. via high thermal conductivity or low thickness). Such contemplated materials include: polydimethylsiloxane film or other elastomer films; polyethylene terephthalate film or other polymer films; aluminum foil or other metal foils; metal-filled polymers or other metal-polymer composites; metal-filled elastomers or other metal-elastomer composites; ceramic-polymer composites or ceramic-elastomer composites; carbon-filled polymers or other carbon-polymer composites; carbon-filled elastomers or other carbon-elastomer composites; watertight fabrics, including metalized fabrics; or combinations of one or more of the above. Heat flux through thermally-conductive membrane 2008 is preferably sufficient to substantially maintain a commanded temperature of thermally-conductive membrane 2008 when in contact with the skin of the user, where said commanded temperature is preferably in the range of c.a. 0 to 49° C.

A thermal actuator laminate 1630 is preferably coupled to the inner surface of a tactile actuator laminate 1620 (FIG. 18A) via a bonding surface 1815 (FIG. 18B) of an elastic membrane 1808 (FIG. 18B) of a fluidic tactile actuator 1800 (FIG. 18B). Coupling of thermal actuator laminate 1630 to tactile actuator laminate 1620 (FIG. 18A) preferably only occurs at a minority of fluidic tactile actuators 1800 (FIG. 18B) in order to minimize undesirable lateral forces. In one example, a thermal actuator laminate 1630 is bonded to a tactile actuator laminate 1620 (FIG. 18A) at each tenth fluidic tactile actuator 1800 (FIG. 18B) in an evenly spaced grid. Said undesirable lateral forces may be created by the disparate motion of adjacent fluidic tactile actuators 1800 when the fluidic tactile actuators 1800 are coupled to the outer surface of a thermal actuator laminate 1630.

Fluidic Distribution System

FIGS. 21A-23B show a fluidic distribution system in accordance with various embodiments. A fluidic distribution system comprises a plurality of channels 2102 that supply a working fluid to a fluidic tactile actuator 1800 (FIG. 18A) of a tactile actuator laminate or to a fluidic thermal actuator 2000 (FIG. 20A) of a thermal actuator laminate. In a preferred embodiment, a fluidic distribution system comprises a fluidic distribution laminate 1610. FIG. 21A shows a bottom view of a fluidic distribution laminate 1610 suitable for use with the tactile actuator laminate 1620 of the embodiment of FIG. 18A. Shown in FIG. 21A is a substrate 2103 (FIG. 21B), comprising a plurality of channels 2102, bonded to substrate 1803 (FIG. 18B) of a tactile actuator laminate. Tactile actuator laminate substrate 1803 is rendered as semi-transparent in FIG. 21A for clarity. A fluidic distribution laminate suitable for use with a thermal actuator laminate is anticipated to be substantially similar to fluidic distribution laminate 1610, differing only, for example, in channel size, orifice size, or orifice placement.

FIG. 21B shows a cross-section of a fluidic distribution laminate 1610 in accordance with one embodiment. Bonding of tactile actuator laminate substrate 1803 to the inner surface of channels 2102 of a fluidic distribution laminate creates a path for working fluid to flow into a fluidic tactile actuator 1800 (FIG. 18B)—via channel 2107 and supply orifice 1802—and out of a fluidic tactile actuator 1800—via channel 2104 and exhaust orifice 1804.

FIG. 21C shows an exploded view of the cross section of FIG. 21B in accordance with one embodiment. Substrate 2103 is preferably composed of a flexible substrate material. Tactile actuator laminate substrate 1803 is bonded to substrate 2103 via bonding surface 2109 to form enclosed, substantially airtight channels 2102. In an alternate embodiment, substrate 2103 is composed from a first and second layer of a flexible substrate material. In this alternate embodiment, lip 2106 of channel 2102 is formed from a hole cut in a first layer of flexible substrate material. Said first layer is bonded to the inner surface of a second layer of flexible substrate material to create a channel 2102. In one embodiment of a fluidic distribution laminate, shown in FIG. 22, two or more channels 2102, 2202 are layered to increase working fluid capacity of a fluidic distribution laminate. Substrate 2103 is bonded to the inner surface of 2203 to create enclosed, substantially airtight channels 2202.

FIG. 23A shows a top view of a fluidic distribution laminate in accordance with one embodiment, illustrating a routing of a plurality of channels from a fluidic connector 2350 to a plurality of supply/exhaust orifices 1802, 1804. Tactile actuator laminate substrate 1803 is rendered as semi-transparent in FIG. 23A for clarity. A group 2302 of channels supplies working fluid to a zone 2304 of a tactile actuator laminate or thermal actuator laminate. Multiple zones 2304 are combined to form a segment 2300. Each segment 2300 preferably comprises a ribbon assembly 2306, comprising one or more layers of channels. Ribbon assembly 2306 preferably terminates in a fluidic connector 2350. Ribbon assembly 2306 is anticipated in most cases to have a length substantially exceeding the length of the remainder of segment 2300, as indicated by symbol 2308.

FIG. 23B shows a cross-section of a ribbon assembly 2306 and fluidic connector 2350 of a fluidic distribution laminate in accordance with one embodiment. A housing 2352, preferably composed in whole or part of a rigid structural material, encloses the base and sides of ribbon assembly 2306. Housing 2352 is coupled to a gasket 2354 located on the upper surface of said housing. A first channel 2102 (FIG. 23A), located in an upper layer of a fluidic distribution laminate, terminates in an orifice 2310. A second channel 2202, located in a middle layer of a fluidic distribution laminate, terminates in an orifice 2312. A third channel 2206, located in a lower layer of a fluidic distribution laminate, terminates in an orifice 2314 (FIG. 23A). Fluidic connectors are coupled by bringing gasket 2354 faces of two said connectors into contact and applying sufficient force (by means of, e.g. a mechanical coupling of a temporary coupling point of an exoskeleton) to seal orifices 2310-2314 against matching orifices on another fluidic connector. The stiff material of housings 2352 of said connectors ensure that their channels are not crushed by the application of a coupling force to the two fluidic connectors.

In a preferred embodiment, working fluid carried by a fluidic distribution laminate 1610 (FIG. 16) has a maximum gauge pressure between 0.050 and 1.0 MPa. In a more preferred embodiment, working fluid carried by a fluidic distribution laminate 1610 has a maximum gauge pressure between 0.10 and 0.75 MPa. In an even more preferred embodiment, working fluid carried by a fluidic distribution laminate 1610 has a maximum gauge pressure between 0.20 and 0.50 MPa.

In a first alternate embodiment, one or more portions of a channel 2102 (FIG. 21A) of a fluidic distribution system are replaced by a tube, pipe, or other elongated, enclosed element. In a second alternate embodiment, referring now to FIG. 17, a fluidic distribution system comprises a high-pressure portion (configured to carry a working fluid having a maximum gauge pressure c.a. greater than or equal to 5 MPa), and a low-pressure portion (configured to carry a working fluid having a maximum gauge pressure c.a. less than or equal to 1 MPa). The high-pressure portion comprises one or more high-pressure fluid lines 1702 coupled to the low-pressure portion by means of a pressure regulator 1704. Referring still to FIG. 17, in a third alternate embodiment, a fluidic distribution system comprises a chamber 1705 coupled to a plurality of tactile or thermal elements. In a preferred variation, said fluid reservoir comprises two thin layers of flexible material joined by a plurality of projections 1708 in the manner of a thermal actuator laminate 1630, as described hereinabove.

A channel 2102 (FIG. 21A) of a fluidic distribution system coupled to a fluidic tactile actuator 1800 (FIG. 18A) is preferably configured such that the transit time through said channel 2102 (FIG. 21A) of a unit of working fluid sufficient to substantially fill the volume of the coupled fluidic tactile actuator 1800 (FIG. 18A) at the maximum operating pressure of said fluidic tactile actuator 1800 (FIG. 18A) is less than 0.25 sec. More preferably, said transit time is less than 0.10 sec. Even more preferably, said transit time is less than 0.050 sec. A channel 2102 (FIG. 21A) of a fluidic distribution system coupled to a fluidic thermal actuator 2000 (FIG. 20B) is preferably configured such that the transit time through said channel 2102 (FIG. 21A) of a unit of working fluid sufficient to substantially fill the volume of the coupled fluidic thermal actuator 2000 (FIG. 20B) at the maximum operating pressure of said fluidic thermal actuator 2000 (FIG. 20B) is less than 0.50 sec. More preferably, said transit time is less than 0.20 sec.

Sensing and Actuation

Figure 24:
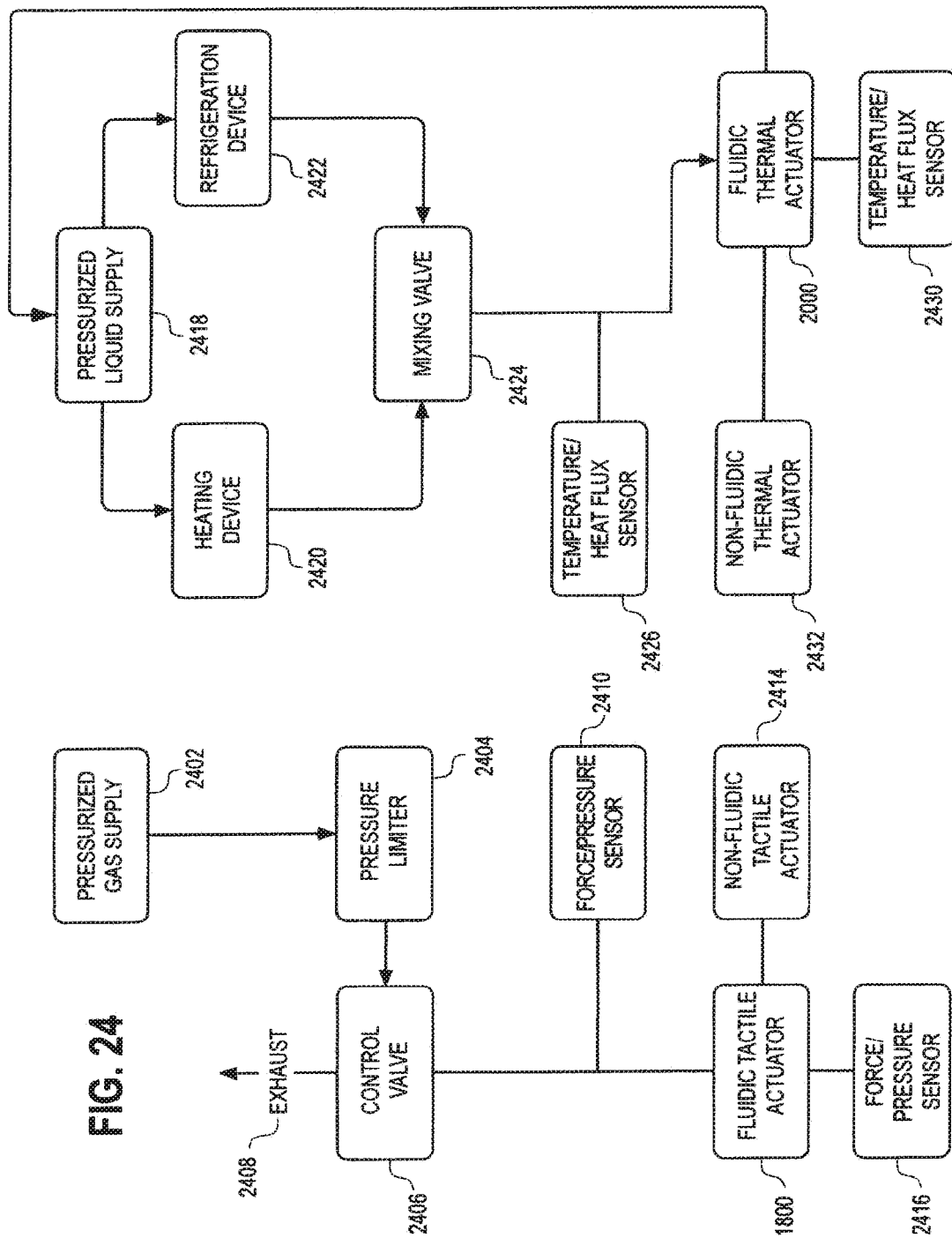
FIG. 24 is a block diagram of sensors and actuators of an interface laminate in accordance with one embodiment.

FIG. 24 generally depicts a block diagram of sensors and actuators of an interface laminate in accordance with one embodiment. A pressurized gas supply 2402 is coupled to a fluidic tactile actuator 1800. The working fluid supplied to fluidic tactile actuator 1800 by pressurized gas supply 2402 is preferably air. In one embodiment, the working fluid comprises carbon dioxide, or another gas which liquefies at or near room temperature under a pressure of less than c.a. 20 MPa. In another embodiment, the working fluid comprises helium in order to increase flow rate or flow speed. Pressurized gas supply 2402 includes compression, filtration, lubrication, pressure regulation, or any other standard pneumatic equipment necessary for suitable operation with sensors and actuators to which the pressurized gas supply 2402 is coupled.

Pressurized gas supply 2402 is coupled to pressure limiter 2404. Pressure limiter 2404 can be a relief valve, burst disc, or other suitable over-pressure prevention device. Pressure limiter 2404 is coupled to control valve 2406. Control valve 2406 comprises any suitable actuator including electromechanical, fluidic, or solid-state actuators. Embodiments are contemplated wherein: a control valve 2406 is located adjacent to a fluidic tactile actuator 1800 (as in FIG. 17); a control valve 2406 is located on the body of a user, but not adjacent to a fluidic tactile actuator 1800; or, in a preferred embodiment, a control valve 2406 is located off of the body of a user.

In a first embodiment, a control valve 2406 comprises an electromechanical actuator, such as a solenoid, a brushed or brushless DC motor, an AC induction or synchronous motor, or a voice coil actuator. In a second embodiment, a control valve 2406 comprises a contractile material.

In one embodiment of a control valve 2406 having a solid-state actuator, control valve 2406 is actuated by the thermal expansion or contraction of a solid-state material. Referring now to FIG. 17, a control valve 2406 of the aforementioned type is shown in accordance with one embodiment. A thin, hollow shell 1724—composed of a material with high tensile strength and high thermal conductivity (e.g. aluminum, copper or another metal; metal-filed epoxy or another metal-polymer composite; a ceramic-polymer composite; a carbon-filled polymer or other carbon-polymer composite; any rigid structural material not mentioned above; or combinations of two or more of the above)—is filled with a working material 1726. Said working material is preferably an elastomer with a low bulk modulus, a high coefficient of volumetric thermal expansion, a low heat capacity, and a wide range of solid-phase temperatures in which the material remains stable (e.g. polydimethylsiloxane). The filled shell assembly is sandwiched between a heating element 1730 and a heat sink 1740.

In one variation, a heat sink 1740 comprises a chamber 1725, formed by the top surface of shell 1724 and bottom surface of a substrate 1706 separated by projections 1716 in the manner of a thermal actuator laminate 1630, as described hereinabove. A coolant fluid is circulated through chamber 1725. In a second variation, a heat sink 1740 comprises a thermoelectric element or other electrical refrigeration element. A heating element 1730 is preferred to comprise a resistive heater, thermoelectric element, or other electrical heating element. In a third variation, a heating element 1730 comprises a heated fluid circulated in the manner of the coolant fluid as described hereinabove.

The temperature of filled shell assembly 1724, 1726 is controllably modulated by the action of heating element 1730, causing the working material 1726 to expand. A small orifice is located on one of the faces 1728 of the assembly, such that the working material 1726 is forced through the orifice when expanded. The large difference in volume of the main body of the working material 1726 and the volume of the working material allowed through the orifice produces a solid-state analog of hydraulic displacement amplification, creating a useful displacement of the working material 1726 through the orifice from a relatively small bulk expansion of the working material 1726. Thus, by regulating the bulk temperature of the filled shell assembly 1724, 1726 a controllable and repeatable displacement of arbitrary precision, appropriate for the control of fluid flow, is obtained. In a preferred variation, said actuation is utilized to regulate the diameter of a flexible via 1732, which in turn regulates the flow of a working fluid through an orifice 1802 coupled to the via.

In an alternate embodiment of a control valve 2406 actuated by the thermal expansion or contraction of a solid-state material, expansion of working material 1726 fills a void in said working material 1726, rather than expanding through an orifice. In one example, a filled shell assembly comprises a flow path comprising a first and second orifice coupled to a void in working material 1726. Expansion of working material 1726 seals said void, preventing working fluid from flowing through the flow path. Contraction of working material 1726 reopens said void, allowing working fluid to flow through the flow path.

In a preferred embodiment, a control valve 2406 of a thermal-expansion type has a maximum operating frequency of at least 5.0 Hz. In a more preferred embodiment, a control valve 2406 of a thermal-expansion type has a maximum operating frequency of at least 10 Hz. In an even more preferred embodiment, a control valve 2406 of a thermal-expansion type has a maximum operating frequency of at least 20 Hz.

In one embodiment, a control valve 2406 comprises a liquid that changes volume, phase, viscosity, or other properties when exposed to varying temperatures, electric currents, magnetic fields, or other stimuli. In one variation of this embodiment, a control valve 2406 comprises a working fluid that undergoes a phase change to a gaseous state. In one example, a thin-film resistive heating element is embedded in a chamber containing a small volume of liquid working fluid covered by a flexible membrane. A short (c.a. <10 microsecond) electric pulse is applied to the resistive heating element, said pulse having a power sufficient to flash vaporize a small amount of the actuator's working fluid. The expansion of the vaporized fluid creates a brief displacement of the membrane before the vapor bubble collapses as the system rapidly returns to thermal equilibrium. Precise control is achieved over the motion of the membrane by controlling the total amount of heat energy deposited in the working fluid by the heating element and the timing of the electric pulses. The motion of the membrane is in turn used to actuate e.g. a flexible via 1732 as described hereinabove.

Referring again to FIG. 24, in one embodiment, a control valve 2406 is configured in a "3/2" arrangement, having a first port coupled to a fluidic tactile actuator 1800. Said first port is variably coupled to a second port (coupled to pressurized gas supply 2402), or to a third port (coupled to exhaust 2408). In another embodiment, a control valve 2406 comprises two "2/2" valves: one having a first port coupled to a fluidic tactile actuator 1800 and a second port coupled to pressurized gas supply 2402; the second having a first port coupled to a fluidic tactile actuator 1800 and a second port coupled to exhaust 2408. In the case that the fluidic tactile actuator 1800 uses air as a working fluid, exhaust 2408 preferably discharges to atmosphere. In the case that fluidic tactile actuator 1800 uses another working fluid, exhaust 2408 preferably discharges to an inlet of pressurized gas supply 2402 to form a closed-loop system.

In one embodiment, a control valve 2406 comprises a piloted element (where a working fluid controlled by a first valve is used to actuate a second valve) in order to increase e.g. the maximum flow rate or operating pressure of the control valve 2406. In a variation of this embodiment, intermittent actuation of a first valve regulates a continuous flow of a working fluid through a second valve by means of a piloted element.

In a preferred embodiment, a force or pressure sensor 2410 is coupled to the internal volume of a fluidic tactile actuator 1800. Force or pressure sensor 2410 is preferably located off of the body of the user. In another embodiment, a force or pressure sensor 2416 is coupled to an exterior portion of a fluidic tactile actuator 1800. FIG. 17 shows a thin-film force sensor 1742, mounted on a flex circuit 1738, coupled to the outer surface of a fluidic tactile actuator 1800 in accordance with this embodiment. Referring again to FIG. 24, in various embodiments, force or pressure sensors 2410, 2416 comprise one or more of the following: a strain gauge (such as a foil, semiconductor, thin film, or wire strain gauge), piezoelectric sensor (such as a piezoelectric crystal or piezoelectric film sensor), or other type of sensor (such as a linear variable differential transformer, capacitive displacement sensor, optical sensor, magneto-elastic device, or vibrating element force transducer). In some embodiments, the force or pressure to be measured acts on one or more intermediate elements, rather than directly acting on the aforementioned sensors. For example, a linear variable differential transformer is used to measure the displacement of a spring (with a known spring constant) under load in order to approximate the force acting on the spring.

In one embodiment, a fluidic tactile actuator 1800 is coupled to a non-fluidic tactile actuator 2414. In a preferred variation, a fluidic tactile actuator 1800 produces low-frequency, spatially localized stimuli sufficient to stimulate the Merkel-type (SA1) or Meissner-type (RA1) mechanoreceptors of a user's skin and a non-fluidic tactile actuator 2414 produces high-frequency, spatially diffuse stimuli sufficient to stimulate the Ruffini-type (SA2) or Pacinian-type (RA2) mechanoreceptors of a user's skin. A non-fluidic tactile actuator 2414 comprises any suitable actuator, including electromechanical or solid-state actuators. In one variation, a non-fluidic tactile actuator 2414 comprises an eccentric rotating mass, linear resonant actuator or other vibration motor. In another variation, a non-fluidic tactile actuator 2414 comprises a solid-state actuator, such as: a piezoceramic bimorph actuator or other piezoelectric actuator, or an electroactive polymer actuator.

In another embodiment, a fluidic tactile actuator 1800 is coupled to a control valve 2406 comprising a first and second valve. In a preferred variation of this embodiment, a first valve produces low-frequency, spatially localized stimuli sufficient to stimulate the Merkel-type (SA1) or Meissner-type (RA1) mechanoreceptors of a user's skin and a second valve produces high-frequency, spatially diffuse stimuli sufficient to stimulate the Ruffini-type (SA2) or Pacinian-type (RA2) mechanoreceptors of a user's skin.

In one embodiment, a fluidic actuator 308, 310 (FIG. 3) of a locomotor system of an exoskeleton is coupled to a pressurized gas supply 2402 or a pressurized liquid supply 2418 by means of a control valve 2406.

A pressurized liquid supply 2418 is coupled to a fluidic thermal actuator 2000. The working fluid supplied to fluidic thermal actuator 2000 by pressurized liquid supply 2418 is preferably water. Other coolant fluids are contemplated as an element comprising a working fluid for fluidic thermal actuator, such as: propylene glycol, ethylene glycol, and other glycols; or mineral oils, silicone oils, and other oils. Pressurized liquid supply 2418 includes pumping, filtration, pressure regulation, or any other standard hydraulic equipment necessary for suitable operation with sensors and actuators to which the pressurized liquid supply 2418 is coupled.

Pressurized liquid supply 2418 is coupled to a heating device 2420, and to a refrigeration device 2422. Heating and refrigeration devices 2420 and 2422 comprise, for example: a thermoelectric element, resistive heater, or other electric heat pump; or vapor-compression heat pump. In one embodiment, heating device 2420 and refrigeration device 2422 are coupled such that heat is transferred from a first "cold" portion of a pressurized liquid supply 2418 to a second "hot" portion of a pressurized liquid supply 2418. Heated and refrigerated portions of the working fluid of a fluidic thermal actuator are preferably each stored in a separate reservoir, along with a third ambient temperature fluid reservoir.

The maximum temperature of working fluid supplied to a fluidic thermal actuator 2000 by pressurized liquid supply 2418 preferably is not greater than a temperature sufficient to burn a user's skin over several minutes of constant exposure (c.a. 49° C.). The minimum temperature of working fluid supplied to a fluidic thermal actuator 2000 by pressurized liquid supply 2418 preferably is not less than a temperature sufficient to cause frostbite over several minutes of constant exposure (c.a. 0° C.).

Heating device 2420 and refrigeration device 2422 are preferably both coupled to mixing valve 2424. Mixing valve 2424 comprises a control valve 2406 configured to mix together two or more streams of liquid. Embodiments are contemplated wherein: a mixing valve 2424 is located adjacent to a fluidic thermal actuator 2000; a mixing valve 2424 is located on the body of a user, but not adjacent to a fluidic thermal actuator 2000; or, in a preferred embodiment, a mixing valve 2424 is located off of the body of a user.

In a preferred embodiment, a mixing valve 2424 outputs: an ambient temperature working fluid, a heated working fluid, a refrigerated working fluid, a mixture of an ambient temperature and heated working fluid, or a mixture of an ambient temperature and refrigerated working fluid. In one variation, a mixing valve 2424 outputs a mixture of a heated working fluid and refrigerated working fluid, though this is not preferred due to decreased energy efficiency when producing intermediate temperatures. In one embodiment, mixing valve 2424 is configured to regulate the volume of working fluid flowing to fluidic thermal actuator 2000 in order to e.g. regulate heat flux at said fluidic thermal actuator or reduce consumption of working fluid. In a preferred embodiment, a mixing valve 2424 comprises three "2/2" valves: one having a first port coupled to a fluidic thermal actuator 2000 and a second port coupled to an ambient temperature working fluid reservoir; the second having a first port coupled to a fluidic thermal actuator 2000 and a second port coupled to a heated working fluid reservoir; and the third having a first port coupled to a fluidic thermal actuator 2000 and a second port coupled to a refrigerated working fluid reservoir.

In a preferred embodiment, a temperature or heat flux sensor 2426 is coupled to the internal volume of a fluidic thermal actuator 2000. Temperature or heat flux sensor 2426 is preferably located off of the body of the user. In another embodiment, a temperature or heat flux sensor 2430 is coupled to an exterior portion of a fluidic thermal actuator 2000. FIG. 17 shows a thin film temperature sensor 1748, mounted on a flex circuit 1750, coupled to the outer surface of a fluidic thermal actuator 2000 in accordance with this embodiment. Referring again to FIG. 24, in various embodiments, a temperature or heat flux sensor 2426, 2430 comprises: a thermocouple, a resistive temperature device, an infrared sensor, a bimetallic temperature sensor, a thermometer, or a silicon diode.

In one embodiment, a fluidic thermal actuator 2000 is coupled to a non-fluidic thermal actuator 2432. In a preferred variation, a non-fluidic thermal actuator 2432 heats the skin of a user, and a fluidic thermal actuator 2000 cools the skin of a user. A non-fluidic thermal actuator 2432 comprises, for example: a resistive heater, a thermoelectric element, or other electrical heating or cooling element.

Selector Valve

Figures 25, 25A, 25B:
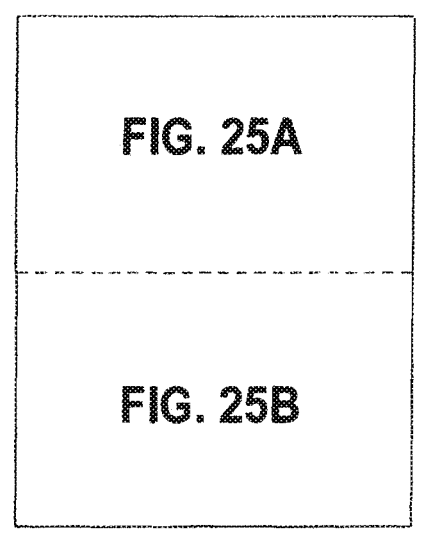

An interface laminate is anticipated, in most embodiments, to comprise a large number of tactile actuators 140 (FIG. 1) or thermal actuators 142 (FIG. 1). FIG. 25 shows, in accordance with one embodiment, a means of reducing the number of valves or sensors required to operate these tactile and thermal actuators by the addition of one or more selector valves 2502-2504. A selector valve 2502-2504 comprises a flow selection element configured to couple an inlet port to a plurality of outlet ports in sequence. FIGS. 26A-D show a selector valve in accordance with one embodiment, comprising: a base plate assembly 2650, having an inlet channel 2622 and a plurality of outlet channels 2616-2621; a control plate assembly 2670 whose rotation is coupled to a rotary actuator 2602 having a keyed shaft (not shown) by a projection 2605; and a bracket 2619, which couples base plate assembly 2650 to rotary actuator 2602. Compression spring 2606 presses control plate assembly 2670 into base plate assembly 2650 with a force sufficient to cause flange 2610 to seal off one or more outlet channels 2616-2621. Flange 2610 of control plate assembly 2600 comprises a depression 2611, preferably having filleted edges 2612. Depression 2611 has a depth sufficient to enable substantially unrestricted flow through a channel 2618 located within said depression while flange 2610 seals off other outlet channels 2616, 2620, 2621. Rotation of rotary actuator 2602 changes the angular position of depression 2611, thus changing which outlet channels 2616-2621 permit flow. Rotary actuator 2602 preferably comprises an electromechanical actuator (e.g. a brushed or brushless DC motor, or an AC induction or synchronous motor) coupled to a potentiometer, encoder, or other goniometer. Rotary actuator 2602 alternately comprises any other suitable actuator described hereinabove for use with a control valve.

Figure 26A:
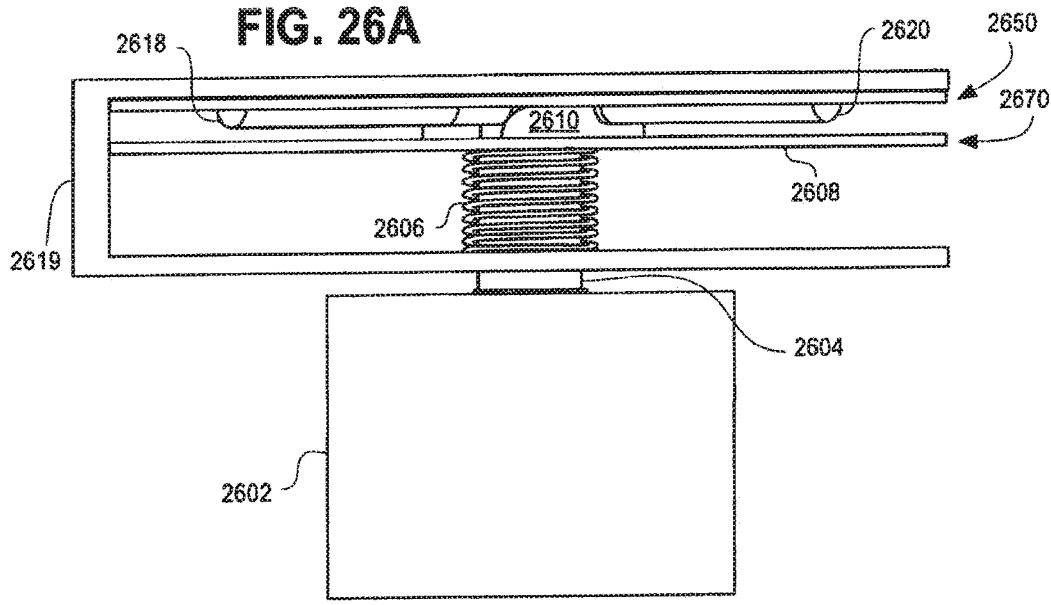
FIG. 26A is a side view of a selector valve in accordance with one embodiment.
Figure 26B:
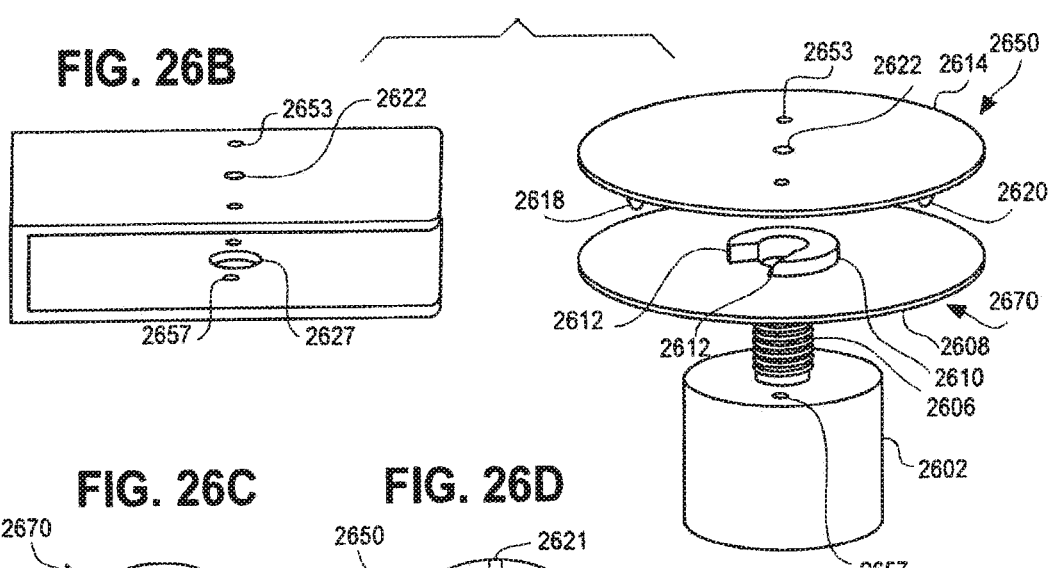
FIG. 26B is an exploded perspective view of the selector valve of the embodiment of FIG. 26A.
Figure 26C:
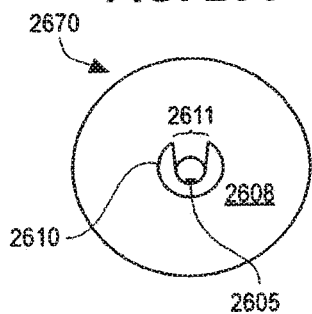
FIG. 26C is a top view of a control plate assembly of the selector valve of the embodiment of FIG. 26A.
Figure 26D:
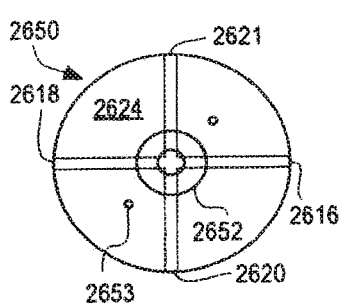
FIG. 26D is a bottom view of a base plate assembly of the selector valve of the embodiment of FIG. 26A.

FIG. 26D shows a bottom view of a base plate assembly 2650 of a selector valve in accordance with one embodiment. Base plate assembly 2650 comprises a fluidic distribution laminate 2624 having a plurality of outlet channels 2616-2621 coupled to an inlet channel 2622. Fluidic distribution laminate 2624 is coupled to a support member 2614 (FIG. 26B) composed of a stiff material. Fluidic distribution laminate 2624 is preferably composed of a flexible substrate material. Fluidic distribution laminate 2624 is preferably coupled to a liner 2652 comprising a flexible material having a high strength and robustness, such as: polyethylene terephthalate film or other polymer films, or nylon or other textiles. The top surface of liner 2652 is optionally coated with a friction-reducing material.

FIG. 26C shows a top view of a control plate assembly 2670 of a selector valve in accordance with one embodiment. Support member 2608 is coupled to flange 2610 and to axle 2604 (FIG. 26A) of rotary actuator 2602 (FIG. 26A) via projection 2605. Depression 2611 is formed by a discontinuity in flange 2610. Edges 2612 (FIG. 26B) of flange 2610 are filleted to reduce wear on outlet channels 2616-2621 (FIG. 26D).

Referring again to FIG. 25, a first method of controlling a fluidic tactile actuator via a selector valve comprises coupling a first fluidic tactile actuator 1800 and a second through nth fluidic actuator 2514-2516 sequentially to a control valve 2406 by means of a selector valve 2502. The number, n, of fluidic tactile actuators 1800, 2514-2516 that can be controlled by a single control valve 2406 in this method is broadly equal to the lesser of: the maximum bandwidth of control valve 2406 divided by the required bandwidth of each fluidic tactile actuator 1800, 2514-2516; or the maximum flow rate of control valve 2406 divided by the required flow rate of each fluidic tactile actuator 1800, 2514-2516. In a preferred embodiment, said number n of fluidic tactile actuators 1800, 2514-2516 is greater than or equal to 20. In a more preferred embodiment, said number n of fluidic tactile actuators 1800, 2514-2516 is greater than or equal to 50. In an even more preferred embodiment, said number n of fluidic tactile actuators 1800, 2514-2516 is greater than or equal to 100. In one embodiment, a force or pressure sensor 2410 is also coupled sequentially to a plurality of fluidic actuators by means of a selector valve 2502.

In a preferred embodiment, a control valve 2406 coupled to fluidic tactile actuator 1800 by means of a selector valve 2502 has a maximum operating frequency of at least 200 Hz. In a more preferred embodiment, a control valve 2406 coupled to fluidic tactile actuator 1800 by means of a selector valve 2502 has a maximum operating frequency of at least 400 Hz. In a most preferred embodiment, a control valve 2406 coupled to fluidic tactile actuator 1800 by means of selector valve 2502 has a maximum operating frequency of at least 1.00 kHz.

A second method of controlling a fluidic tactile actuator via a selector valve comprises: coupling a first group 2540 of fluidic tactile actuators to a control valve 2406, by means of a selector valve 2503, upon the occurrence of a defined event; coupling a second group 2542 of fluidic tactile actuators to a control valve 2406, by means of a selector valve 2503, upon the occurrence of a second defined event. Said defined events comprise, for example: a simulated contact occurring at the portion of a user's skin surface where the first group 2540 of fluidic tactile actuators is located; and a simulated contact occurring at the portion of a user's skin surface where the second group 2542 of fluidic tactile actuators is located.

In one embodiment, a plurality of mixing valves 2424, each having a piloted element, are sequentially coupled to a control valve 2507 by means of a selector valve 2504.

Biosignal Sensor

Referring to FIG. 1, one or more biosignal sensors 135 (FIG. 1) are optionally included in an interface laminate. A biosignal sensor is preferably bonded to the inner surface of an interface laminate. In a preferred embodiment, a biosignal sensor 135 comprises a bioelectric sensor variously configured to output myoelectric, electroencephalographic, electrocardiographic, electrodermal, or other bioelectric data. In one variation, a biosignal sensor 135 comprises a biochemical sensor.

In one embodiment, a bioelectric sensor comprises a flex circuit with a plurality of exposed electrodes. In another embodiment, a bioelectric sensor comprises a plurality of flexible, elastic electrical conductors (composed of e.g. a conductive fabric or elastomer-metal composite). Alternately, said electrical conductors are flexible but inelastic, and distributed in a pattern (e.g. a "zig-zag" or "S" shape) that allows the inelastic conductors to displace out-of-plane. In a preferred embodiment, the assembly of electrodes, conductors, and any substrate material composing a bioelectric sensor occupies a minority of the inner surface area of an interface laminate so as not to impede heat transfer from a thermal actuator laminate to a user's skin. In one embodiment, a bioelectric sensor directly senses or actuates a user's nervous system by communicating with a worn or implanted neural interface device.

Audiovisual Interface

Figure 15:
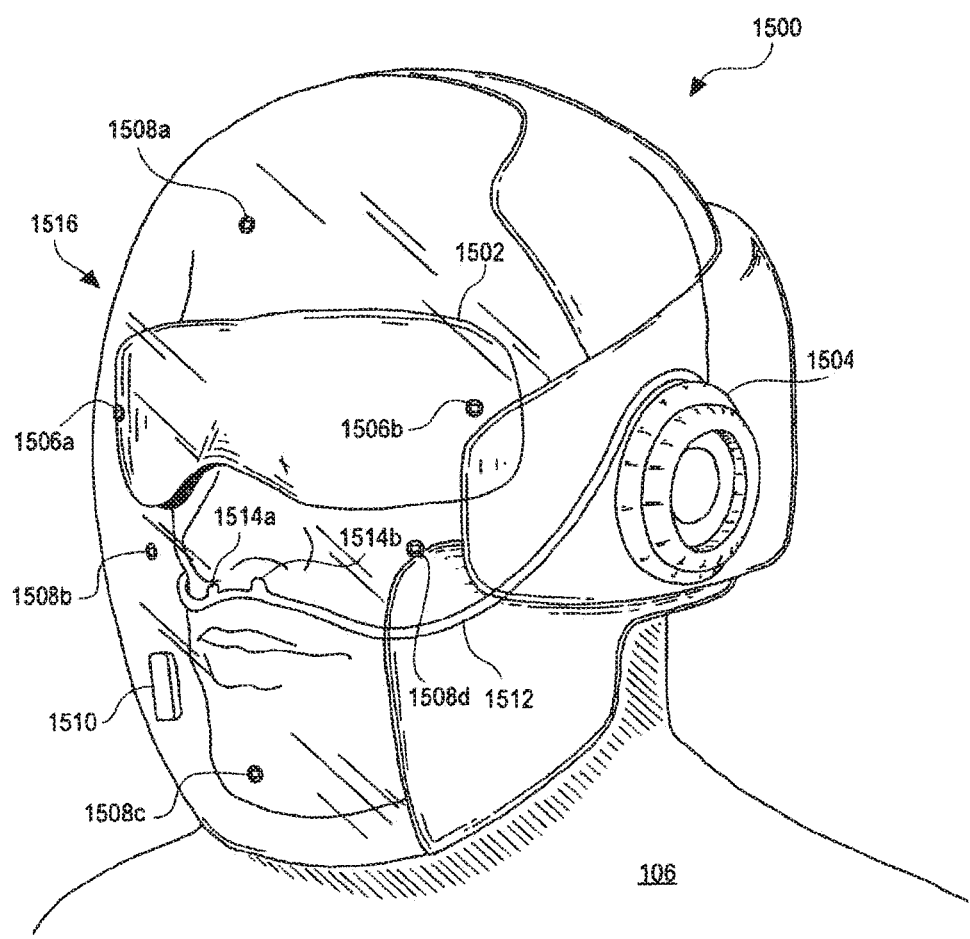
FIG. 15 is a front perspective view of a head portion of an interface garment in accordance with one embodiment. The outer surface of the head portion is rendered as semi-transparent to illustrate key systems within.

Referring now to FIG. 1, a human-computer interface terminal 102 preferably comprises one or more audiovisual interface devices, including: a binocular display 144, a loudspeaker 145, and a microphone 139. FIG. 15 shows said audiovisual interface devices in accordance with one embodiment. A binocular display 144 (FIG. 1) preferably comprises a head-mounted display device 1502 mounted near the eyes of a user 106. A loudspeaker 145 (FIG. 1) preferably comprises a headphone driver 1504. A first 1504 and second (not shown) headphone driver are preferably mounted near the ears of user 106. A microphone 139 (FIG. 1) preferably comprises a small microphone 1510 located near the mouth of user 106.

Facial Tracking

Referring again to FIG. 1, a human-computer interface terminal 102 preferably comprises one or more facial tracking devices, including: a facial tracking sensor 137 and an eye tracking sensor 138. FIG. 15 shows said facial tracking devices in accordance with one embodiment. A facial tracking sensor 137 (FIG. 1) and an eye tracking sensor 138 (FIG. 1) preferably each comprise a camera. Even more preferably, a facial tracking sensor 137 (FIG. 1) and an eye tracking sensor 138 (FIG. 1) each comprise a camera sensitive to light in the infrared range 1506a/b, 1508a-d. In a preferred embodiment, a plurality of cameras 1506a/b, 1508a-d are located near the face of a user 106. An infrared light source sufficient to illuminate the face of user 106 can be included anywhere in or near a human-computer interface terminal 102 (FIG. 1).

One or more cameras 1506a/b are preferably mounted inside a head-mounted display 1502. Cameras 1506a/b are variously configured to: produce gaze point, vergence, and pupillary dilation data for the user's 106 eyes; or to supply facial tracking data for any parts of the user's 106 face occluded from view of facial tracking sensors 1508a-d by head mounted display 1502. In an alternate embodiment, a single facial-tracking camera is used for the whole face of a user 106. Though markerless facial tracking is preferred for simplicity, markers are optionally added to the face of a user to facilitate improved tracking accuracy.

Chemical Delivery System

Referring again to FIG. 1, a human-computer interface terminal 102 preferably comprises a chemical delivery system 146 configured to stimulate the chemical senses (i.e. olfaction and gustation) of a user 106. In one embodiment, a chemical delivery system comprises: an aroma or flavor dispensing device comprising a plurality of aroma or flavor compounds, which are preferably mixed with an appropriate solvent such as water or ethanol in varying concentrations to normalize their perceived intensity. These aroma and flavor compounds are preferably each enclosed within a sealed, disposable cartridge which can be periodically switched out when empty. The fluid in the cartridges is placed under pressure by the action of gravity or by artificial means, allowing small amounts of fluid to be dispensed by one or more valves. After being dispensed, the fluid is volatilized, preferably through the action of an ultrasonic diaphragm, and alternately through the application of heat or pressure, as by an atomizer or nebulizer.

Referring now to FIG. 15, purified air is preferably carried through said aroma or flavor dispensing device and into a tube 1512. The purified air exits through an orifice 1514a near the user's 106 nose; air from the space in or around a user's 106 nose re-enters tube 1512 through an adjacent orifice 1514b, and is ultimately ejected from a human-computer interface terminal 102 (FIG. 1) via tube 1512. Volatilized aroma and flavor compounds enter the air stream of tube 1512 as they are dispensed. Thus, their time-varying concentration in the air stream is precisely controlled by the action of the aforementioned valves.

Additionally, the aroma or flavor dispensing device optionally dispenses compounds for delivery to the mouth of a user 106. Such compounds include, for example: flavorant compounds detected by the tongue (e.g. sucrose or glutamate); other edible compounds (e.g. capsaicin or piperine); nutritive elements (e.g. proteins, fats, vitamins, and minerals); drug compounds (e.g. ethanol or caffeine); or combinations of two or more of the above. In one embodiment, aroma or flavor compounds are delivered to the mouth of a user 106 by a mouthpiece variously configured to simulate taste or mouth-feel. Said mouthpiece preferably includes a top or bottom portion, whose inner surface is configured to be secured to a user's 106 teeth by means of a passive mechanism, such as friction, or by means of an active mechanism, such as a membrane filled with pressurized air to generate a clamping force.

A surface of said mouthpiece is preferably covered with one or more tactile or thermal actuators of any of the types described hereinabove (in the "Interface Laminate" section), or of another suitable type. A series of small tubes arranged in one or more flat ribbons preferably couple the mouthpiece to an aroma or flavor dispensing device. These ribbons run to the top or bottom portions of a mouthpiece, preferably contouring to the upper or lower lips respectively of a user 106. Said tubing terminates in one or more orifices positioned throughout the mouth of user 106 that are configured to dispense edible compounds onto the tongue or into the back of the throat of user 106. A waterproof camera and light source are optionally included to provide data on the motion and position of the lips, tongue, or mouth of user 106, including stereotyped muscle motions, such as trough formation in the tongue, indicating the commencement of the autonomic swallowing response. In an alternate embodiment, one or more tubes are positioned outside and immediately adjacent to the mouth of user 106 to dispense water or other edible fluids into the mouth when opened.

Interface Garment

Referring to FIG. 1, in a preferred embodiment of the present invention, a human-computer interface terminal 102 comprises an interface garment. An interface garment comprises input transducers 108 and output transducers 110 advantageously located on or near the body of user 106, including one or more of the following: a force or torque sensor 133, a biosignal sensor 135, a facial tracking sensor 137, an eye tracking sensor 138, a microphone 139, a tactile actuator 140, an actuated articulation 141, a thermal actuator 142, a binocular display 144, or a loudspeaker 145. FIGS. 27A-B generally depict one embodiment of an interface garment comprising: an undersuit 2708, a body-borne portion 703 of an exoskeleton, an intermediate layer 2704, and a veneer 2706. FIG. 27B shows a cross section of a portion 2701 of an interface garment.

In one embodiment, an interface garment comprises a separable head portion 1500 and body portion 2700. In a second embodiment, a body portion 2700 is divided into separable upper body 2720 and lower body 2730 portions. In a third embodiment, an interface garment comprises a separable hand portion 2725 or a separable foot portion 2735. In a fourth embodiment, an interface garment comprises two separable arm portions 2745a/b or two separable leg portions 2755a/b. In a fourth embodiment, an interface garment comprises a separable torso portion 2760.

An undersuit 2708 prevents direct contact between a user's skin surface and the inside of an interface garment. The use of an undersuit 2708 reduces the need to clean an interface garment, and offers improved hygiene, particularly in cases where a single interface garment is shared between multiple users. In a first embodiment, an undersuit 2708 is washed after use and reused. In a second embodiment, an undersuit 2708 is disposed of after each use. An undersuit preferably comprises a thin, elastic, thermally conductive, and substantially liquid-impermeable material. Said material comprises, for example: elastane, cotton, polyester or other fibers; metallic fibers or particles, as in a fabric-metal composite; polyethylene or other polymer fibers or films; paper; or combinations of two or more of the above.

A body-borne portion 703 of an exoskeleton of an interface garment is preferably coupled to the wearer's body by means of an intermediate layer 2704 bonded to the inner surface of the body-borne exoskeleton 703. In a preferred embodiment, an intermediate layer 2704 comprises an interface laminate 1600. FIG. 28 shows an exemplary cross section of an interface laminate 1600 bonded to the inner surface of a body-borne portion 703 of an exoskeleton in accordance with one embodiment. A force 2854 applied to a point 2852 of a portion of an interface laminate 1600 not rigidly coupled to a body-borne exoskeleton 703 produces a displaced position 2855, 2859 of the interface laminate 1600 that may create undesirable reaction forces 2856 on a user's skin surface if said displaced position 2855, 2859 interpenetrates the skin surface. Numerous geometries of a body-borne portion 703 of an exoskeleton, as shown in FIG. 27A in accordance with one embodiment and as described here and above, are contemplated to minimize the action of said undesirable reaction forces 2856 on a user's skin surface by providing a rigid, load-bearing structure enclosing as much of a user's body surface as possible without impeding the motion of the user or exoskeleton.

In an alternate embodiment, intermediate layer 2704 comprises an at least partially compliant material or combination of materials, including foam, gel, rubber, or fabric. In a second alternate embodiment, a portion of the intermediate layer comprises one or more structures filled with air or another suitable gas. Said gas is optionally controllably pressurized e.g. to aid in fitting or securing a structural member of a body-borne portion 703 of an exoskeleton to the body of a wearer.

A veneer 2706 preferably covers the surface of an interface garment. Veneer 2706 protects the components of an interface garment, enhances the interface garment's aesthetics, and is optionally configured to minimize perceived surface discontinuities when a wearer touches his or her own body. A veneer comprises one or more thin layers of a flexible, and preferably elastic, material, such as a fabric. In one embodiment, a veneer also comprises thin, stiff elements that cover surface discontinuities in an interface garment (such as the edge 2712 of an articulation of a body-borne exoskeleton 703). Veneer 2706 is preferably coupled to body-borne exoskeleton 703 by means of one or more temporary fasteners (such as hook and loop fasteners or snaps) to allow veneer 2706 to be removed e.g. for maintenance of an interface garment.

Figure 29A:
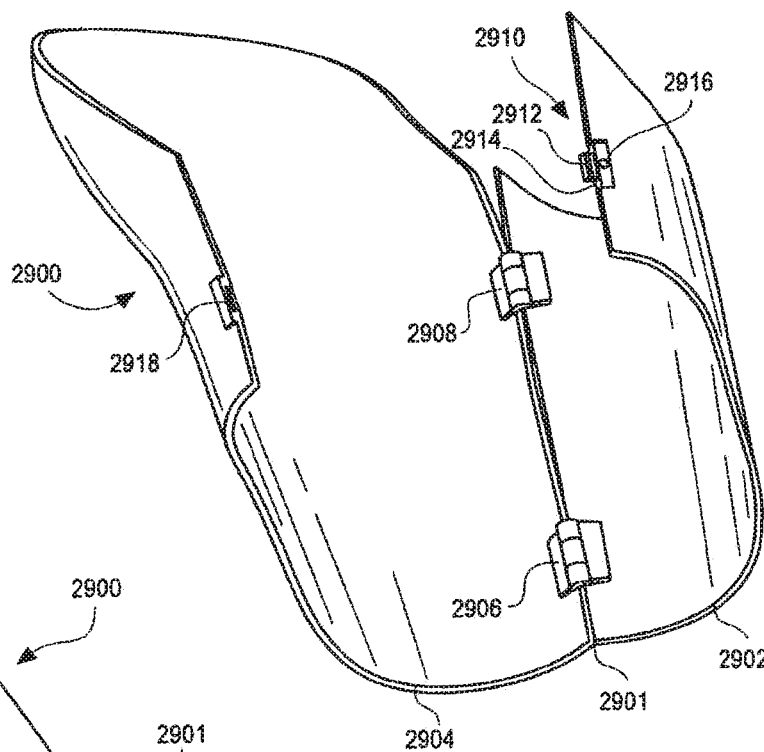
FIG. 29A is a perspective view of a structural member of an interface garment having a donning aid in accordance with one embodiment, where said donning aid is in an open state.
Figure 29B:
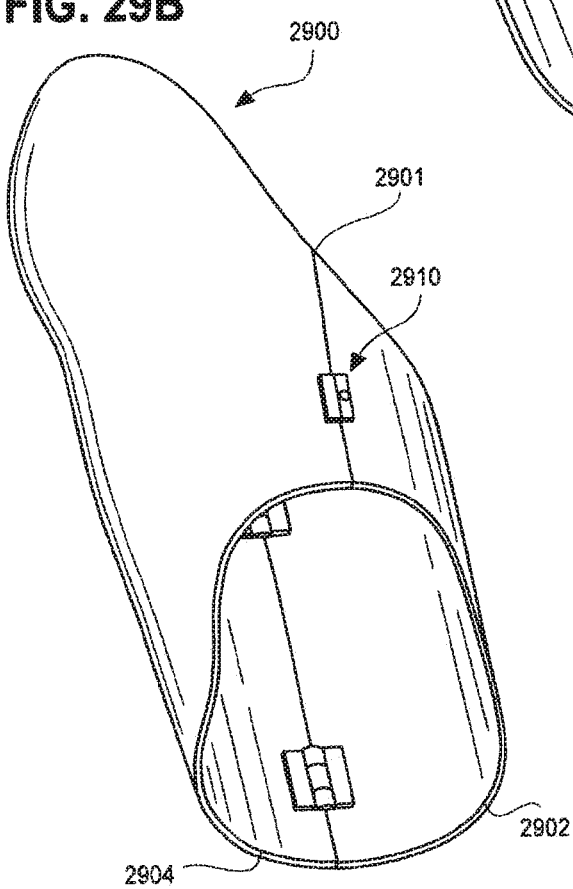
FIG. 29B is a perspective view of the structural member of the embodiment of FIG. 29A, where the donning aid of the embodiment of FIG. 29A is in a closed state.

An interface garment preferably includes a plurality of donning aids to facilitate donning and removal of the interface garment. FIGS. 29A and 29B show a donning aid in accordance with one embodiment. A structural member 2900 of a body-borne portion 703 (FIG. 27A) of an exoskeleton of an interface garment is shown. Structural member 2900 comprises a structural discontinuity 2901 coupled to hinges 2906, 2908 and to fastener 2910. Fastener 2910 can be of any of the aforementioned types suitable for use as a mechanical coupling of a temporary coupling point (as described hereinabove in the "Temporary Coupling" section), or of any other suitable type. The exemplary fastener 2910 shown in FIGS. 29A-B is closed by inserting locking member 2912 into receptacle 2918, and is opened by depressing button 2916. FIG. 29A shows structural member 2900 in an open state to facilitate donning of an interface garment. FIG. 29B shows structural member 2900 in a closed state after it has been donned by a user.

Referring again to FIG. 27A, in one embodiment, an interface garment is donned by means of a central zipper 2714 or other fastener in the manner of a wetsuit or flight suit. In a second embodiment, an upper body portion 2720 of an interface garment is donned in the manner of a jacket, having a central zipper or other fastener. In said second embodiment, a lower body portion 2730 of an exoskeleton is preferably donned in the manner of a pair of pants, having a zipper, button, buckle, or other fastener terminating near the belly button of the wearer. A head portion 1500 of an interface garment preferably comprises a moveable section 1516 configured to leave the face of the wearer uncovered when the head portion 1500 is not in use in order to reduce potential claustrophobia caused by complete occlusion of the wearer's face.

In one embodiment, one or more structural members of a body-borne portion 703 of an exoskeleton of an interface garment comprise: a length adjustment mechanism configured to change the length of a structural member; or an angle adjustment mechanism configured to change the angle of a first structural member relative to a second structural member. Said mechanisms comprise a first and second portion of a structural member, which can be fixed in a plurality of positions relative to one another by means of, for example: a hook-and-loop fastener, a threaded fastener, a spring-loaded fastener, or other manual fasteners; an actuated articulation 141 (FIG. 1); or a combination of two or more of the above. Said first or second portions of a structural member optionally comprise one or more holes, surface markings, or other alignment aids.

In another embodiment, one or more structural members of a body-borne portion 703 of an exoskeleton of an interface garment comprise a girth adjustment mechanism configured to change the girth of a structural member. In one variation of this embodiment, a structural member is split into a first portion and second portion which are joined by a hinge and fastener as shown, for example, in FIGS. 29A-B. In this variation, fastener 2910 is replaced with a fastener having a length adjustment mechanism or a plurality of fastening positions, each fastening position resulting in a different fastened length of the fastener (in the manner of e.g. a ski boot buckle). The variable fastened length of said fastener changes the girth of the structural member to which it is coupled by changing the angle of the first portion and second portion of the structural member relative to one another in the fastened position.

In one embodiment, a tensile member power transmission coupling of an interface garment is permanently attached to the back of an interface garment. In another embodiment, a tensile member power transmission coupling of an interface garment is permanently attached to an interface garment only by the tensile member assemblies to which it is coupled (i.e. in the manner of a plug attached to a cord). In a first variation of said second embodiment, a tensile member power transmission coupling optionally is temporarily attached to the back of an interface garment when said garment is not in use by means of e.g. hook and loop fastener, or another suitable fastener. In a second variation of said second embodiment, a tensile member power transmission coupling is held by the user when the interface garment is not in use. A handle is optionally added to the tensile member power transmission coupling to facilitate the practice of this variation.

Owing to the wide range of human body types and sizes, a plurality of interface garments of differing shapes and sizes are required for an optimal fit without undue adjustment. In a preferred embodiment, a plurality of standard interface garment sizes are provided, where each garment is configured to fit a population delimited by one or more index variables (such as height, weight, gender, or age). For example: a first interface garment is optimized to fit men having a height between 1.6 and 1.9 m, and a body mass index between 23 and 28 kg/m^2; and a second interface garment is optimized to fit women having a height between 1.5 and 1.8 m and a body mass index between 18 and 23 kg/m^2. In one variation, portions of an interface garment—such as a body portion 2700, an upper body portion 2720, a torso portion 2760, a lower body portion 2730, hand portions 2725, foot portions 2735, arm portions 2745*a/b*, leg portions 2755*a/b*, or a head portion 1500—each have a plurality of standard sizes. In an alternate embodiment, a custom interface garment is created for each user.

Point-of-Use Enclosure

Referring to FIG. 1, in a preferred embodiment of the present invention, a human-computer interface terminal 102 comprises a point-of-use enclosure. A point-of-use enclosure is a physical space located at the intended point of use of a human-computer interface terminal 102. A point-of-use enclosure comprises input transducers 108 and output transducers 110 which are advantageously located externally to an interface garment e.g. for reasons of size or cost, including one or more of the following: a motion simulator 143, a chemical delivery system 146, or a position or angle sensor 136. FIG. 30 generally depicts one embodiment of a point-of-use enclosure. FIG. 30 shows a first point-of-use enclosure 3000 and a second point-of-use enclosure 3050 in use.

The exterior of point-of-use enclosure 3000 comprises a frame 3002, a door 3004, and a console 3006. The interior of point-of-use enclosure 3000 comprises a motion simulator 1400 and a point-of-use portion 701 (FIG. 7) of an exoskeleton. The interior of point-of-use enclosure 3000 also preferably contains additional systems necessary to support the operation of a human-computer interface terminal 102 (FIG. 1), including: a computer system, networking or telecommunications equipment, signal processing equipment, power supply and distribution equipment, or other electronics; a pressurized gas or liquid supply, a control valve, a force or pressure sensor, a selector valve, a mixing valve, a heating or refrigeration device, a temperature or heat flux sensor, or other elements of an interface laminate advantageously located off the body of a user; a power supply, current or pressure limiter, actuator assembly, position or angle sensor, force or torque sensor, force or torque limiter, or other elements of a locomotor system of an exoskeleton advantageously located off the body of a user. Said additional systems can be contained within housing 1403, located elsewhere within point-of-use enclosure 3000, or located remotely (as in a remote server).

Frame 3002 comprises four walls and a ceiling, all of which are preferably substantially opaque to light and sound in order to protect the privacy of a user. Frame 3002 is coupled to a door 3004. Door 3004 is preferably of an automated, sliding type. In a preferred embodiment, door 3004 comprises privacy glass, or another normally transparent material which can be turned opaque 3005 by the application of an electric current or other stimulus. Door 3004 also preferably includes an alarmed emergency release (not shown) in case of electrical or mechanical failure. Console 3006 preferably comprises: a touchscreen; and an intercom preferably coupled to a microphone 139 (FIG. 1) and loudspeaker 145 (FIG. 1) of a human-computer interface terminal 102 (FIG. 1).

In one embodiment, a point of use enclosure comprises one or more serial manipulators that are not constantly coupled to a user during operation of the human-computer interface terminal 102 (FIG. 1). In one variation, said serial manipulators are coupled to a tool, prop, or other apparatus intermittently coupled to a user in order to increase the fidelity of simulation of a particular interaction. In a first example, a serial manipulator is coupled to a chemical delivery system 146 configured to dispense food, drink, or other edible compounds into the mouth of a user. In a second example, a serial manipulator is configured to position a real-world object in order to emulate the position of a simulated counterpart in a computer-mediated environment 116 (FIG. 1) or vice versa.

In one embodiment, a point-of-use enclosure comprises a heating, ventilation, or air conditioning system configured to change the temperature or humidity of the environment around a user in order to simulate the corresponding temperature or humidity of a virtual environment. In one variation of this embodiment, a point-of-use enclosure comprises a fan, blower, or other system configured to simulate the movement of air over a user's face or body.

User Experience

FIG. 31 shows a flow diagram of events that constitute a user experience with a human-computer interface terminal 102 (FIG. 1) in accordance with one embodiment, as described here and above in FIGS. 1 through 43. Initially, a user dons 3102 an undersuit. Next a user is coupled to a human-computer interface terminal 102 (FIG. 1) via a coupling process 3150. The user signals 3116 to begin the simulation. Said signal preferably constitutes the user lowering movable portion 1516 of head portion 1500 of an interface garment. The simulation begins 3118.

Upon receipt 3120 from the user of a signal to end the simulation, the simulation ends 3124. Said signal preferably comprises the user raising movable portion 1516 of head portion 1500 of an interface garment. A second means of terminating a simulation in case of emergency can be invoked 3122 by a user at any time during a simulation. Said means comprises establishing at least one signal, which can be reliably derived from one or more transducers of a human-computer interface terminal 102 (FIG. 1), and which is not significantly affected by the state of a computer-mediated environment 116 (FIG. 1). Said signal comprises, for example: an eye motion, a vocal cue, a biosignal; or a combination of two or more of the above. One or more degrees of freedom of one or more joints of a user (e.g. the user's jaw) are optionally left substantially unaffected by a human-computer interface terminal 102 (FIG. 1) to facilitate the discrimination of such a signal. Once the simulation is ended 3124, the user is decoupled from a human-computer interface terminal 102 via a decoupling process 3160. Lastly, the user removes 3130 an undersuit, which is optionally disposed of 3132.

Figure 32:
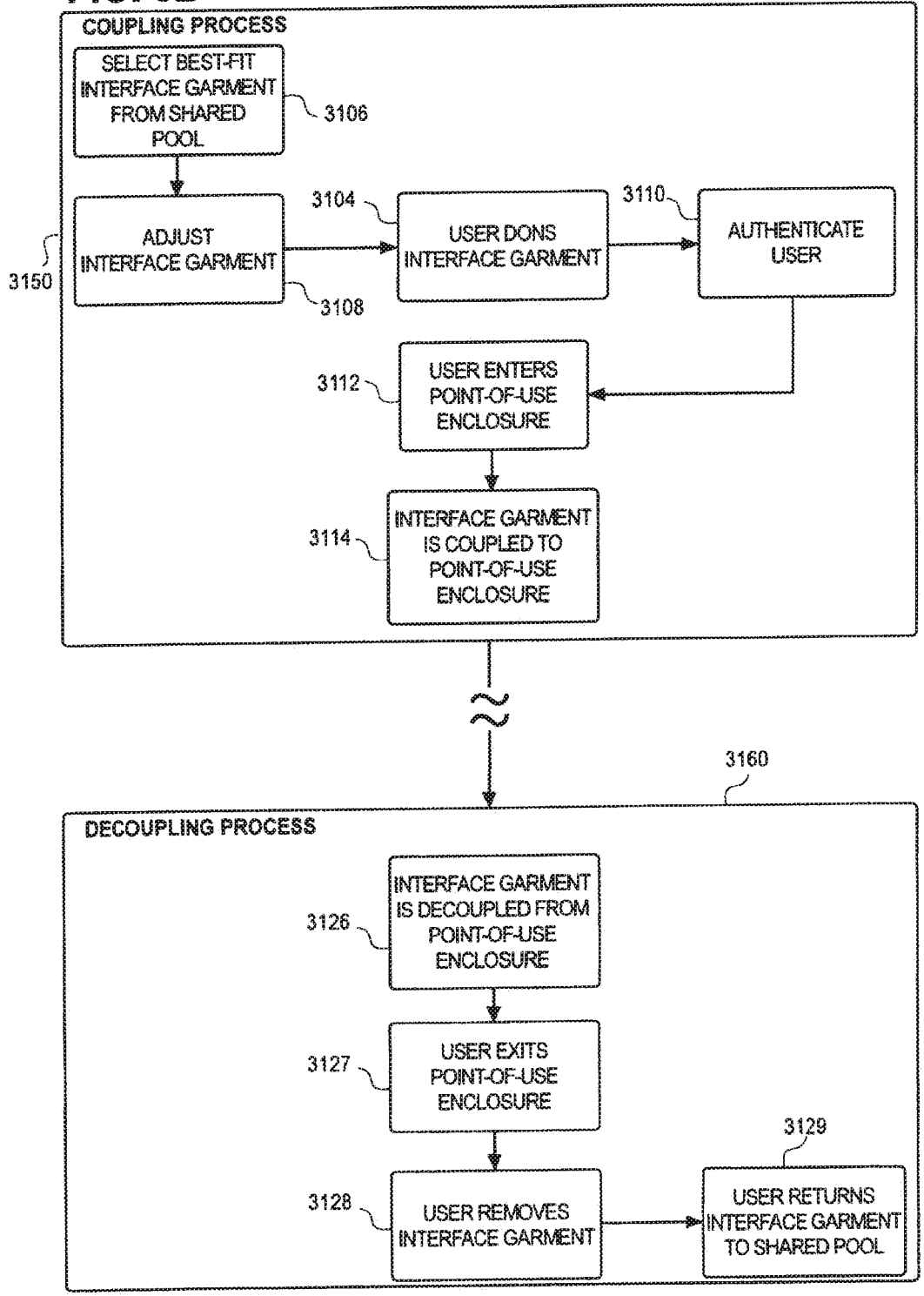
FIG. 32 is a flow diagram of events that constitute a first embodiment of a coupling process and decoupling process in accordance with the user experience of the embodiment of FIG. 31.

FIG. 32 shows a first embodiment of a coupling process 3150 in accordance with the user experience of the embodiment of FIG. 31. Optionally, the best fit of a pool of interface garments intended to be shared between a plurality of users is selected 3106. Said interface garment selected 3106 is optionally adjusted 3108 to further increase the quality of fit to the user. The user dons an interface garment 3104. The user is optionally authenticated 3110, by means of e.g.: a bar code, QR code, alphanumeric code, or combination of two or more of the above entered by the user via a console 3006 (FIG. 30) of a point-of-use enclosure; or an electronic identification device (such as a radio frequency identification chip) in the user's interface garment, the user's mobile device, or a card possessed by the user.

The user enters 3112 a point-of-use enclosure via a door 3004 (FIG. 30), which preferably automatically closes once the user has entered 3112. If said point-of-use enclosure includes privacy glass, the user optionally activates said privacy glass upon entering 3112 the point-of-use enclosure. Next, the user is coupled 3114 to the point-of-use enclosure by means of one or more temporary coupling points of an exoskeleton.

FIG. 32 also shows a first embodiment of a corresponding decoupling process 3160 suitable for use with the above coupling process 3150 in accordance with the user experience of the embodiment of FIG. 31. The user's interface garment is decoupled 3126 from the point-of-use enclosure, after which the user exits 3127 the point-of-use enclosure and removes 3128 the interface garment. Lastly, the user optionally returns 3129 said interface garment to a shared pool if it was originally selected 3126 from said shared pool.

Figure 33:
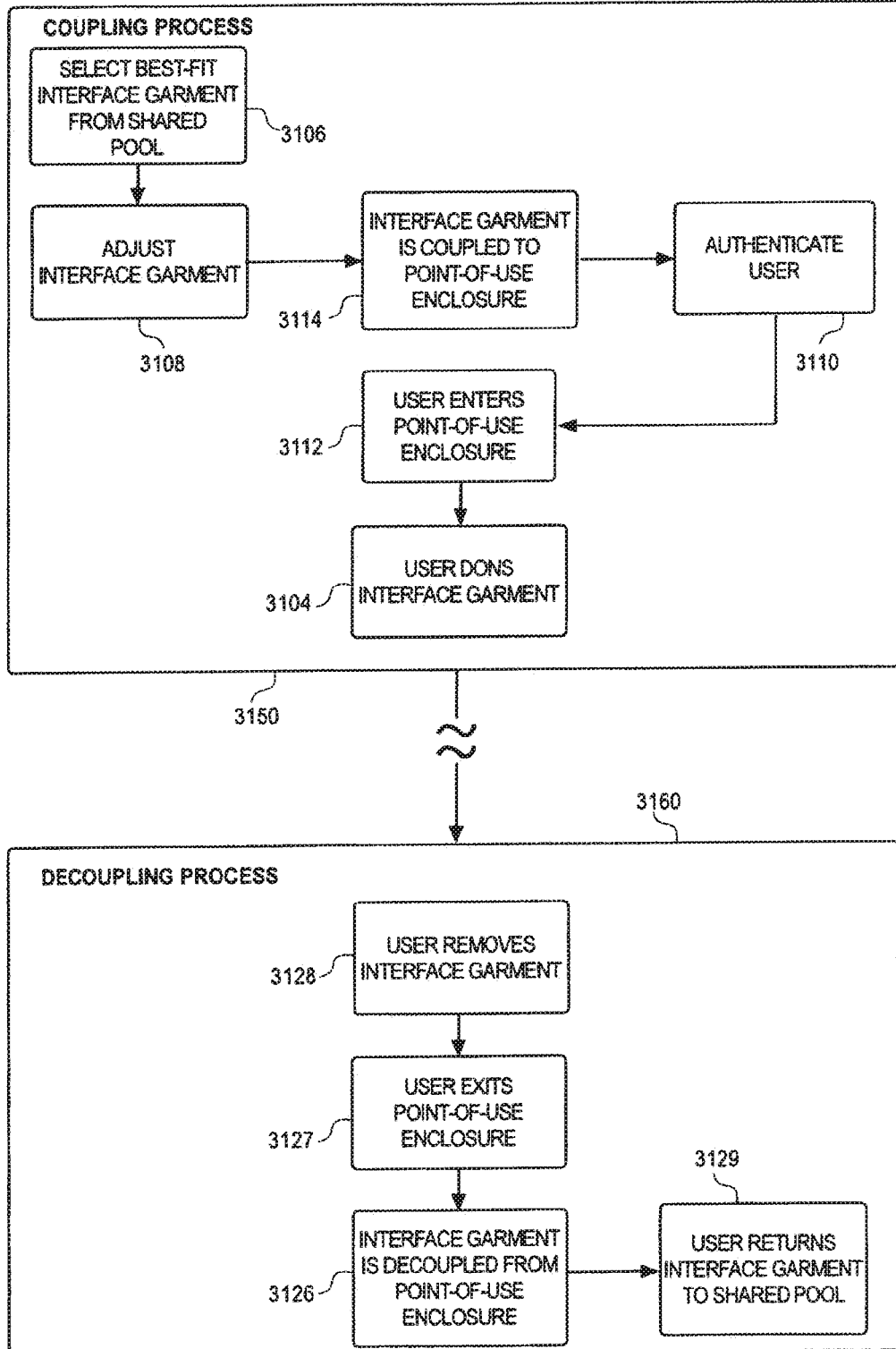
FIG. 33 is a flow diagram of events that constitute a second embodiment of a coupling process and decoupling process in accordance with the user experience of the embodiment of FIG. 31.

FIG. 33 shows a second embodiment of a coupling process 3150 and decoupling process 3160 in accordance with the user experience of the embodiment of FIG. 31. All process steps are the same as the embodiment of FIG. 32, with the exception that an interface garment is coupled 3114 to the point-of-use enclosure before being donned 3104 by the user, and preferably before the user even enters 3112 the point-of-use enclosure. Similarly, the user removes 3128 the interface garment and preferably exits 3127 the point-of-use enclosure before the interface garment is decoupled from said point-of-use enclosure. In one embodiment, rather than having a single point-of-use enclosure variously coupled to a plurality of interface garments of different sizes, a plurality of point-of-use enclosures are each coupled to a single interface garment of a different size.

A plurality of sub-steps are contemplated for each of several key process steps of the embodiments of FIGS. 32 and 33. In one embodiment, selecting 3106 the best-fit interface garment from a shared pool comprises one or more of the following sub-steps (referring now to FIG. 27A): selecting the best fit of a plurality of body portions 2700 of an interface garment; selecting the best fit of a plurality of upper body portions 2720 of an interface garment; selecting the best fit of a plurality of lower body portions 2730 of an interface garment; selecting the best fit of a plurality of torso portions 2760 of an interface garment; selecting the best fit of a plurality of head portions 1500 of an interface garment; selecting one or more of the best fits of a plurality of hand portions 2725 of an interface garment; selecting one or more of the best fits of a plurality of arm portions 2745 of an interface garment; selecting one or more of the best fits of a plurality of foot portions 2735 of an interface garment; or selecting one or more of the best fits of a plurality of leg portions 2755 of an interface garment.

In one embodiment, adjusting 3108 a best-fit interface garment comprises one or more of the following sub-steps (referring now to FIGS. 4A-5B): adjusting the length or girth of an upper arm structural member 401a/b; adjusting the length or girth of a forearm structural member 405a/b; adjusting the carry angle of an elbow joint 415a; adjusting the length of an opisthenar structural member 412; adjusting the length or girth of an upper leg structural member 501a/b; adjusting the length or girth of a lower leg structural member 505a/b; or adjusting the length or girth of a foot segment 512a/b.

In one embodiment, coupling 3114 an interface garment to a point-of-use enclosure comprises one or more of the following sub-steps (referring now to FIGS. 4A-6B): coupling a shoulder joint 670a/b to an upper arm structural member 401a/b; coupling an elbow joint 415a/b to an upper arm structural member 401a/b or a forearm structural member 405a/b; coupling a hand segment 206a/b to a forearm structural member 405a/b; coupling a hip joint 650a/b to an upper leg structural member 501a/b; coupling a knee joint 515a/b to an upper leg structural member 501a/b or a lower leg structural member 505a/b; coupling an ankle joint 519a/b to a lower leg structural member 505a/b or a foot segment 512a/b; or coupling a power transmission coupling of a hand segment 206a/b to an actuator of a locomotor module.

In one embodiment, donning 3104 an interface garment comprises one or more of the following sub-steps: closing an upper arm donning aid; closing a forearm donning aid; closing a hand donning aid; closing an upper leg donning aid; or closing a lower leg donning aid; or closing a foot donning aid.

In one embodiment, removing 3128 an interface garment comprises one or more of the following sub-steps: opening an upper arm donning aid; opening a forearm donning aid; opening a hand donning aid; opening an upper leg donning aid; or opening a lower leg donning aid; or opening a foot donning aid.

While the invention herein disclosed has been described by means of specific embodiments, examples and applications thereof, numerous modifications and variations could be made thereto by those skilled in the art without departing from the scope of the invention set forth in the claims.

The invention claimed is:

1. A control assembly for an interface garment, comprising:
   a pressurized fluid supply;
   at least one control valve, wherein each control valve is coupled to the pressurized fluid supply; and
   a controller configured to receive a user output state from a computer system, wherein the user output state represents a state of a user avatar in a simulated computer-mediated environment process, and in response operate at least one of the at least one control valve;

wherein each control valve is configured to interface with at least one fluidic actuator of the interface garment.

2. The control assembly for the interface garment of claim 1, wherein the pressurized fluid supply is a pressurized liquid supply.

3. The control assembly for the interface garment of claim 2, wherein the pressurized liquid supply comprises one of water, glycol, and oil.

4. The control assembly for the interface garment of claim 2, wherein at least one control valve is configured to mix together two or more streams of liquid.

5. The control assembly for the interface garment of claim 1, wherein the pressurized fluid supply is a pressurized gas supply.

6. The control assembly for the interface garment of claim 5, wherein the pressurized gas supply comprises carbon dioxide, helium, or air.

7. The control assembly for the interface garment of claim 5, wherein the pressurized gas supply is coupled to a pressure limiter.

8. The control assembly for the interface garment of claim 1, wherein the at least one actuator is a tactile actuator.

9. The control assembly for the interface garment of claim 1, wherein the at least one actuator is a thermal actuator.

10. The control assembly for the interface garment of claim 1, wherein each control valve comprises an electromechanical actuator, a brushed DC motor, a brushless DC motor, an AC induction motor, an AC synchronous motor, or a voice coil actuator.

11. The control assembly for the interface garment of claim 1, wherein each control valve comprises a contractile material.

12. The control assembly for the interface garment of claim 1, wherein each control valve comprises a liquid that changes at least one of volume, phase, and viscosity when exposed to one of varying temperatures, electric currents, and magnetic fields.

13. The control assembly for the interface garment of claim 1, wherein each control valve is actuated by the thermal expansion or contraction of a solid-state material.

14. The control assembly for the interface garment of claim 1, wherein the control valve comprises a working fluid that undergoes a phase change to a gaseous state.

15. The control assembly for the interface garment of claim 1, wherein each control valve is located on a body of a user.

16. The control assembly for the interface garment of claim 1, wherein each control valve is located off a body of a user.

17. The control assembly for the interface garment of claim 1, wherein each control valve has a first port coupled to at least one fluidic actuator and is variably coupled to a second port or a third port.

18. The control assembly for the interface garment of claim 17, wherein the second port is coupled to a pressurized gas supply and the third port is coupled to an exhaust.

19. The control assembly for the interface garment of claim 1, wherein each control valve comprises a first valve having a first port coupled to a fluidic actuator and a second port coupled to the pressurized fluid supply and a second valve having a first port coupled to the fluidic tactile actuator and a second port coupled to an exhaust.

20. The control assembly for the interface garment of claim 1, wherein each control valve comprises a piloted element.

21. The control assembly for the interface garment of claim 1, wherein each control valve further comprises a force sensor or a pressure sensor.

22. The control assembly for the interface garment of claim 1, wherein each control valve comprises a first valve producing low-frequency, spatially localized stimuli sufficient to stimulate the Merkel-type (SA1) or Meissner-type (RA1) mechanoreceptors of a user's skin and a second valve producing high-frequency, spatially diffuse stimuli sufficient to stimulate the Ruffini-type (SA2) or Pacinian-type (RA2) mechanoreceptors of a user's skin.

23. The control assembly for the interface garment of claim 1, further comprising a heating device and a refrigeration device, wherein the heating device and the refrigeration device are coupled to the pressurized fluid supply.

24. The control assembly for the interface garment of claim 1, wherein the at least one fluidic actuator is a plurality of fluidic actuators, the control assembly further comprising a selector valve comprising a flow section element coupling one of the at least one control valve to a plurality of fluidic actuator ports in sequence.

* * * * *